US007878276B2

(12) United States Patent
Limbacher, Jr.

(10) Patent No.: US 7,878,276 B2
(45) Date of Patent: Feb. 1, 2011

(54) AMBULATORY VEHICLE

(75) Inventor: H. Phillip Limbacher, Jr., 2742 Buena View Ct., San Jose, CA (US) 95121

(73) Assignee: H. Phillip Limbacher, Jr., San Jose, CA (US)

( * ) Notice: Subject to any disclaimer, the term of this patent is extended or adjusted under 35 U.S.C. 154(b) by 117 days.

(21) Appl. No.: 12/414,588

(22) Filed: Mar. 30, 2009

(65) Prior Publication Data
US 2009/0188730 A1    Jul. 30, 2009

Related U.S. Application Data

(63) Continuation-in-part of application No. 11/484,788, filed on Jul. 10, 2006, now Pat. No. 7,604,075.

(60) Provisional application No. 60/697,897, filed on Jul. 8, 2005.

(51) Int. Cl.
*B62D 51/06* (2006.01)

(52) U.S. Cl. .................. 180/8.1; 180/8.5; 180/8.6; 180/8.3; 74/5 R; 74/5.2; 74/5.4

(58) Field of Classification Search .......... 180/8.1, 180/8.3, 8.6, 8.5; 74/5 R, 5.2, 5.4
See application file for complete search history.

(56) References Cited

U.S. PATENT DOCUMENTS

| 1,344,571 | A |   | 6/1920  | Anderson        |           |
|-----------|---|---|---------|-----------------|-----------|
| 4,321,976 | A |   | 3/1982  | Reinke et al.   |           |
| 4,363,411 | A |   | 12/1982 | Blair et al.    |           |
| 4,527,650 | A |   | 7/1985  | Bartholet       |           |
| 4,662,465 | A |   | 5/1987  | Stewart         |           |
| 4,674,949 | A |   | 6/1987  | Kroczynski      |           |
| 4,790,400 | A |   | 12/1988 | Sheeter         |           |
| 4,834,200 | A |   | 5/1989  | Kajita          |           |
| 4,940,382 | A | * | 7/1990  | Castelain et al.| 414/749.1 |
| 4,977,971 | A |   | 12/1990 | Crane, III et al.|          |
| 5,005,658 | A |   | 4/1991  | Bares et al.    |           |
| 5,105,862 | A |   | 4/1992  | Skinner et al.  |           |

(Continued)

FOREIGN PATENT DOCUMENTS

DE    10032640    1/2002

OTHER PUBLICATIONS

Ambulatory Robotics Lab, Centre for Intelligent Machines, McGill University, Montreal, Canada, http://www.cim.mcgill.ca/~arlweb/.

(Continued)

*Primary Examiner*—Lesley Morris
*Assistant Examiner*—Marlon A Arce
(74) *Attorney, Agent, or Firm*—Carr & Ferrell LLP

(57) ABSTRACT

An ambulatory vehicle having legs and configured for transporting a load is disclosed. The ambulatory vehicle includes a load that is able to shift the center of gravity of the ambulatory vehicle along a transverse axis and a longitudinal axis of a beam assembly. Additionally, leg assemblies of the ambulatory vehicle are configured to exchange places along the length of the beam assembly. Further, the vehicle is able to perform a number of gaits including a slow stable gait and faster dynamic gaits comprising striding, trotting, and bounding. The ambulatory vehicle is able to navigate rough terrain and steep slopes and navigate submerged.

25 Claims, 41 Drawing Sheets

U.S. PATENT DOCUMENTS

| | | | |
|---|---|---|---|
| 5,127,484 | A | 7/1992 | Bares et al. |
| 5,219,410 | A | 6/1993 | Garrec |
| 5,351,626 | A * | 10/1994 | Yanagisawa ................ 180/8.6 |
| 5,351,773 | A * | 10/1994 | Yanagisawa ................ 180/8.5 |
| 5,359,957 | A | 11/1994 | Askestad |
| 5,429,009 | A * | 7/1995 | Wolfe et al. ................ 73/865.8 |
| 5,592,981 | A | 1/1997 | Derecktor |
| 5,685,383 | A | 11/1997 | Ferrante |
| 5,758,734 | A | 6/1998 | Hong et al. |
| 5,836,365 | A | 11/1998 | Derecktor |
| 5,842,533 | A | 12/1998 | Takeuchi |
| 5,890,553 | A | 4/1999 | Bar-Cohen et al. |
| 5,929,585 | A | 7/1999 | Fujita |
| 5,945,625 | A | 8/1999 | Zielinski |
| 6,068,073 | A | 5/2000 | Roston et al. |
| 6,105,695 | A | 8/2000 | Bar-Cohen et al. |
| 6,244,450 | B1 | 6/2001 | Woodling |
| 6,422,329 | B1 | 7/2002 | Kazerooni et al. |
| 6,588,701 | B2 | 7/2003 | Yavnai |
| 6,688,451 | B2 | 2/2004 | Derby et al. |
| 6,745,804 | B2 | 6/2004 | Welsh et al. |
| 6,964,309 | B2 | 11/2005 | Quinn et al. |
| 6,992,456 | B2 | 1/2006 | Furuta et al. |
| 7,237,468 | B2 | 7/2007 | Laine |
| 2002/0023788 | A1 | 2/2002 | Torrie et al. |
| 2002/0060267 | A1 | 5/2002 | Yavnai |
| 2002/0179342 | A1 | 12/2002 | Quinn et al. |
| 2005/0133280 | A1 | 6/2005 | Horchler et al. |
| 2007/0131306 | A1 | 6/2007 | Snider |
| 2008/0109115 | A1 | 5/2008 | Lim |
| 2008/0129239 | A1 | 6/2008 | Lee et al. |
| 2008/0150465 | A1 | 6/2008 | Baba et al. |

OTHER PUBLICATIONS

"Big Dog", Boston Dynamics, 2005, http://www.bdi.com/content/sec.php?section=BigDog.

Hambling, David, "Robotic 'Pack Mule' Displays Stunning Reflexes", NewScientist.com, Mar. 3, 2006, http://Iwww.newscientist.com/article.ns?id=dn8802&print=true.

"Thoughtful Robot Adapts to Injury", New Scientist Tech, Nov. 17, 2006, http://www.newscientisttech.com/channel/tech/robots/.

"Biologically Inspired Multifuntional Dynamic Robots", DARPA Defense Services Office, http://www.darpa.mil/dso/thrust/biosci/biodynotics.htm.

"8.0 Centre of Mass Robot", Oct. 2002, http://web.archive.org/web/20021002033031/http://carvenjim.tripod.com/robotics/Cronological001/xtceframes-2.htm.

Intelligent Embedded Systems, Climbing Robots, http://www.iti.uni-luebeck.de/Research/NC/IES/ClimbingRobots/.

Intelligent Embedded Systems, Walking Robots, http://www.iti.uni-luebeck.de/Research/NCIESIWalkingRobots#FRED-II.

Oricom Technologies, Robotics Index (8)- Locomotion, 2005, http://www.oricomtech.com/misc/robolnk8.htm.

Oricom Technologies, Quadruped Locomotion-Musings About Running Dogs and Other 4-Legged Creatures, Sep. 21, 2001, updated Nov. 2006, http://www.oricomtech.com/projects/legs.htm.

Jet Propulsion Laboratory, California Institute of Technology, http://www.robotics.jpl.nasa.gov/systems/index.cfm.

Shachtman, Noah, "Drone Doggie Built for War", Military.com, DefenseTech.org, Jan. 7, 2004, http://www.defensetech.org/archives/000711.html.

Timperi, Arto, Timberjack-Plustec: A John Deere Company, Tampere, Finland, http://www.norbe.kvl.dk/webs/ibe_course/pdf/plustech.pdf.

* cited by examiner

Pass Over
View

Walking Leg A

Walking Leg A

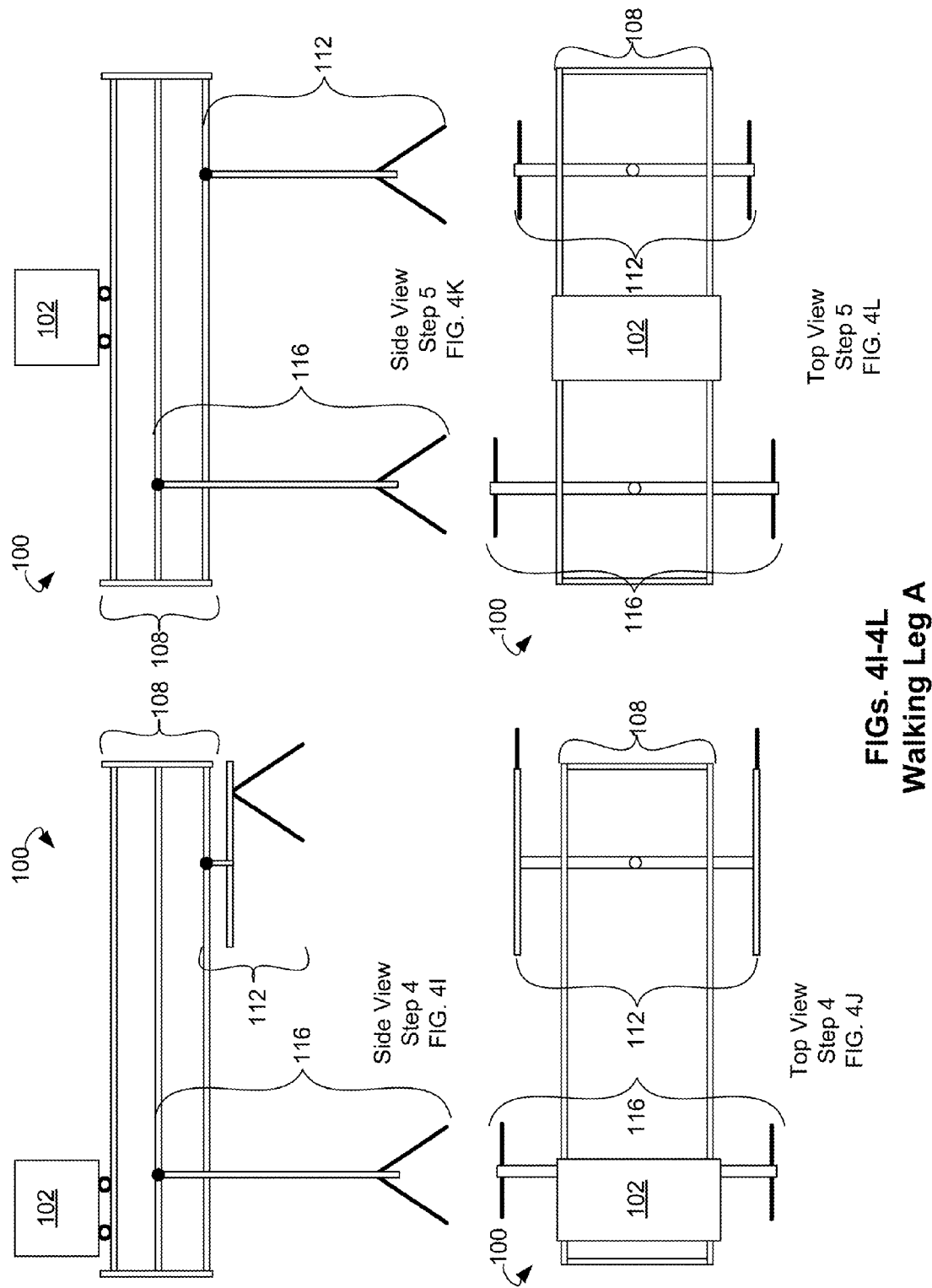

Walking Leg B

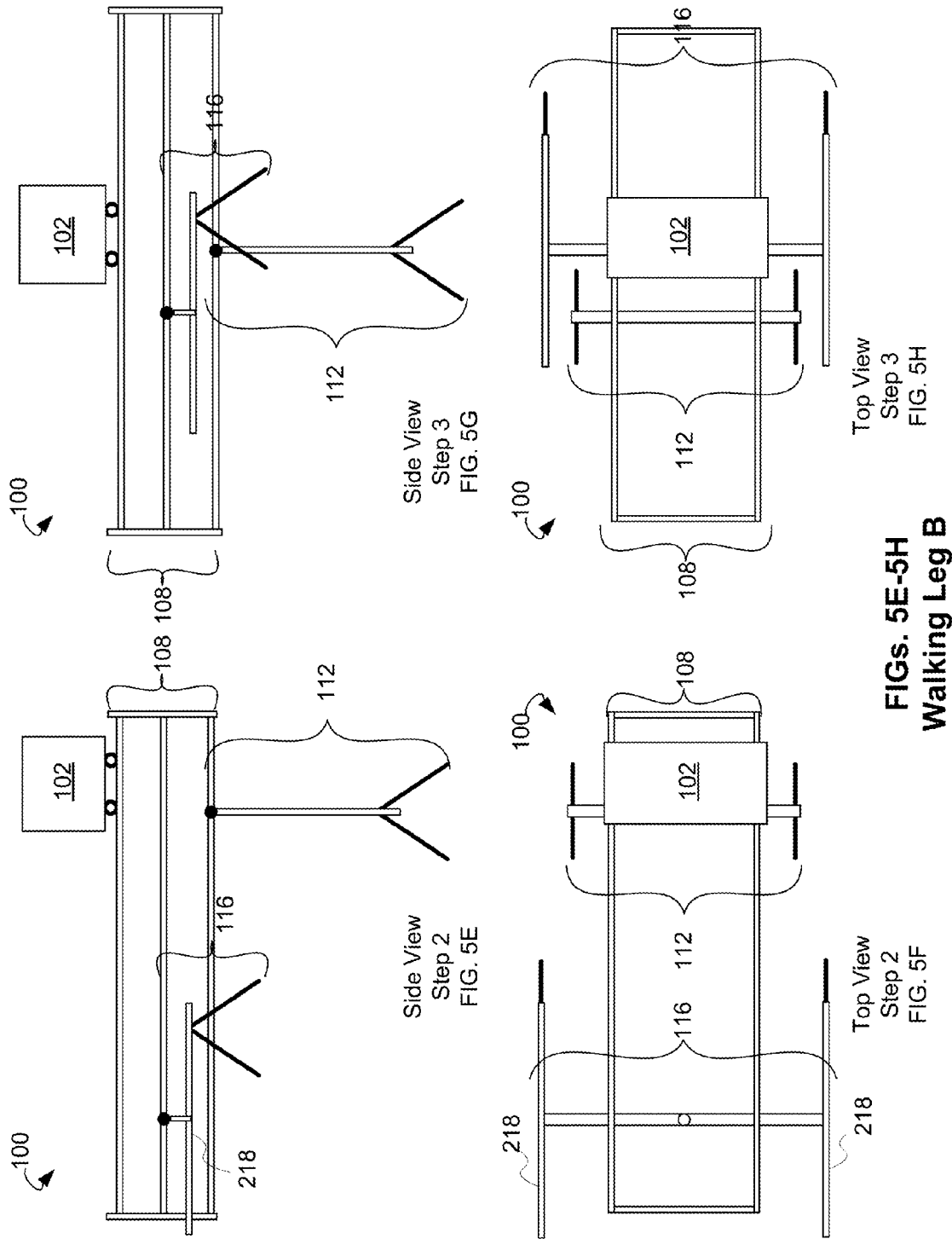

Walking Leg B
Side View

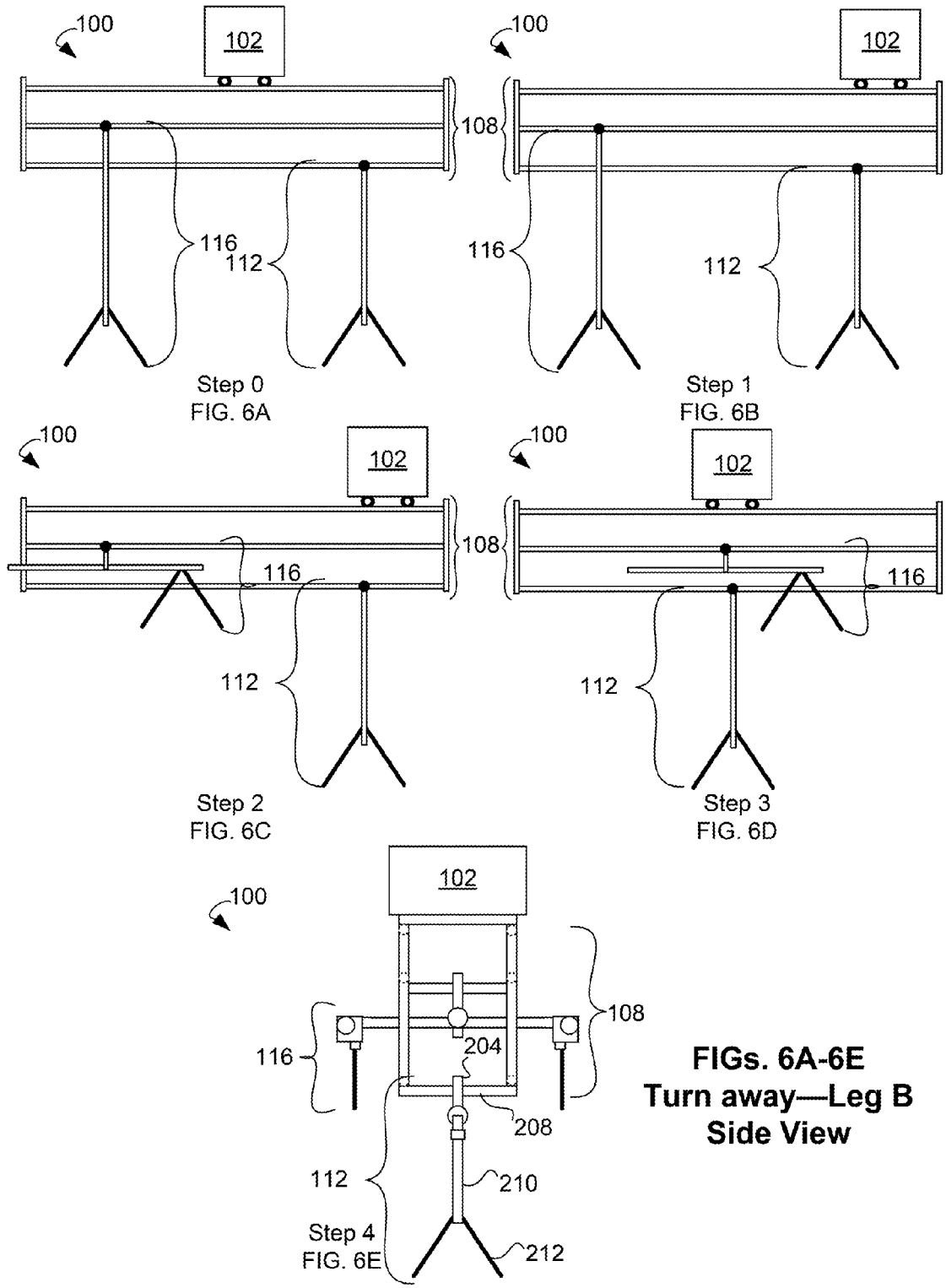

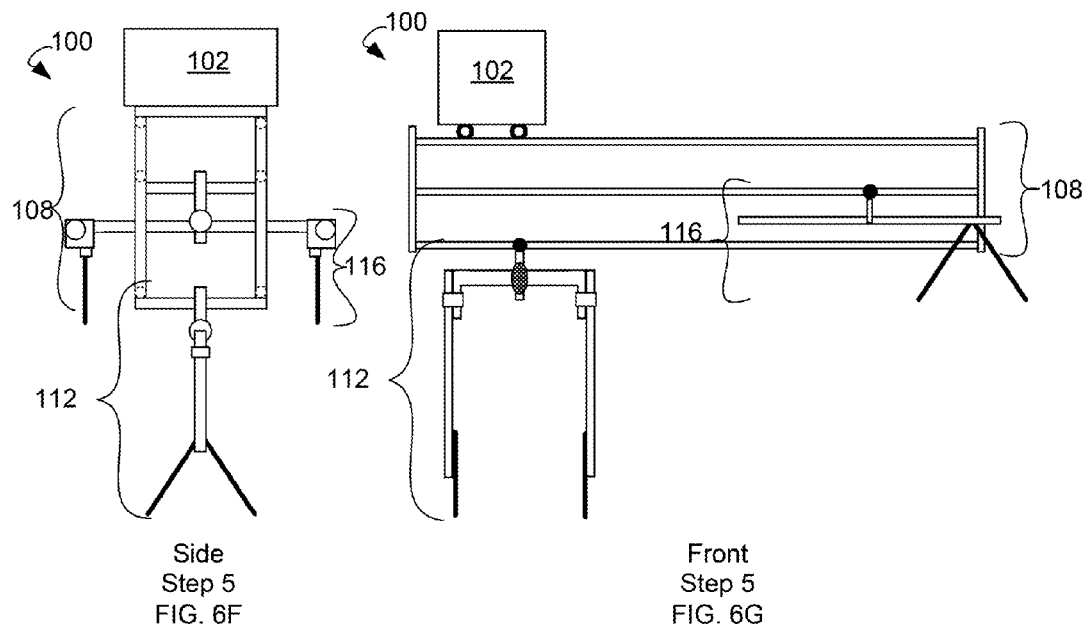
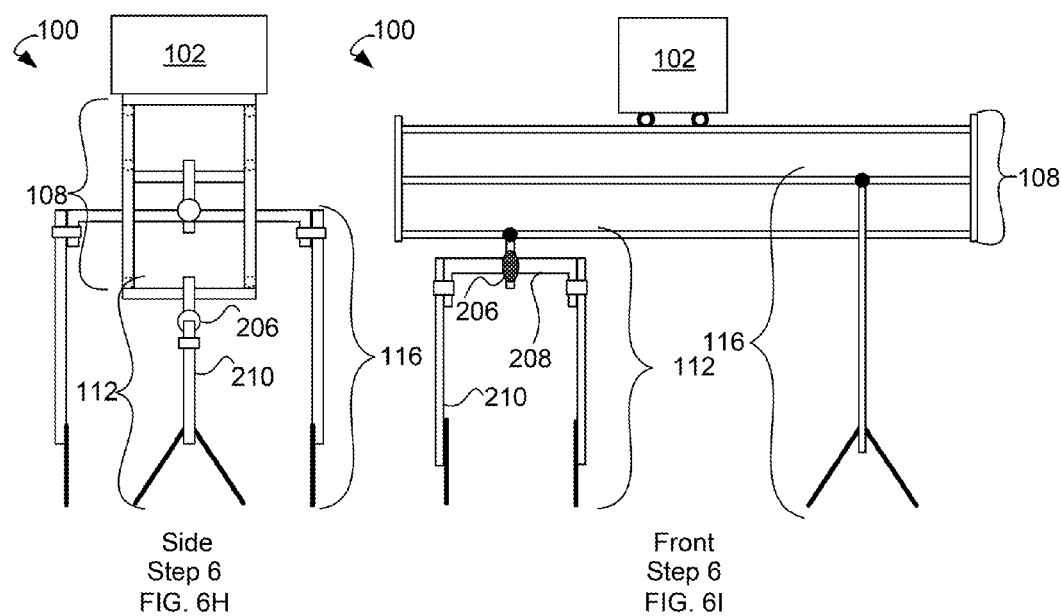
FIGs. 6F-6I
Turn away—Leg B
Dual Views

Stairs
Side View

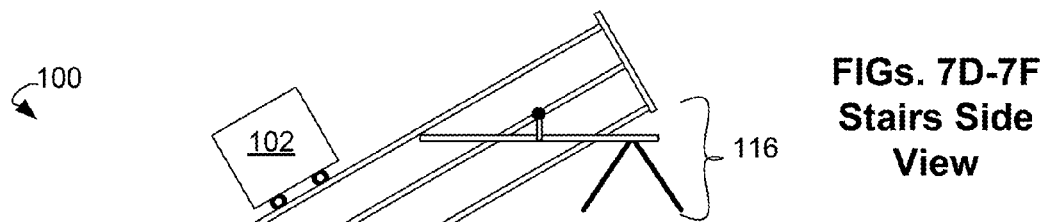
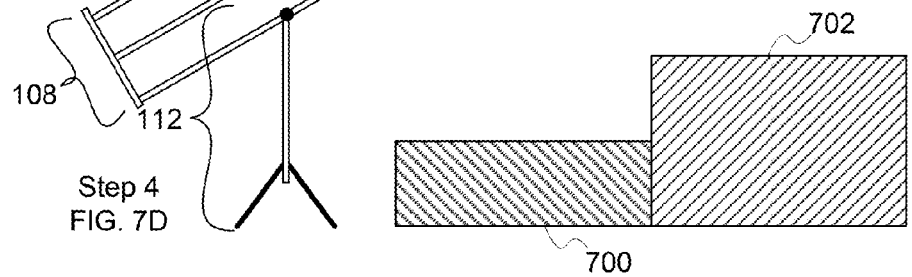
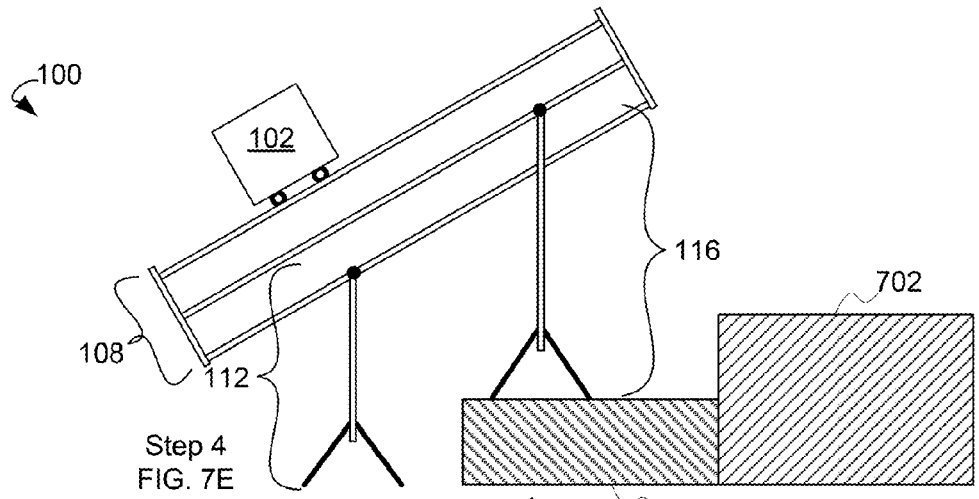
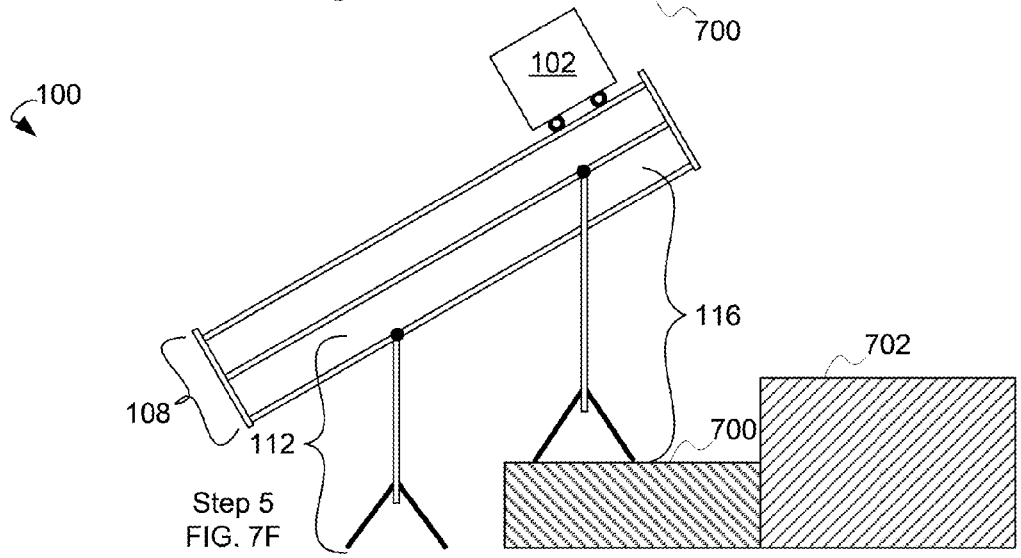
FIGs. 7D-7F Stairs Side View

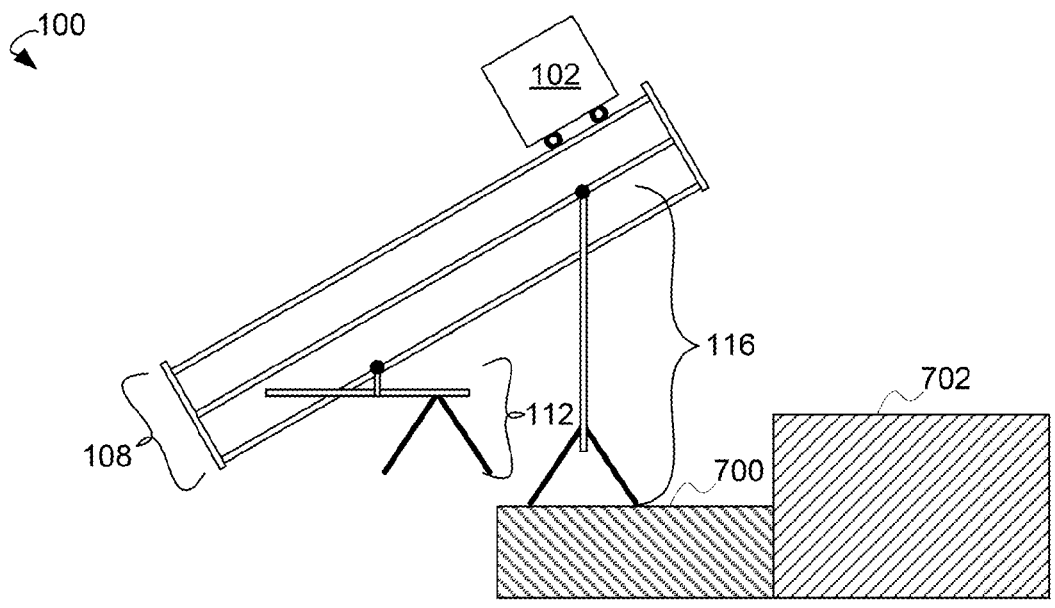
Step 6
FIG. 7G
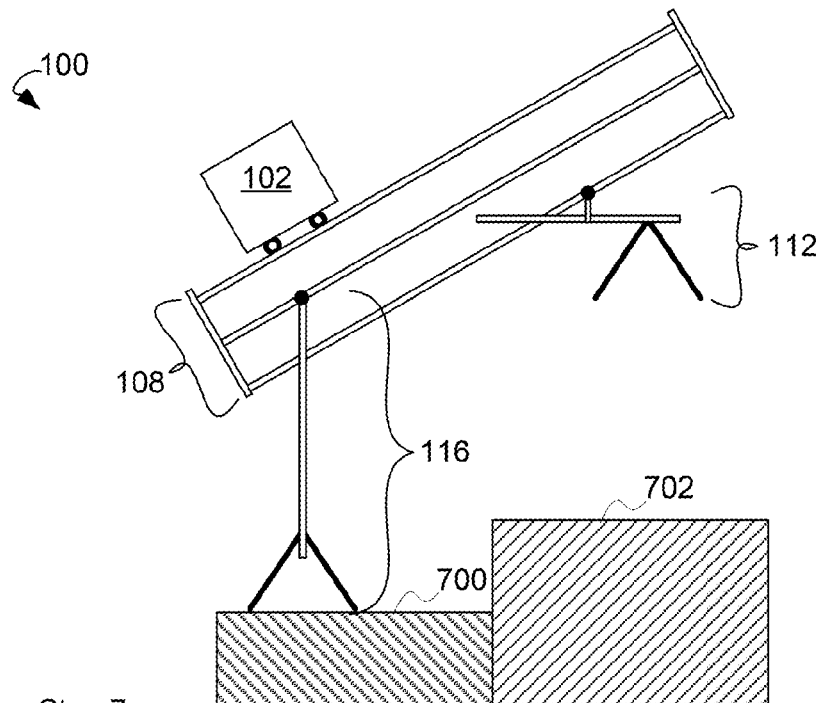
Step 7
FIG. 7H
**FIGs. 7G-7H
Stairs
Side View**

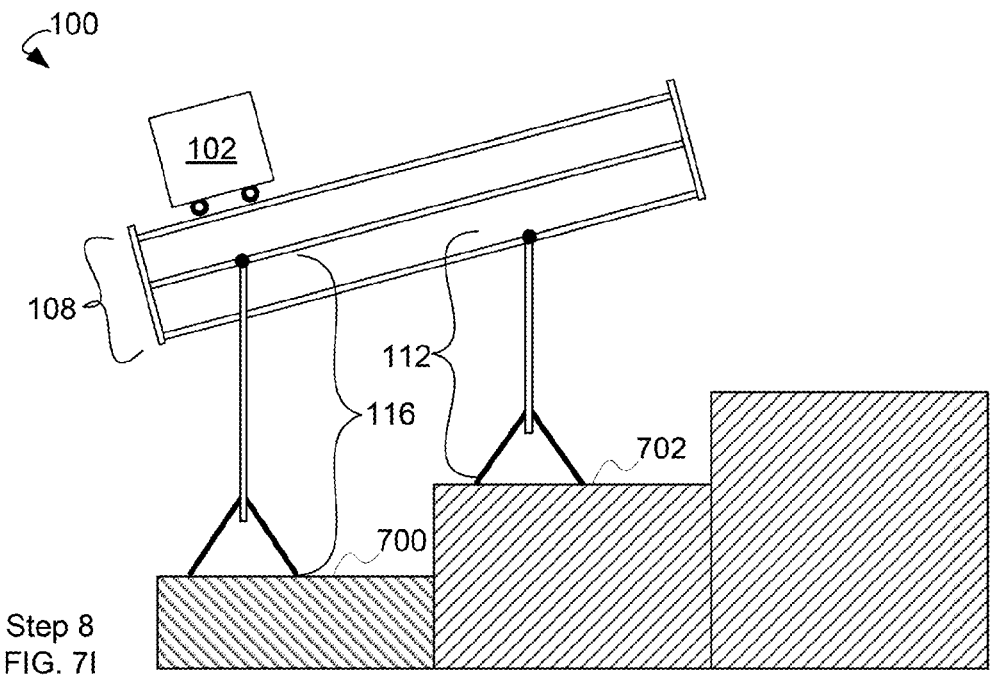
Step 8
FIG. 7I
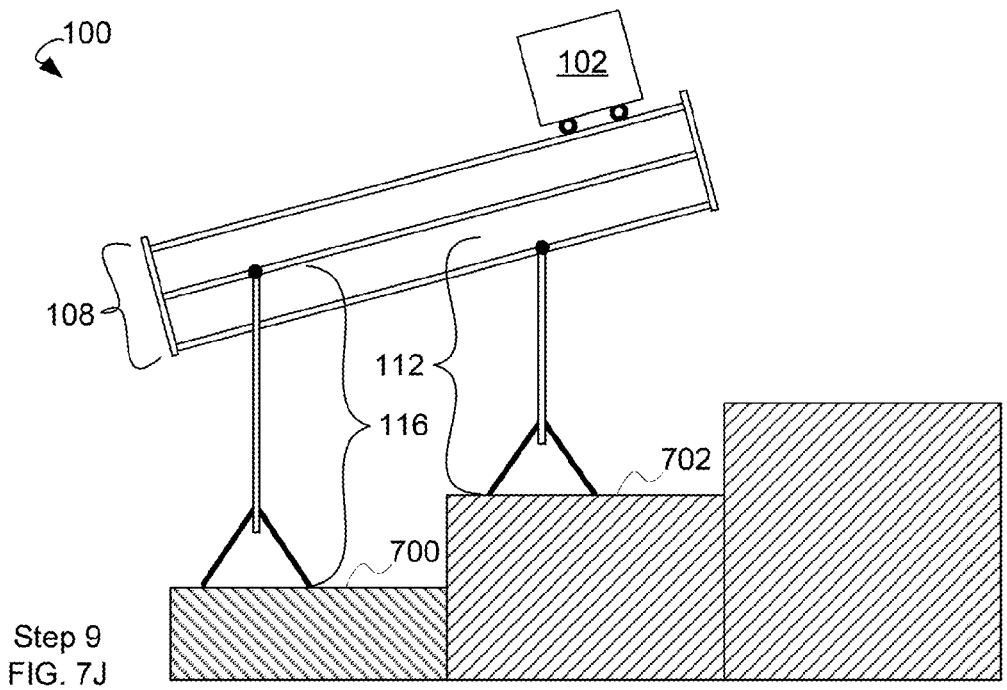
Step 9
FIG. 7J
**FIGs. 7I-7J
Stairs
Side View**

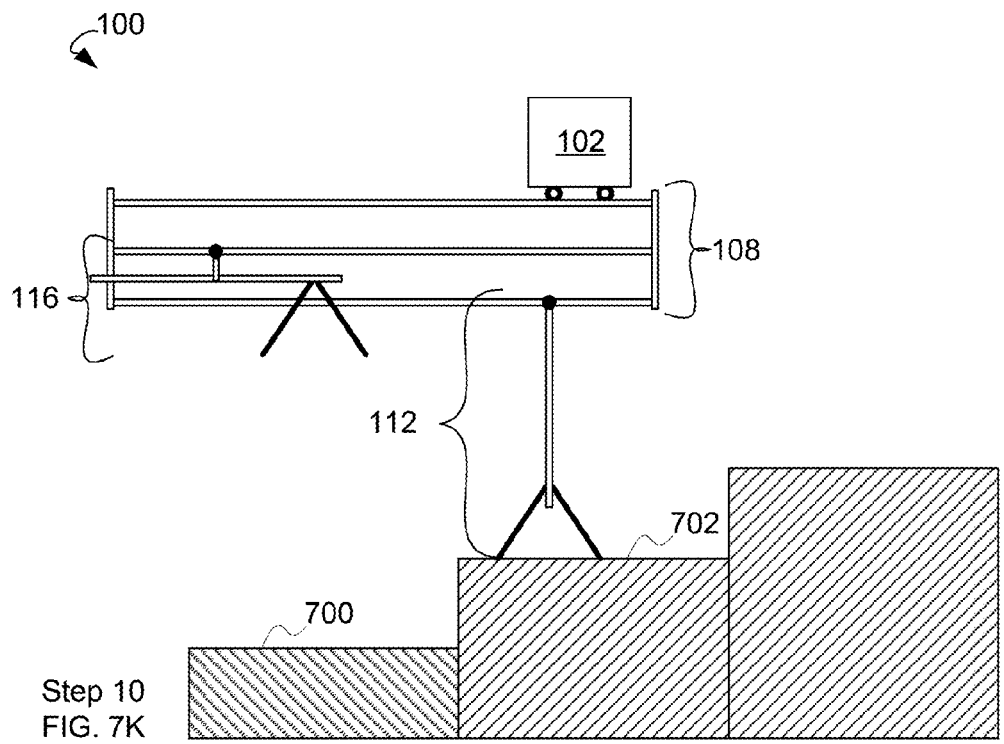
Step 10
FIG. 7K
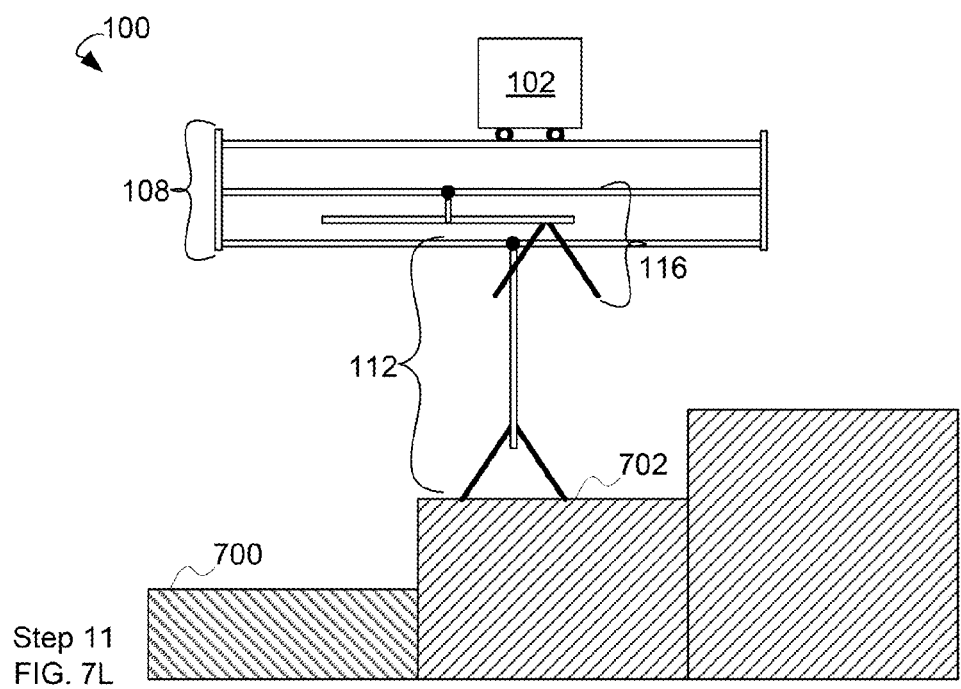
Step 11
FIG. 7L
FIGs. 7K-7L
Stairs
Side View Sideways Travel Top View

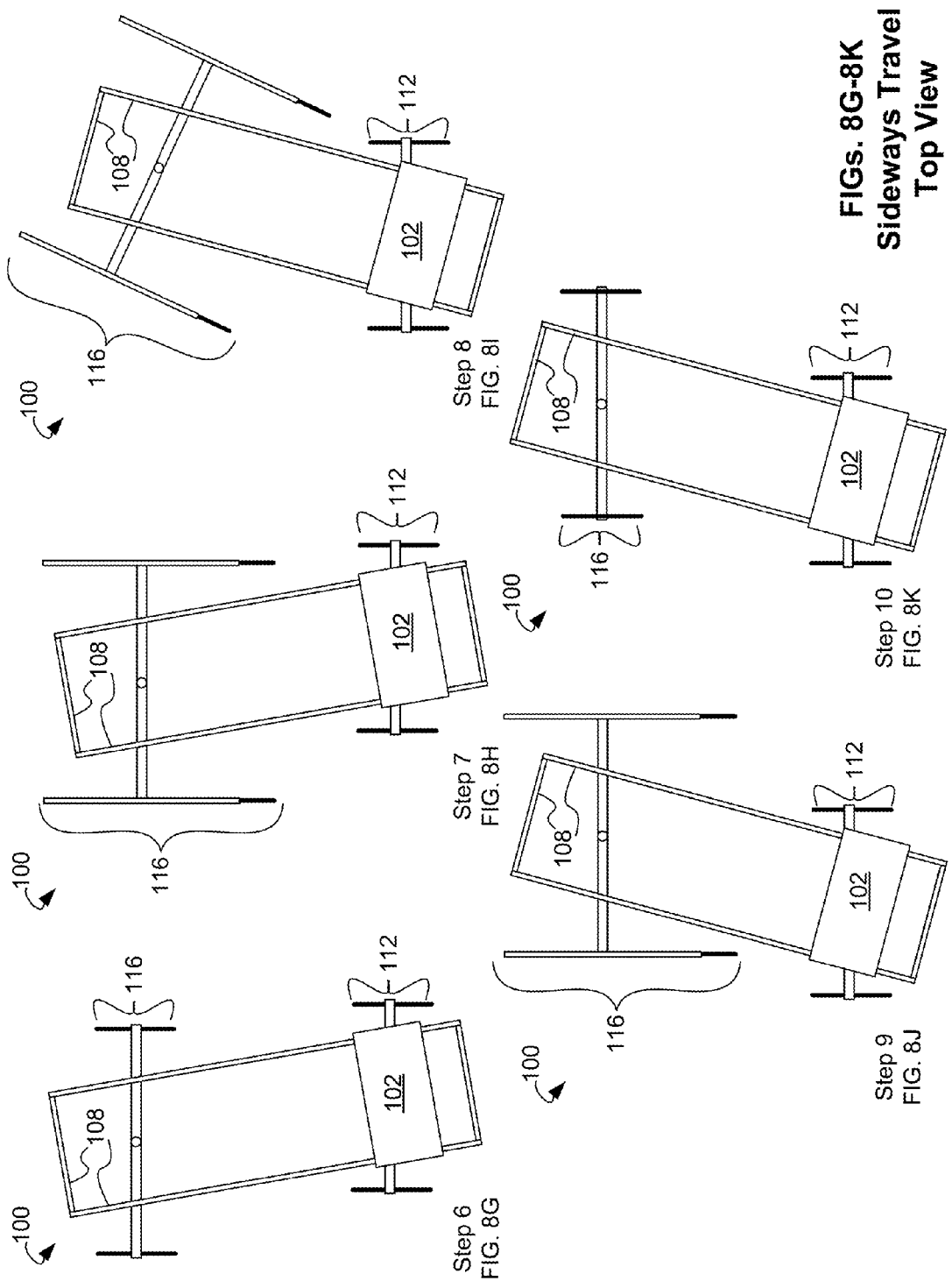

Striding Movement Side View

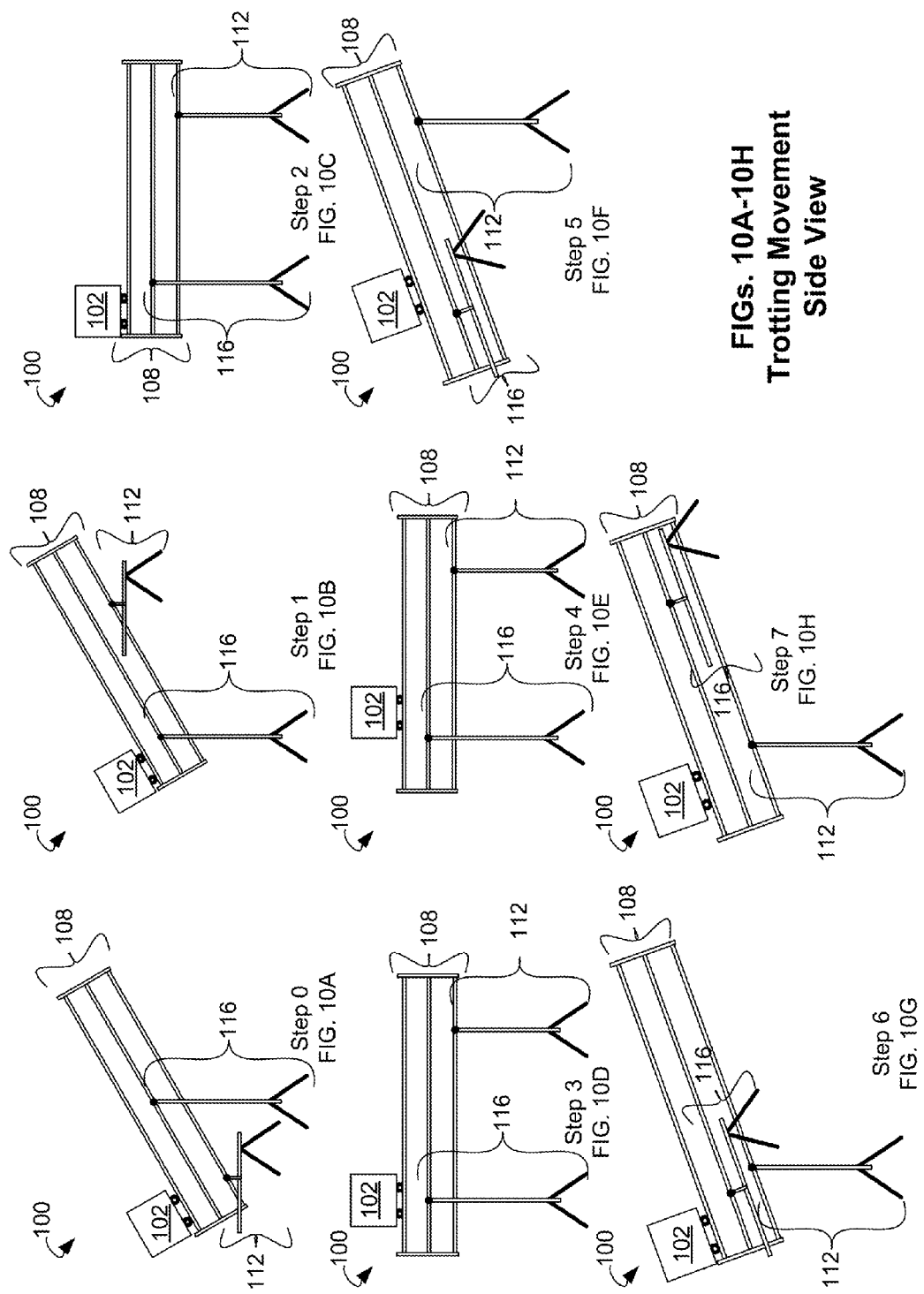

Bounding Movement Side View

Three-legged Transporters
Side View

Three-Legged Walk Side View

Method of Walking

Method of Stair Climbing

FIG. 16 Method of Sideways Motion

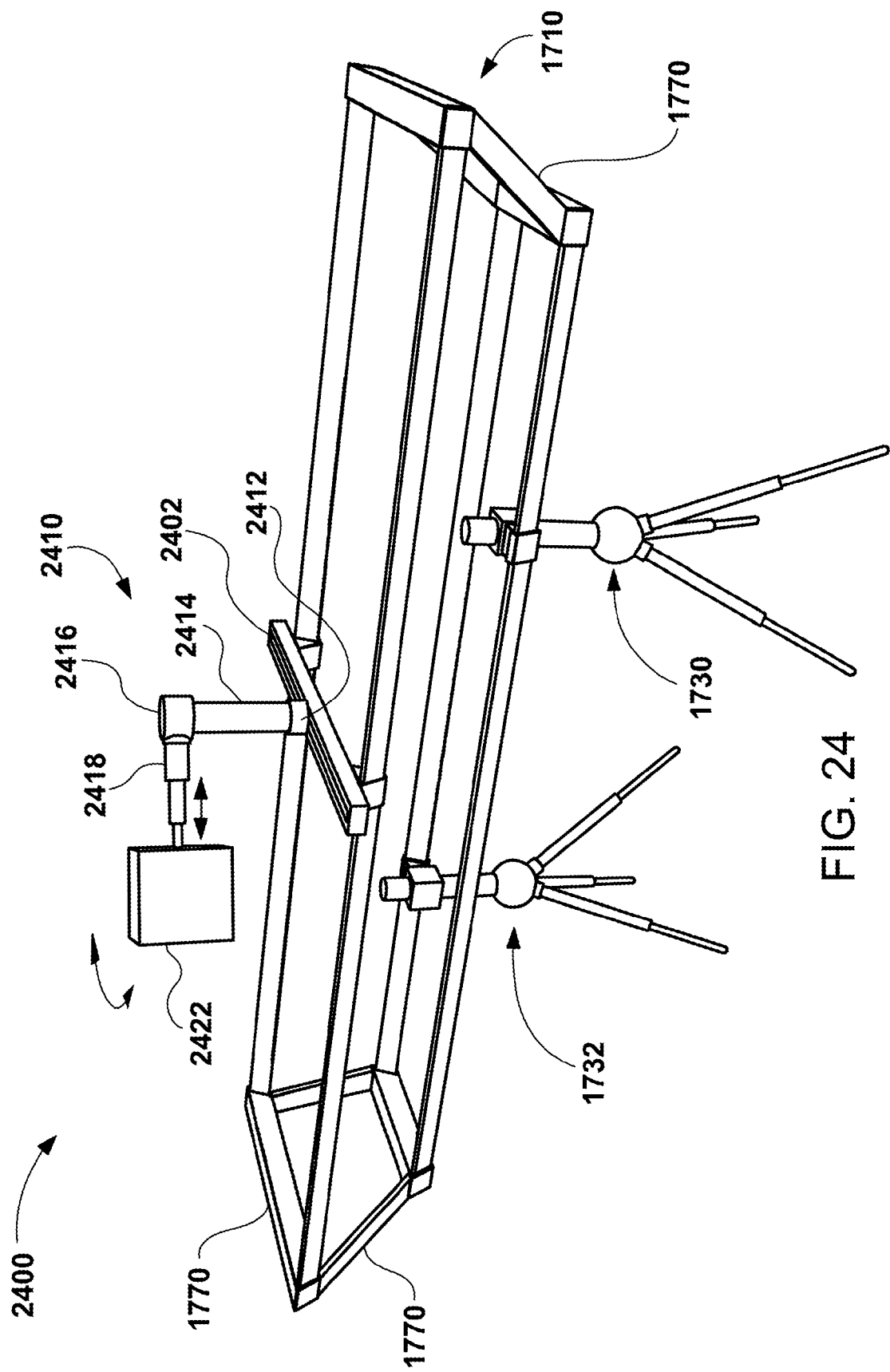

AMBULATORY VEHICLE

CROSS-REFERENCE TO RELATED APPLICATIONS

This patent application is a continuation-in-part of U.S. patent application Ser. No. 11/484,788 filed on Jul. 10, 2006 now U.S. Pat. No. 7,604,075 and titled "Ambulatory Vehicle," which in turn claims priority to provisional U.S. patent application Ser. No. 60/697,897 filed Jul. 8, 2005 and titled "X-Terrain Linear Pass-Thru Stepper." The disclosures of the above U.S. patent applications are hereby incorporated herein by reference.

BACKGROUND OF THE INVENTION

1. Field of the Invention

This invention relates generally to surface vehicles and more specifically to vehicles, which can be operator and/or robotically controlled.

2. Description of the Related Art

Surface vehicles, which can be either operator or robotically controlled, have included wheeled, tracked, and legged vehicles. Existing vehicles of these types are insufficient because they are limited in their ability to travel over uneven terrain and to operate in noxious environments, including submersion in a liquid, etc. Wheeled and tracked vehicles are limited in the types of terrain they can traverse, while legged vehicles tend to be slow and inefficient. There is, therefore, a need for an all-terrain ambulatory vehicle that can be controlled by either an operator or robotically controlled and travels efficiently and quickly or over a variety of terrains.

SUMMARY

An ambulatory vehicle comprising two or more leg assemblies and a beam assembly is configured to transport a load from a first location to a second location. Each of the leg assemblies may be configured to support the beam assembly and to be repositioned along a longitudinal axis of the beam assembly to provide for movement of the ambulatory vehicle. For example, a rear leg assembly and a forward leg assembly can be positioned on opposite ends of the beam assembly. The rear leg assembly and forward leg assembly can each be displaced along the beam such that the rear leg assembly becomes a forward leg assembly and vice-versa. The forward leg assembly may support the beam assembly alone while the rear leg assembly is being shifted along a separate track to exchange places longitudinally with the forward leg.

A load can be configured to be shifted in the longitudinal and/or transverse axis to provide balance for the ambulatory vehicle. For example, the load may be shifted to provide for balance over the forward leg assembly while the forward leg assembly supports the ambulatory vehicle and the rear leg assembly is being shifted forward along the length of the beam assembly to become the forward leg assembly. Thus, the leg assemblies may be displaced between front and rear positions along the beam assembly to provide motion while the load is positioned transversely and/or longitudinally to provide balance for the ambulatory vehicle.

Various embodiments of the technology include an ambulatory system which includes a beam assembly, a first leg assembly coupled to the beam assembly, the first leg assembly configured to support the beam assembly and to move in a first direction while coupled to the beam assembly, and a second leg assembly coupled to the beam assembly. The second leg assembly is configured to move in a second direction while coupled to the beam assembly. The ambulatory system further includes a carriage configured to support a load. The carriage is coupled to the beam assembly and further configured to move in the first direction or the second direction. The carriage is further configured to move the load in a third direction while the carriage is coupled to the beam assembly, the third direction not parallel to first direction or the second direction. The ambulatory system further includes a control mechanism for displacing the carriage, first leg assembly and second leg assembly along the beam assembly. The control mechanism is configured to move the first leg assembly, the second leg assembly, and the carriage based on the position of the first leg assembly or the second leg assembly.

Various embodiments of the technology move a beam assembly by providing a beam assembly with a first leg assembly with at least one first leg and a second leg assembly with at least one second leg, the at least one first leg and at least one second leg in contact with a surface. The second leg is retracted such that it is not in contact with the surface. The second leg assembly is moved from a first position to a second position along a first axis of the beam assembly. A load is displaced from a first position to a second position along a second axis of a beam assembly to maintain a center of gravity of the ambulatory vehicle over the first leg assembly. A leg of the second assembly can be extended to contact the surface.

Various embodiments of the technology include an ambulatory system having a beam assembly, carriage, first leg assembly, first track, second leg assembly, second track, and a control mechanism. The beam assembly and carriage can bear and shift a load along a length of the beam assembly to change a center of gravity of the ambulatory system. The first leg assembly can support the beam assembly over a travel surface and retract a first leg coupled to the first leg assembly from the travel surface. The first track can be used to shift the first leg assembly along a first length of the beam assembly and is coupled to a first gimbal for coupling the first leg assembly to the first track and articulating the first leg assembly on the first track. The second leg assembly can support the beam assembly over the travel surface and retract a second leg coupled to the second leg assembly from the travel surface. The second track can shift the second leg assembly along a second length of the beam assembly and is coupled to a second gimbal for coupling the second leg assembly to the second track and articulating the second leg assembly on the second track. The control mechanism is used to control displacement or movement of the first leg assembly and the second leg assembly relative to each other along a length of the beam assembly.

Various embodiments of the technology include an ambulatory system having a first leg rail, a second leg rail, and a control mechanism. The first leg rail may be coupled to a first leg assembly including a first foot assembly, the first leg assembly configured to support a beam assembly while moving along the first leg rail. The second leg rail may be disposed above or below the first leg rail in a beam assembly and coupled to a second leg assembly including a second foot assembly. The second leg assembly may be configured to move along the second leg rail. The control mechanism may raise the second foot assembly and move the second leg assembly along the second rail while the second foot assembly passes over or below the first foot assembly.

Various embodiments of the technology move a first leg assembly and a second leg assembly. The first leg assembly includes a first foot assembly and is able to make contact with a surface. The second leg assembly includes a second foot assembly and is also able to make contact with the surface. The second leg can be retracted such that the second foot assembly is above the first foot assembly. The second foot assembly is moved from a first position along to a second position along a first axis of the beam assembly. A load is displaced from a first position, over the first foot assembly, and to a second position along a first axis of the beam assembly. The leg of the second assembly can be extended to place the second foot assembly in contact the surface.

BRIEF DESCRIPTION OF THE DRAWINGS

FIGS. 4A through 4L depict side views and top views of a series of steps used in walking locomotion in which a second leg assembly remains stationary, according to various embodiments of the invention.

FIGS. 5A through 5L depict side views and top views of a series of steps used in walking locomotion in which a first leg assembly remains stationary, according to various embodiments of the invention.

FIGS. 6A through 6I depict side views and/or rear views of a series of steps used to execute a turning movement, according to various embodiments of the invention.

FIGS. 7A through 7L depict side views of a series of steps used to move up a set of stairs, according to various embodiments of the invention.

FIGS. 8A through 8K depict top views of a series of steps used in to navigate sideways, according to various embodiments of the invention.

FIGS. 10A through 10H depict side views of a series of steps used in trotting, according to various embodiments of the invention.

FIG. 24 is a top perspective view of an alternative embodiment of the ambulatory vehicle.

DETAILED DESCRIPTION

Figure 1:
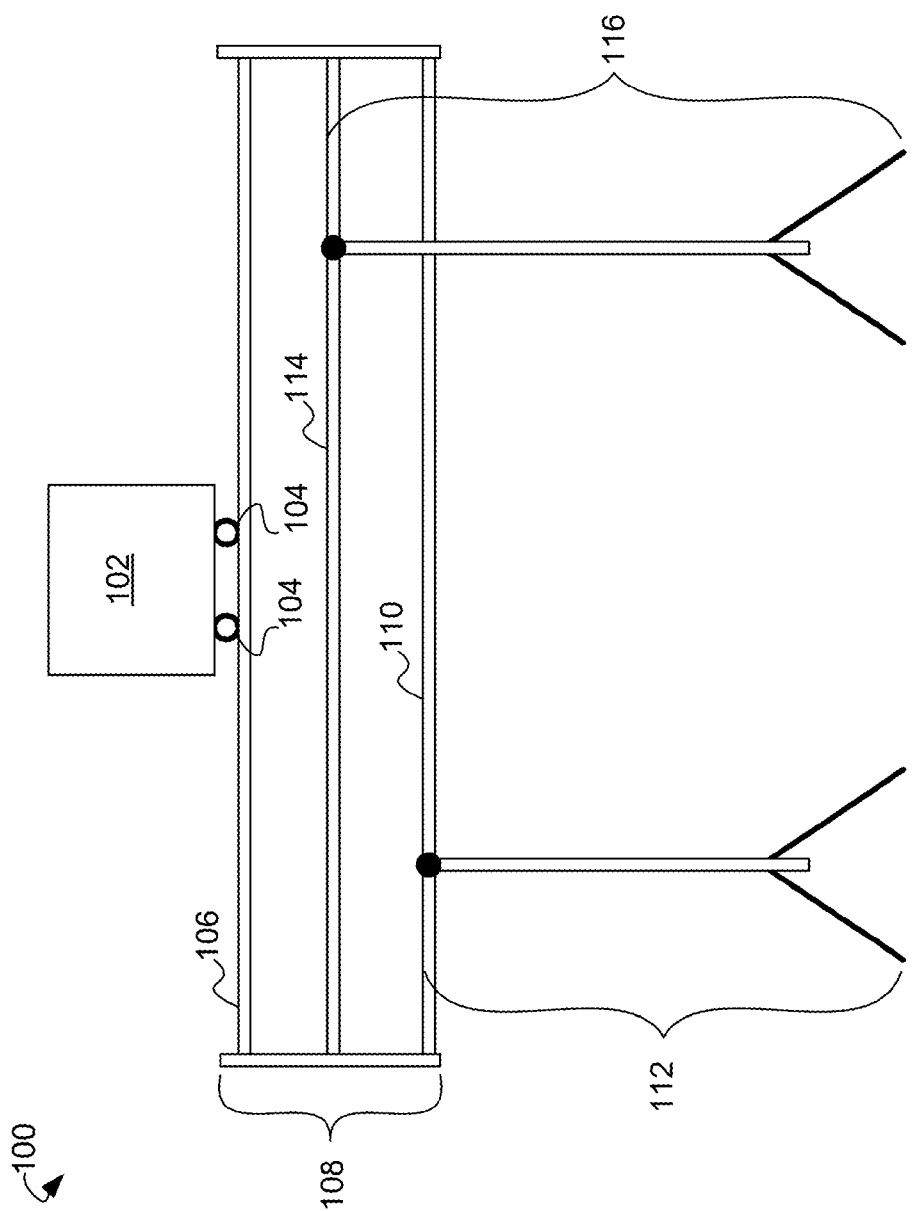
FIG. 1 is a side view of various embodiments of a pass through ambulatory vehicle, according to various embodiments of the invention.

The present embodiments provide for an ambulatory vehicle configured to support a load on a beam assembly while transporting the load from a first location to a second location. In some embodiments, the beam assembly includes two or more tracks disposed within the beam assembly, each track supported by a leg assembly. In one phase of locomotion, the vehicle is configured for the load to be shifted along a longitudinal and/or transverse axis of the beam assembly that is supported by one or both of the leg assemblies. By shifting the load, the center of gravity of the ambulatory vehicle is either between the two leg assemblies, or approximately over a supporting leg assembly. In a second phase of locomotion, the vehicle is configured for the load to be shifted along the longitudinal and/or transverse axis such that the center of gravity of the ambulatory vehicle may be solely supported by a single leg assembly. For example, a first leg assembly positioned at a first end of the beam assembly can support the load while a second leg assembly positioned at a second and opposite end of the beam assembly moves along a separate track along the longitudinal axis of the beam assembly. The second leg assembly can eventually move to the first end of the beam assembly and the first let assembly can move to the second end of the beam assembly. While moving along the beam assembly, the second leg assembly may be configured to pass along side or over the first leg assembly along the longitudinal axis.

In the description herein, leg assemblies which are moved along tracks to opposite sides of each other on a beam assembly may be described as "exchanging places" or "exchange ends" along the beam assembly. By this phrase, it is intended that the assemblies do not actually exchange exact places, but rather that they are each moved to opposite ends along the beam assembly, and therefore exchange which end they are positioned at.

In continuously stable gaits or when the vehicle is at rest, the positions of various vehicle components are coordinated so that the vehicle's center of gravity is either between two supporting leg assemblies, or approximately over a supporting leg assembly. As such, the vehicle's center of gravity is continuously supported by at least one leg assembly. In dynamic gaits, any tendencies for a supporting leg assembly to tilt in an undesirable direction due to the weight of vehicle components are effectively cancelled out by forces generated from the accelerations or decelerations of vehicle components.

There are multiple ways in which the leg assemblies may exchange places. In some embodiments, the leg assemblies pass through each other. Passing through each other includes passing astride each other. In other embodiments, the leg assemblies pass around each other. In still other embodiments, a leg assembly or a portion of a leg assembly passes over or under another leg assembly. In typical embodiments, the load is statically or dynamically supported by a first leg assembly throughout the movement of a second leg assembly, and vice-versa.

In embodiments where leg assemblies pass through each other, a first leg assembly is coupled to a first track of the beam assembly and a second leg is coupled to a second track of the beam assembly, typically above the first track. The first leg assembly, being narrower than the second leg assembly, can pass between the legs of the second leg assembly and the legs of the second leg assembly can pass outside of the first leg assembly.

In embodiments where leg assemblies pass around or over each other, part of a first leg assembly is reconfigured such that the legs of the first assembly can move to one side or above in order to pass by or over the legs of the second assembly and vice-versa. Therefore, instead of passing through, the legs of the first and second assembly pass around or over each other during locomotion.

The ambulatory vehicle has a movable center of gravity due, in part, to an ability to shift the load along the beam assembly and transverse to the beam assembly. For example, in embodiments configured for continuously stable movement of a load over terrain, at one point, the load and the vehicle's center of gravity may be equally supported by both leg assemblies, which are near the opposite ends of the beam assembly. The load and the vehicle's center of gravity then shift until the load is slightly forward of leading first leg assembly, such that the vehicle's center of gravity is solely supported by the leading first leg assembly. Next, because the vehicle's weight is not supported by the trailing second leg assembly, the trailing second leg assembly can be retracted. The beam assembly and the trailing second leg assembly then move forward while the load optionally moves slightly rearward, such that the vehicle's center of gravity remains supported by the first leg assembly. After the second leg assembly exchanges places with the first leg assembly with respect to their positions on the beam assembly, the second leg assembly, now leading, extends and the load is shifted such that both leg assemblies support the load and the vehicle's center of gravity.

The ambulatory vehicle is optionally configured to remain continuously stable while turning, navigating slopes and uneven terrain, and sideways locomotion. Alternatively, the ambulatory vehicle may be configured for locomotion in which the shifting of vehicle components (e.g., the beam assembly or a leg) makes the vehicle no longer continuously stable. Under this condition, dynamic stability is maintained through the vehicle's use of kinetic energy, rotational energy, momentum, and/or inertia. For example, stability may be maintained through programmed accelerations or decelerations of vehicle components that produce desired force(s), which allow the vehicle to maintain balance. These modes of locomotion include striding, trotting, and bounding as described further herein.

Figure 2:
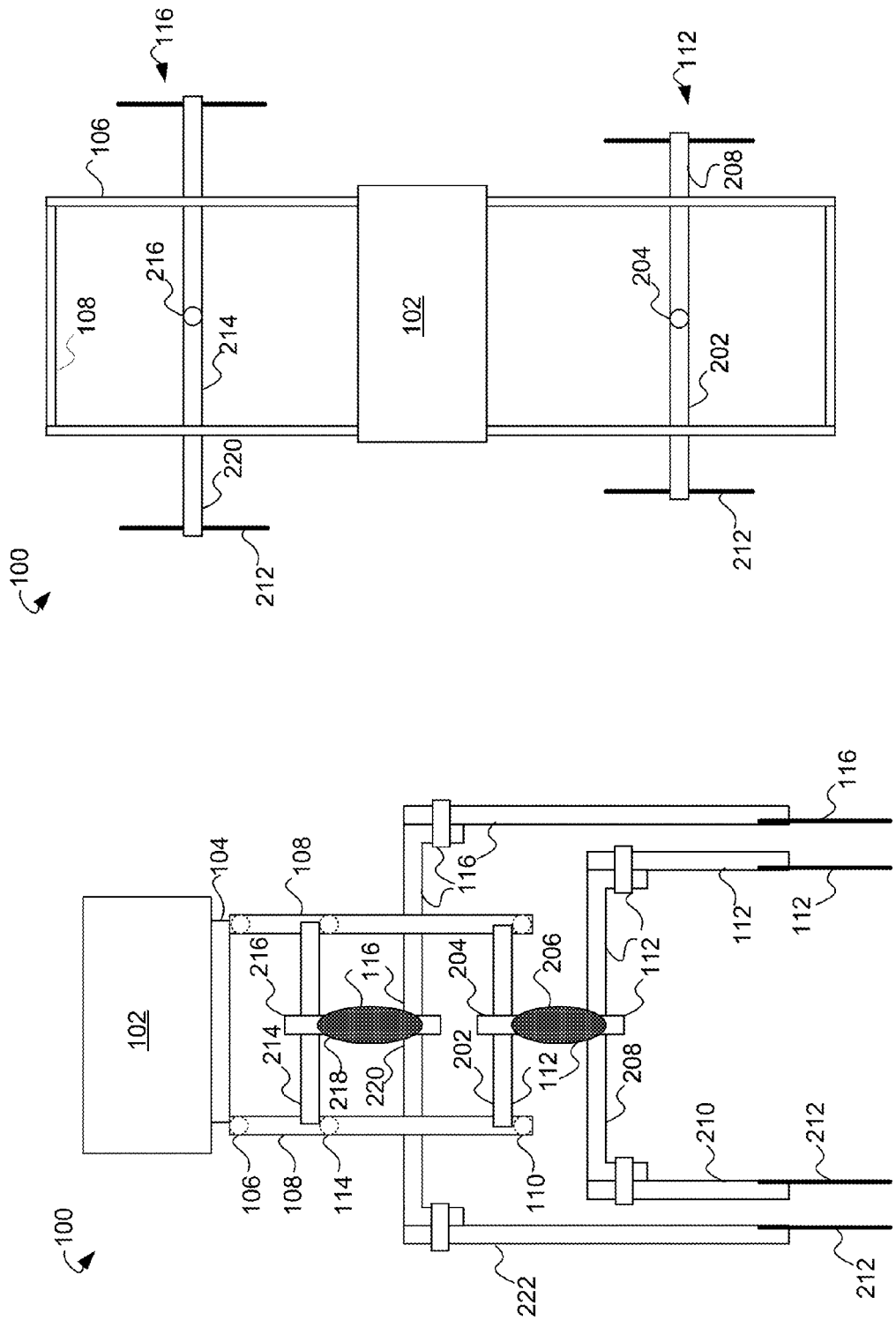
FIG. 2A is a rear view of the various embodiments of the pass through ambulatory vehicle, according to various embodiments of the invention.
FIG. 2B is a top view of the various embodiments of the pass through ambulatory vehicle, according to various embodiments of the invention.

FIGS. 1, 2A and 2B depict various embodiments in which a load is configured to shift on rollers along a beam assembly supported by a first leg assembly and a second leg assembly such that the vehicle's center of gravity is between the two leg assemblies or directly over one of the two leg assemblies. In alternative embodiments, rollers 104 may be replaced by slide rails, bearings, air bearings, magnetic bearings, gears, chains, or the like.

FIGS. 4C through 4I depict various embodiments in which the first leg assembly passes through a second leg assembly. In these embodiments, the first leg assembly is configured to exchange places with the second leg assembly while the load, substantially supported by the second leg assembly, shifts on the beam assembly to maintain a center of gravity over the second leg assembly, and vice-versa.

FIG. 1 illustrates a side view of an ambulatory vehicle 100 in which the first leg assembly 112 is configured to pass through a second leg assembly 116. A load 102 is configured to shift on rollers 104 along a length of a third track 106 of a beam assembly 108 to maintain the center of gravity of the ambulatory vehicle 100 over a second leg assembly 116. A first track 110 of the beam assembly is coupled to a first leg assembly 112. The first leg assembly 112 is configured to independently support the load 102 and the beam assembly 108. The first leg assembly 112 is further configured to retract and shift along the length of the first track 110 when exchanging ends along the length of the beam assembly 108 with a second leg assembly 116.

The second leg assembly 116 is coupled to a second track 114 of the beam assembly 108. The second leg assembly 116 is configured to independently support the load 102 and the beam assembly 108. The second leg assembly 116 is further configured to retract and shift along the length of the second track 114 when exchanging ends along the length of the beam assembly 108 with the first leg assembly 112.

Generally, the support of the ambulatory vehicle 100 by only the first leg assembly 112 or only the second leg assembly 116 can be either static or dynamic. For example, in gaits using static support, when the center of gravity is substantially centered over the first leg assembly 112 or the second leg assembly 116, the respective leg assembly is then stationary with respect to the travel surface. In gaits using dynamic support, as is discussed elsewhere herein, the load 102 is supported in part by the kinetic energy of the ambulatory vehicle 100.

FIG. 2A depicts a rear view of the ambulatory vehicle 100. The load 102 is placed on rollers 104 on the third track 106 of the beam assembly 108. The first leg assembly 112 is narrower than the second leg assembly 116. This difference in width permits the first leg assembly 112 to pass through the second leg assembly 116 when the ambulatory vehicle 100 is in motion. The first leg assembly 112 comprises a first upper traverse 202, an axle 204, a gimbal joint 206, a first lower traverse 208, at least two legs 210 configured to move relative to the first lower traverse 208, and, optionally, two sets of feet 212 disposed at an end of the two legs 210 and configured to contact a travel surface.

The first upper traverse 202 is configured to move the rest of first leg assembly 112 along the length of the first track 110. The first upper traverse connects to the rest of the first leg assembly via the axle 204, which comprises the vertical axis of gimbal joint 206. The gimbal joint 206 is configured to allow rotation of the first upper traverse 202 and therefore the beam assembly 108 around both a typically vertical axis for turning and a typically horizontal axis for navigating slopes or obstacles. The first legs 210 may orient away from the vertical as required for static stability or for a dynamic gait. If the first legs 210 are under load, the first legs 210 can quickly retract, orient away from the vertical, and/or extend to provide support, as required to maintain an upright position of the ambulatory vehicle 100 while responding to an extraneous force, such as an impact, from any direction. The first lower traverse 208, the axle 204, and the gimbal joint 206, are configured to allow a second lower traverse 220, of the second leg assembly 116, to pass over the first legs 210. In some embodiments, the first lower traverse 208 is coupled to the first legs 210 in such a way as to allow the first legs 210 to retract from a travel surface. In embodiments not comprising the optional feet 212, each of the first leg assembly 112 and the second leg assembly 116 optionally include three or more legs configured to make direct contact with the travel surface.

The feet 212, coupled to the first legs 210, are configured to make contact with the travel surface and to stabilize the ambulatory vehicle 100 during movement. The feet 212 may lock into position when the first leg assembly 112 is statically supporting the load 102, as shown in FIG. 1.

The second leg assembly 116 also supports the beam assembly 108 and the load 102, and is substantially similar to the first leg assembly 112. Like the first leg assembly 112, the second leg assembly 116 comprises a second upper traverse 214, an axle 216, a gimbal mount 218, a second lower traverse 220, at least two second legs 222 configured to move relative to the second upper traverse 214, and, optionally, two sets of feet 212 disposed at an end of the two legs 222 and configured to contact a travel surface.

In various embodiments, first legs 210 and second legs 222 are configured to extend and retract from a travel surface by rotating, rising, and/or telescoping. In some embodiments, these legs are configured to lock at various lengths in order to accommodate unevenness in terrain. This locking is optionally configured to hold the first lower traverse 208 and/or the second lower traverse 220 in approximately a horizontal position. For example, while examples illustrated herein sometimes illustrate legs rising from a travel surface without changing length, it is contemplated that in many cases the legs will be retracted by telescoping and/or rotating instead.

The second leg assembly 116 typically differs from the first leg assembly 112 in at least three ways. First, the second upper traverse 214 is coupled to a second track 114 of the beam assembly 108. In the embodiments shown, the second track 114 is immediately above the first track 110, although this is not a requirement. Second, the second lower traverse 220 is longer than the first lower traverse 208. This difference in length positions the second legs 222 further apart than the first legs 210 to allow the first leg assembly 112 to pass between (through) the second legs 222. Third, the second legs 222 are longer than the first legs 210 due to the difference in height from the travel surface to the second track 114 relative to the height from the travel surface to the first track 110.

In FIG. 2B, a top view of the ambulatory vehicle 100 is depicted. The load 102 is placed on the third track 106 of the beam assembly 108. The first leg assembly 112 comprises the first lower traverse 208 that is shorter than the second lower traverse 220 of the second leg assembly 116. This difference in length permits the first leg assembly 112 to pass through the second legs 222 of the second leg assembly 116. In various embodiments, the first track 110, the second track 114 and the third track 106 of the beam assembly 108 may be configured to extend using telescoping. In these embodiments, the rollers 104, the first leg assembly 112, and the second leg assembly 116 are configured are modified to accommodate the varying length of the beam assembly 108 throughout locomotion.

Figure 3:
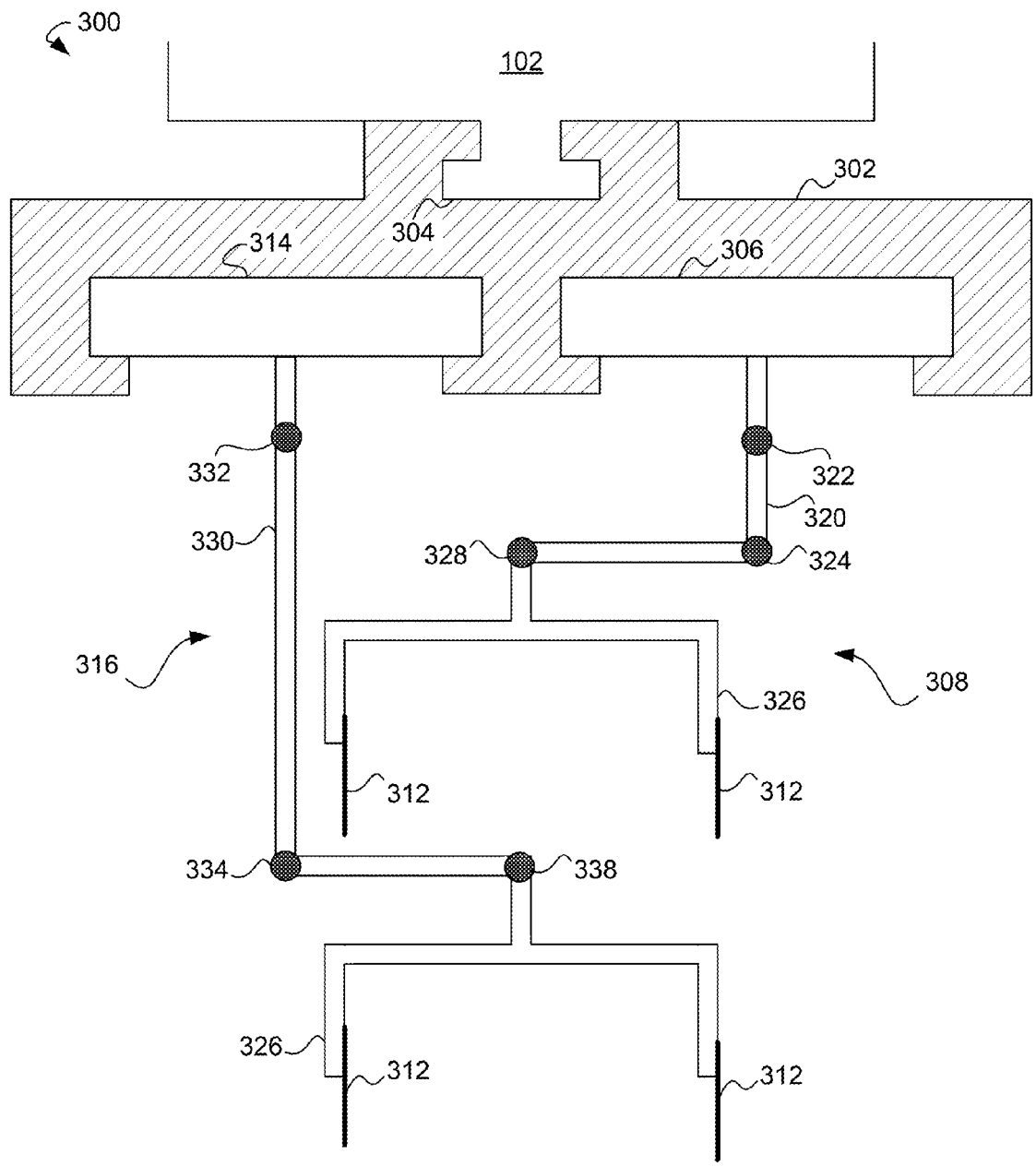
FIG. 3 is a rear view of various embodiments of a pass over ambulatory vehicle, according to various embodiments of the invention.

FIG. 3 depicts various embodiments of an ambulatory vehicle 300 configured to transport a load 102 from a first location to a second location along a travel surface. The leg assemblies of the ambulatory vehicle 300 are configured to pass over or under each other while exchanging places. The ambulatory vehicle 300 comprises a beam assembly 302 and leg assemblies 308 and 316. The beam assembly 302 comprises a load rail 304, a first leg rail 306, and a second leg rail 314. The load rail 304 is configured to allow a load 102 to shift along a length of the beam assembly 302 to maintain the center of gravity of the ambulatory vehicle 300.

The first leg assembly 308 and the second leg assembly 316 function in similar manners during locomotion and may have nearly identical stances. Both the first leg assembly 308 and the second leg assembly 316 are configured to independently support the ambulatory vehicle 300, either statically or dynamically and retract or extend during locomotion. However, a portion of the first leg assembly 308 is configured to pass over or under a portion the second leg assembly 316. Similarly, a portion of the second leg assembly 316 is configured to pass over or under a portion the first leg assembly 308. In the depicted embodiment, the first leg rail 306 is in the same horizontal plane as the second leg rail 314. In alternative embodiments, the first leg rail 306 and the second leg rail 314 may be vertically offset to decrease the overall width of the ambulatory vehicle 300. The following description applies equally to the first leg assembly 308 and the second leg assembly 316.

The first leg assembly 308 includes a first shaft 320, a first upper gimbal joint 322, a first lower gimbal joint 324, a first central gimbal joint 328, legs 326, and optional feet 312. The first leg assembly 308 is coupled to the first leg rail 306 for moving along the length of the beam assembly 302. The first shaft 320 may extend and retract. The first upper gimbal joint 322, the first lower gimbal joint 324, and the first central gimbal joint 328 are configured to rotate around a vertical and/or horizontal axis. The first leg assembly 308 includes features below the first upper gimbal joint 322 that are configured for supporting the load 102 and the beam assembly 302. For example, the first leg assembly 308 as illustrated further includes two legs 326 and two sets of optional feet 312.

The second leg assembly 316 similarly includes a second shaft 330, a second upper gimbal joint 332, a second lower gimbal joint 334, a second central gimbal joint 338, two legs 336, and optional feet 312. The second leg assembly 316 is coupled to the second leg rail 314 for moving along the length of the beam assembly 302. The second shaft 330 may extend and retract. The second upper gimbal joint 332 and the second lower gimbal joint 334 are configured to rotate around a vertical and/or horizontal axis. The first central gimbal joint 328 and/or the second central gimbal joint 338 may be disposed along a vertical axis of the beam assembly 302. The first rail 306 and the second leg rail 314 are illustrated in FIG. 3 as disposed in a side-by-side orientation on either side of the vertical axis of the beam assembly 302. However, a person having ordinary skill in the art will recognize that the second leg rail 314 may be positioned above the first rail 306 and vice versa. In some embodiments, the first rail 306 may be positioned over the second leg rail 314 (not illustrated). Moreover, the first rail 306 and the second leg rail 314 may intersect the vertical axis of the beam assembly 302 (not illustrated).

Like the "pass through" embodiments (e.g., those embodiments illustrated by the ambulatory vehicle 100), the feet 312 are configured to contact the travel surface and provide stability. As in the "pass through" embodiments, the legs 326 and/or legs 336 in the "pass over" version may retract and extend, for example by telescoping. The first shaft 320 and/or the second shaft 330 may retract and extend, for example, by telescoping. Referring to FIG. 3, the first shaft 320 is illustrated as retracted and the second shaft 330 is illustrated as extended. Retracting the first shaft 320 and/or extending the second shaft 330 configures portions of the first leg assembly 308 to pass over the second leg assembly 316. Similarly, retracting the second shaft 330 and/or extending the first shaft 320 configures the second leg assembly 316 to pass over the first leg assembly 308 (not illustrated).

In some embodiments, the first upper gimbal joint 322 may rotate the first shaft 320 to an oblique angle or horizontal with respect to the longitudinal axis of the beam assembly 302. The rotation of the first shaft 320 may position the legs 326 of the first leg assembly 308 above the legs 336 of the second leg assembly 316. Similarly, the second upper gimbal joint 332 may rotate the second shaft 330 to an oblique angle or horizontal with respect to the longitudinal axis of the beam assembly 302. The rotation of the second shaft 330 may position the legs 336 of the second leg assembly 316 above the legs 326 of the first leg assembly 308.

FIGS. 4 through 11 and their respective subfigures represent various modes of locomotion that may be performed by the "pass through" embodiments of the ambulatory vehicle, e.g., ambulatory vehicle 100 in which a first leg assembly 112 is configured to pass through the second legs 222 of the second leg assembly 116. The steps illustrated in each of these figures may be modified to provide locomotion of the "pass around" embodiments (e.g., those embodiments illustrated by ambulatory vehicle 300). Similarly, the steps illustrated in these figures may be modified to provide locomotion of the "pass over" embodiments, e.g., discussed with respect to FIG. 3. FIGS. 4 and 5 depict continuously stable locomotion along a substantially flat travel surface. FIG. 6 depicts a movement used to turn the ambulatory vehicle 100. FIG. 7 depicts stable movement up a set of stairs. FIG. 8 depicts a gait for traveling in a sideways manner that may be used for climbing or descending slopes.

FIGS. 9 through 11 depict dynamic gaits that utilize kinetic energy and, unlike continuously stable locomotion, rely on kinetic energy to achieve stability. FIG. 9 depicts a striding gait. FIG. 10 depicts a trotting gait. FIG. 11 depicts a bounding gait.

FIGS. 4A through 4L and FIGS. 5A through 5L depict a sequence of movements used by the pass through embodiments, e.g., ambulatory vehicle 100, during walking locomotion along a substantially flat travel surface. The locomotion is appropriate for, for example, rough terrain, areas that require tight maneuvering, and/or fragile terrain. While walking, the ambulatory vehicle 100 remains statically stable, i.e., the ambulatory vehicle 100 will remain in place and upright if motion is suddenly stopped or no longer possible. For each step, a side view of the ambulatory vehicle 100 followed by a top view of the same step are shown. In these figures, the direction of travel or locomotion is directed to the right of the page.

During walking, the load 102 shifts to maintain a center of gravity over the first leg assembly 112 (Walking Leg A) while the second leg assembly 116 and the beam assembly 108 shift in the direction of travel. FIGS. 4A through 4L depict the sequence of movements performed by the ambulatory vehicle 100 while the second leg assembly 116 acts as the supporting leg assembly and the first leg assembly 112 is moved. In this embodiment, the first leg assembly 112 passes through the second leg assembly 116.

Figures 4A, 4B, 4C, 4D:
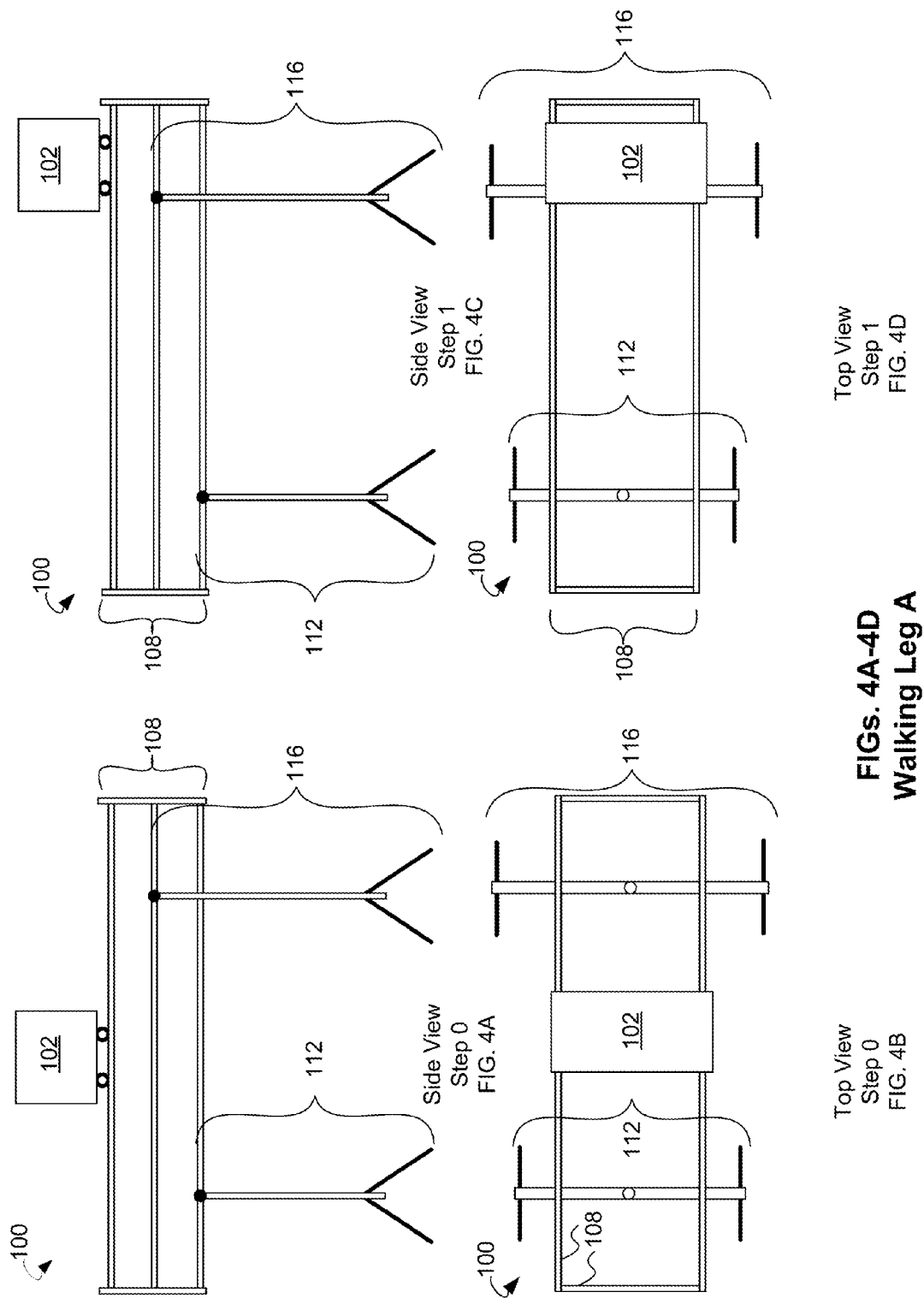
Figures 5A, 5B, 5C, 5D:
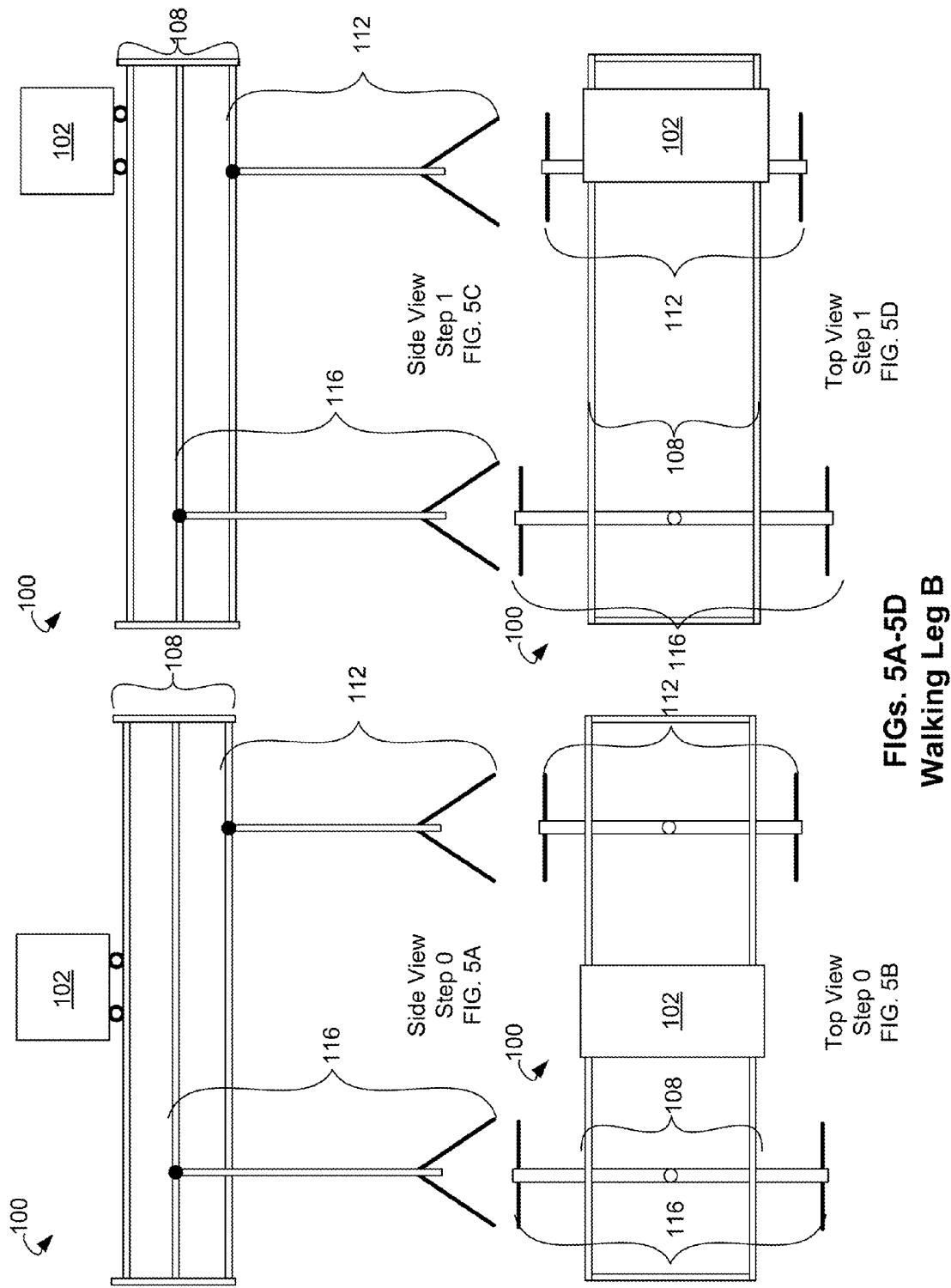

FIGS. 4A and 4B depict a starting position, step zero, in which the first leg assembly 112 and the second leg assembly 116 are both supporting the beam assembly 108 and the load 102. In this example, the load 102 is depicted as being approximately centered on the beam assembly. The first leg assembly 112 is located along the beam assembly 108 in a rearward position with respect to the direction of travel.

FIGS. 4C and 4D depict a step one of the continuously stable locomotion. In this step, the load 102 shifts on the beam assembly 108 to a location that is substantially over the second leg assembly 116. The location on the third track 106 is determined such that the center of gravity of the load 102, the beam assembly 108 and the first leg assembly 112 is over the second leg assembly 116, which supports the ambulatory vehicle 100. The first leg assembly 112 is therefore not required to support any significant amount of mass. The position of the load is dependent on its weight relative to the rest of the vehicle.

Figures 4E, 4F, 4G, 4H:
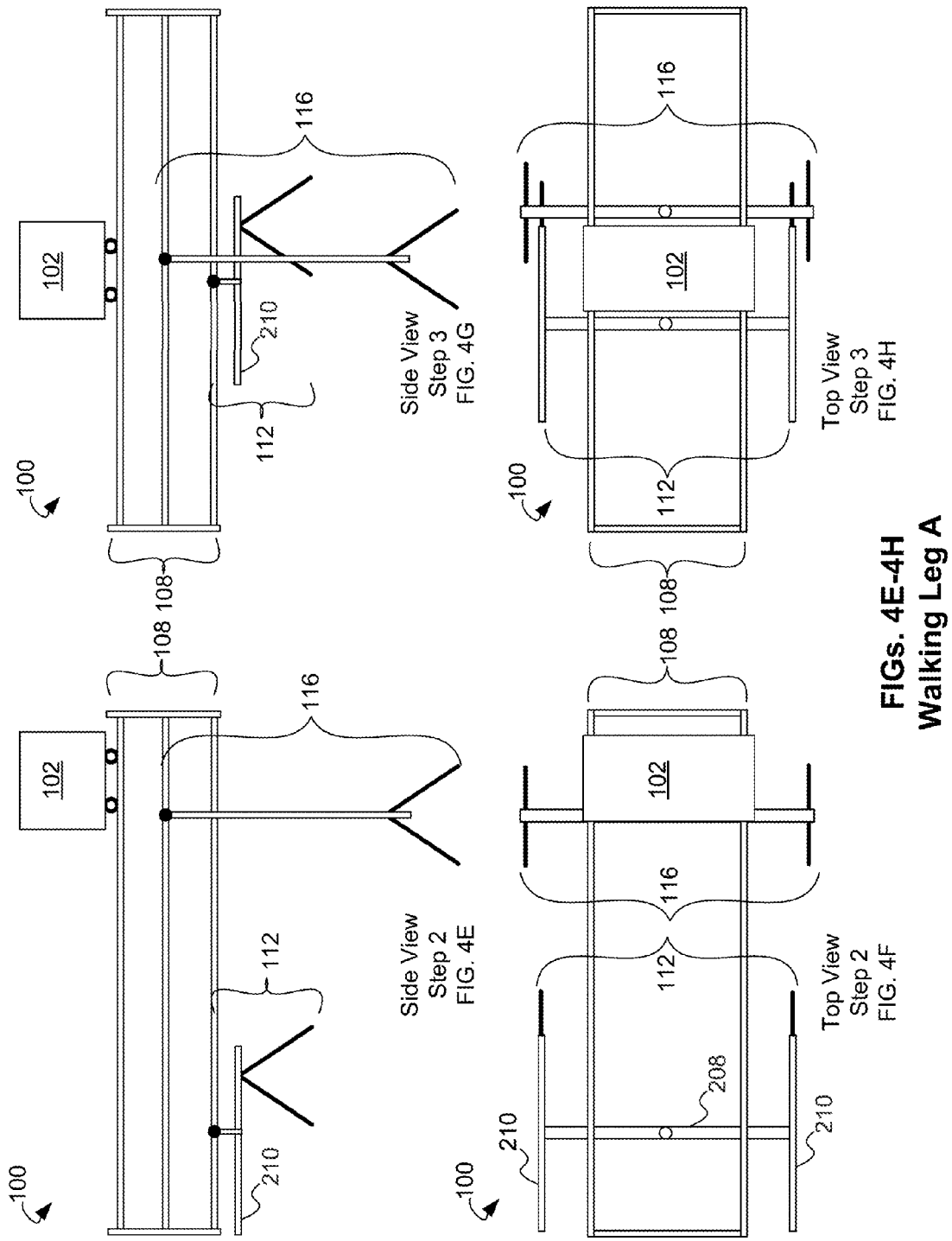

FIGS. 4E and 4F depict a step two of the statically stable locomotion, in which the first leg assembly 112 is retracted above the travel surface. In some embodiments, the first leg assembly 112 may rotate ninety degrees such that it is substantially parallel to the travel surface, however, any amount of rotation sufficient to clear the first leg assembly 112 from the travel surface may be used. Alternatively, the first leg 210 of the first leg assembly 112 may rise vertically rather than or in addition to rotation to clear the travel surface. In these embodiments, the first leg 210 may be configured to telescope. In the embodiment shown, for example, the first leg 210 is retracted approximately half its length above the travel surface and rotated about ninety degrees into position.

FIGS. 4G and 4H depict a step three of the continuously stable locomotion. In step three, the beam assembly 108 and the first leg assembly 112 shift in the direction of travel while the second leg assembly 116 supports the load 102, the beam assembly 108, and the first leg assembly 112. The second leg assembly 116 remains stationary with respect to the travel surface throughout this movement. The load 102 optionally shifts as needed along the length of the beam assembly 108 to maintain a center of gravity over the second leg assembly 116 while the beam assembly 108 and the first leg assembly 112 optionally shift a distance in the direction of travel approximately equal to a the length of the beam assembly 108. As shown in FIG. 4H, the first leg assembly 112 passes through or between the second leg assembly 116 approximately halfway through the shifting.

FIGS. 4I and 4J depict a step four of the continuously stable locomotion. This step occurs at the end of step three when the first leg assembly 112 and the beam assembly 108 have reached a final position along the travel surface. The first leg assembly 112 has exchanged places along the length of the beam assembly 108, now being in a forward position relative to the direction of travel. In this step, the second leg assembly 116 is still supporting the ambulatory vehicle 100. The first leg assembly 112, in a reverse of step two, rotates and/or extends to the travel surface.

FIGS. 4K and 4L depict a step five of the continuously stable locomotion. In this last step, the load 102 and the beam assembly 108 is supported by both the first leg assembly 112 and the second leg assembly 116. The load 102 is therefore able to shift back into a central position on the beam assembly. It should be noted that step five may occur as a transitory step between movements in a series of walking steps and that the load 102 may be located anywhere along the length of the beam assembly 108.

FIGS. 5A through 5L depict the continuously stable gait of the ambulatory vehicle 100 in which the first leg assembly 112 supports the ambulatory vehicle 100 while the second leg assembly 116 (Walking Leg B) moves along the length of the beam assembly 108. In this gait, second leg assembly 116 begins in the rearward position while the first leg assembly 112 is initially in the forward position and the second leg assembly 116 passes over the first leg assembly 112 while moving forward to exchange places with the first leg assembly 112. Like FIGS. 4A through 4L, the top view of the step is located below the side view on the figure sheet and is lettered subsequently to the side view. In these figures, the direction of travel or locomotion is to the right of the page.

FIGS. 6A through 6E depict a turning movement into the plane of the page by the ambulatory vehicle 100 during continuously stable locomotion. In these figures, travel is directed towards the right of the drawing sheet while the turning movement is directed into the plane of the drawing sheet. FIGS. 6A through 6E include side views of the first four steps. Steps five and six are depicted in FIGS. 6F through 6I in both side and front views. The third step is optional.

FIGS. 6A through 6D are substantially similar to steps zero through three of the continuously stable locomotion as depicted in FIGS. 5A through 5H. It should be noted that in FIG. 6D the load 102, the beam assembly 108, and the second leg assembly 116 are substantially centered over the first leg assembly 112, which is the supporting leg assembly.

FIG. 6E depicts the side view of the ambulatory vehicle 100 after a ninety degree rotation into the plane of the page which is step four. The rotation about the vertical axis is achieved using the gimbal joint 206 of the first leg assembly 112. The first leg 210 and first feet 212 remain stationary with respect to the travel surface throughout the rotation to support the load 102, the beam assembly 108, and the second leg assembly 116. It is understood that the rotation is not limited with respect to direction or magnitude.

FIGS. 6F and 6G depict a step five of the turn during continuously stable locomotion. The beam assembly 108 and the second leg assembly 116 shift, as shown, such that the first leg assembly 112 and the second leg assembly 116 have exchanged positions. In some instances, it may be desirable to not have the leg assemblies exchange positions or for the second leg assembly 116 to not shift along the beam assembly 108, such as in areas requiring tight maneuvering. The load 102 continues to shift along the length of the beam assembly 108 to maintain a center of gravity over the first leg assembly 112.

FIGS. 6H and 6I depict a step six of the turn during continuously stable locomotion after the second leg assembly has been rotated and/or extended to the travel surface. The load 102 is supported by both the first leg assembly 112 and the second leg assembly 116. As an additional optional step (not shown), the load 102 may be shifted over the second leg assembly 116 to allow the first leg assembly 112 to rise and/or rotate above the travel surface. The gimbal joint 206 may then rotate to bring the legs 210 in line with the beam assembly 108.

The turning steps depicted in FIG. 6A through 6I may be performed while the first leg assembly 112 is moved. In these embodiments, the second leg assembly 116 supports the ambulatory vehicle 100 while the turning steps are performed.

Figures 7A, 7B, 7C:
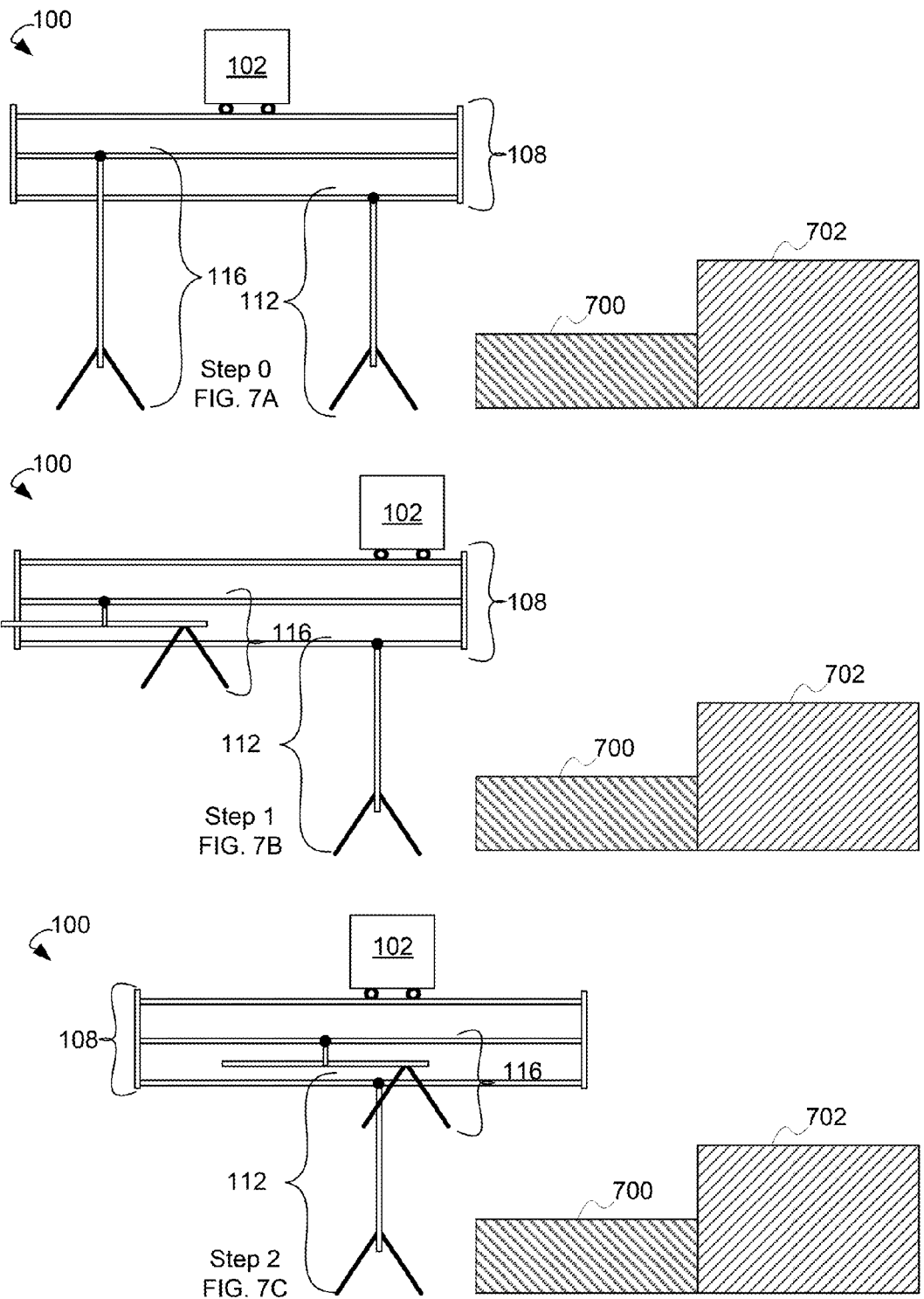

FIGS. 7A through 7L depict a series of steps for static movement of the ambulatory vehicle 100 up a set of stairs. The pass over embodiments, e.g. ambulatory vehicle 300, may be configured to navigate a set of stairs in a similar fashion. Additionally, these steps may substantially be performed in reverse to descend a set of stairs. This series of steps is not limited to navigating a set of stairs as these steps may generally be used on sloped, irregular, or inclined surfaces. FIGS. 7A through 7C depict the starting position and the first two steps during which the ambulatory vehicle 100 approaches the step. These figures are similar to the movements depicted in FIGS. 5A through 5H.

Figures 5I, 5J, 5K, 5L:
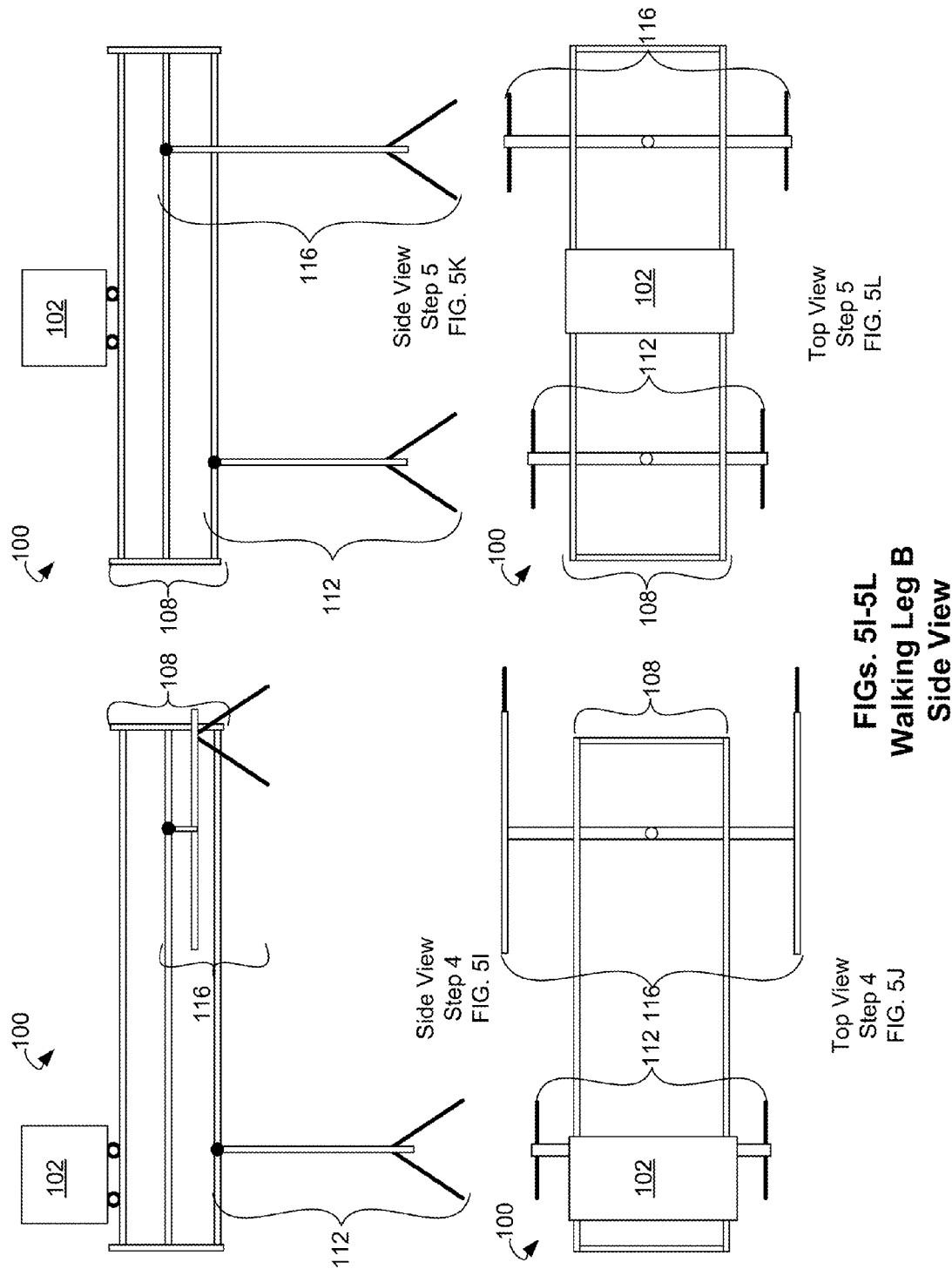

In FIG. 7D, as in FIGS. 5I and 5J, the second leg assembly 116 and the beam assembly 108 have completed shifting with respect to the first leg assembly 112, which has remained stationary with respect to the travel surface. The forward end of the beam assembly 108 has tilted upward.

In FIG. 7E, the fourth step in the series of movements, the second leg assembly 116 then extends down to first step 700. To continue stable movements, the load 102, in FIG. 7F, shifts up the inclined beam assembly 108 such that it is substantially supported by the second leg assembly 116, allowing the first leg assembly 112 to rise. To ascend to a second step 702, in FIG. 7G, the first leg assembly rises above the travel surface. In FIG. 7H, the first leg assembly 112 and the beam assembly 108 have shifted with respect to the second leg assembly 116 such that the first leg assembly 112 is over the second step 702.

In FIG. 7I, the eighth step depicted, the first leg assembly 112 has extended to the second step 702 and the center of gravity is still substantially centered over the second leg assembly 116. In step nine, as depicted in FIG. 7J, the load 102 shifts along the length of the beam assembly 108. The beam assembly 108, like in FIGS. 7E and 7F, is tilted in the direction of travel of the ambulatory vehicle 100. The center of gravity shifts until it is substantially centered over the first leg assembly 112 to allow the second leg assembly 116 to rise. In step ten, depicted in FIG. 7K, the second leg assembly 116 has risen from the first stair 700. It should be noted that the beam assembly 108 may shift during continuously stable locomotion while tilted, as depicted by the embodiment shown in FIGS. 7G and 7H, or alternatively, while substantially horizontal as depicted in FIGS. 7K and 7L. FIG. 7L depicts the ambulatory vehicle 100 on the stairs at the point where the load 102, the beam assembly 108 and the second leg assembly 116 are substantially aligned. At this point, the ambulatory vehicle 100 may execute a turning movement into or out of the page, as depicted in FIGS. 6A through 6I.

FIGS. 8A through 8K depict a series of movements used to climb up or down a steep gradient. In these movements, unlike the previous movements, the first leg assembly 112 and the second leg assembly 116 do not necessarily exchange places with one another during locomotion. FIGS. 8A through 8K are top views of the ambulatory vehicle 100.

Figures 8A, 8B, 8C, 8D, 8E, 8F:
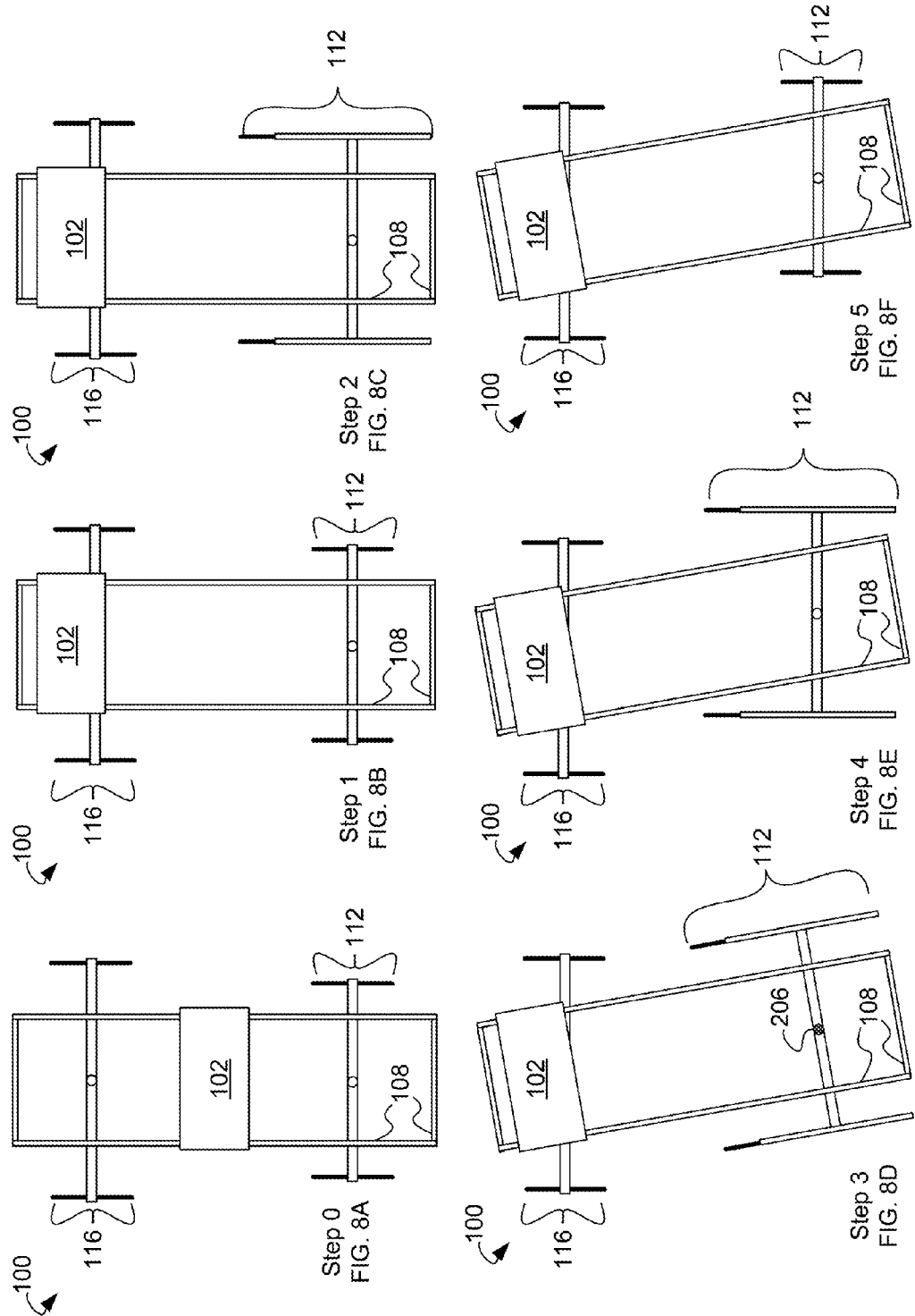

FIG. 8A is a top view of the initial position of the ambulatory vehicle 100. This is similar to the starting positions depicted in FIGS. 4A, 5A, 6A, and 7A. In FIG. 8B, step one, the load 102 shifts such as the center of gravity is over the second leg assembly 116. The first leg assembly 112 is then able to rise, as depicted in FIG. 8C.

In a step three, as depicted in FIG. 8D, the beam assembly 108, the load 102, and the first leg assembly 112 rotate on the second leg assembly 116. The rotation is typically less than 180 degrees in the direction of travel. In optional step four, as depicted in FIG. 8E, the first leg assembly 112 rotates about the gimbal joint 206 such that it is again substantially parallel to the second leg assembly 116. In FIG. 8F, the first leg assembly 112 extends to the travel surface.

To continue traveling, the ambulatory vehicle 100 repeats the movements depicted in FIGS. 8A through 8F except that the second leg assembly 116 moves while the first leg assembly 112 supports the ambulatory vehicle 100. In FIG. 8G the load 102 shifts over the first leg assembly 112 allowing the second leg assembly 116 to rise as depicted in FIG. 8H. In FIG. 8I, the beam assembly 108, the second leg assembly 116 and the load 102 rotate with respect to the first leg assembly 112. As depicted in FIG. 8J, the second leg assembly 116 may rotate back into a position that is substantially parallel to the first leg assembly. In step ten, depicted in FIG. 8K, the second leg assembly 116 extends to the travel surface.

FIGS. 9A through 9I, 10A through 10H, and 11A through 11H depict dynamic gaits that can be performed by the ambulatory vehicle 100. These gaits use kinetic energy created during forward movement to increase the energy efficiency of the ambulatory vehicle 100 and to maintain stability. In the dynamic gaits, turning is performed when one leg assembly is supporting the ambulatory vehicle 100. To turn, the beam assembly 108 rotates around the vertical axis of the gimbal mount of the supporting leg assembly. It is understood that the pass over ambulatory vehicle 300 may also be able to perform these gaits or substantially similar gaits.

Figures 9A, 9B, 9C, 9D, 9E, 9F, 9G, 9H, 9I:
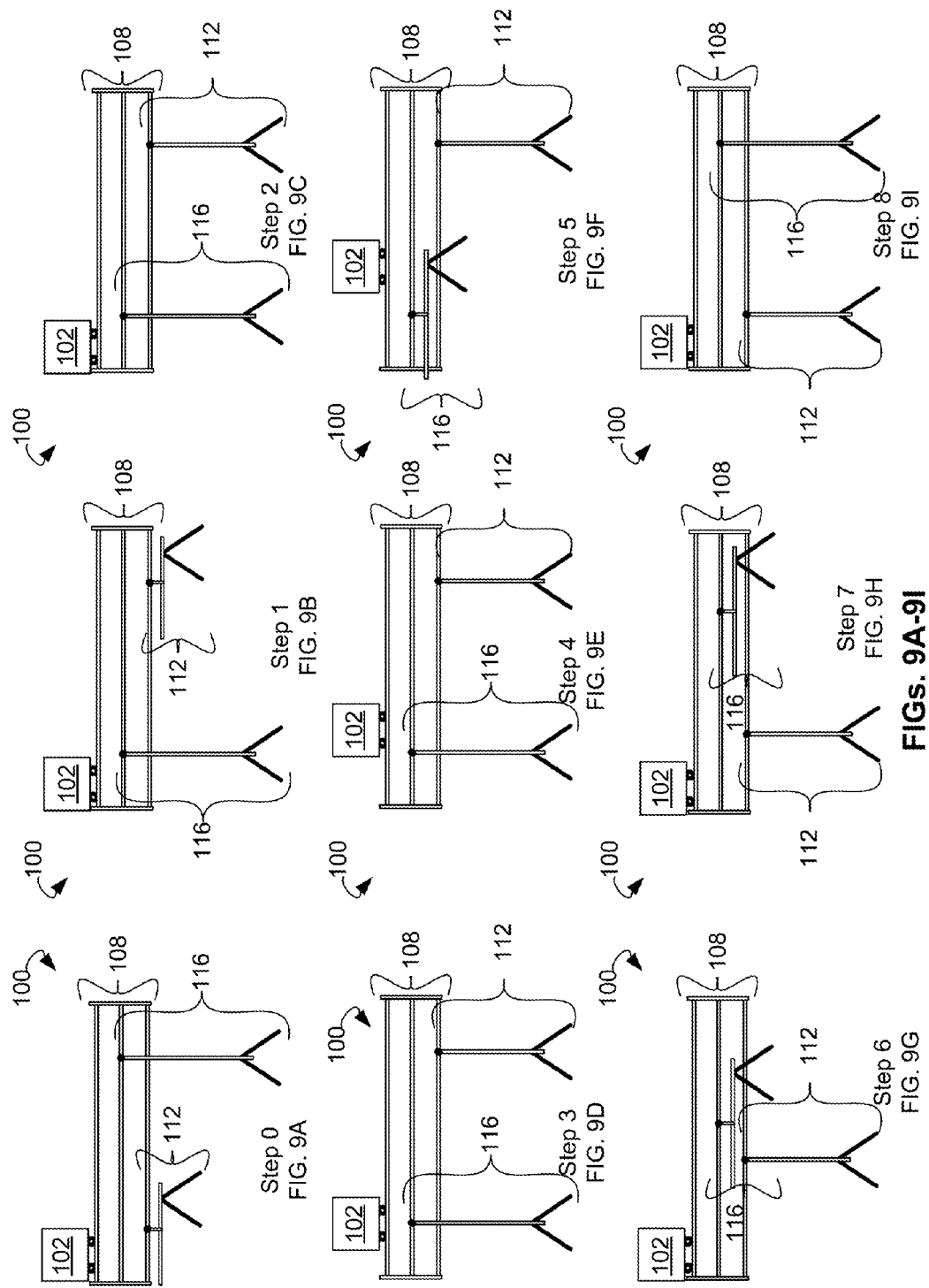
FIGS. 9A through 9I depict side views of a series of steps used in striding, according to various embodiments of the invention.
Figures 11A, 11B, 11C, 11D, 11E, 11F, 11G, 11H:
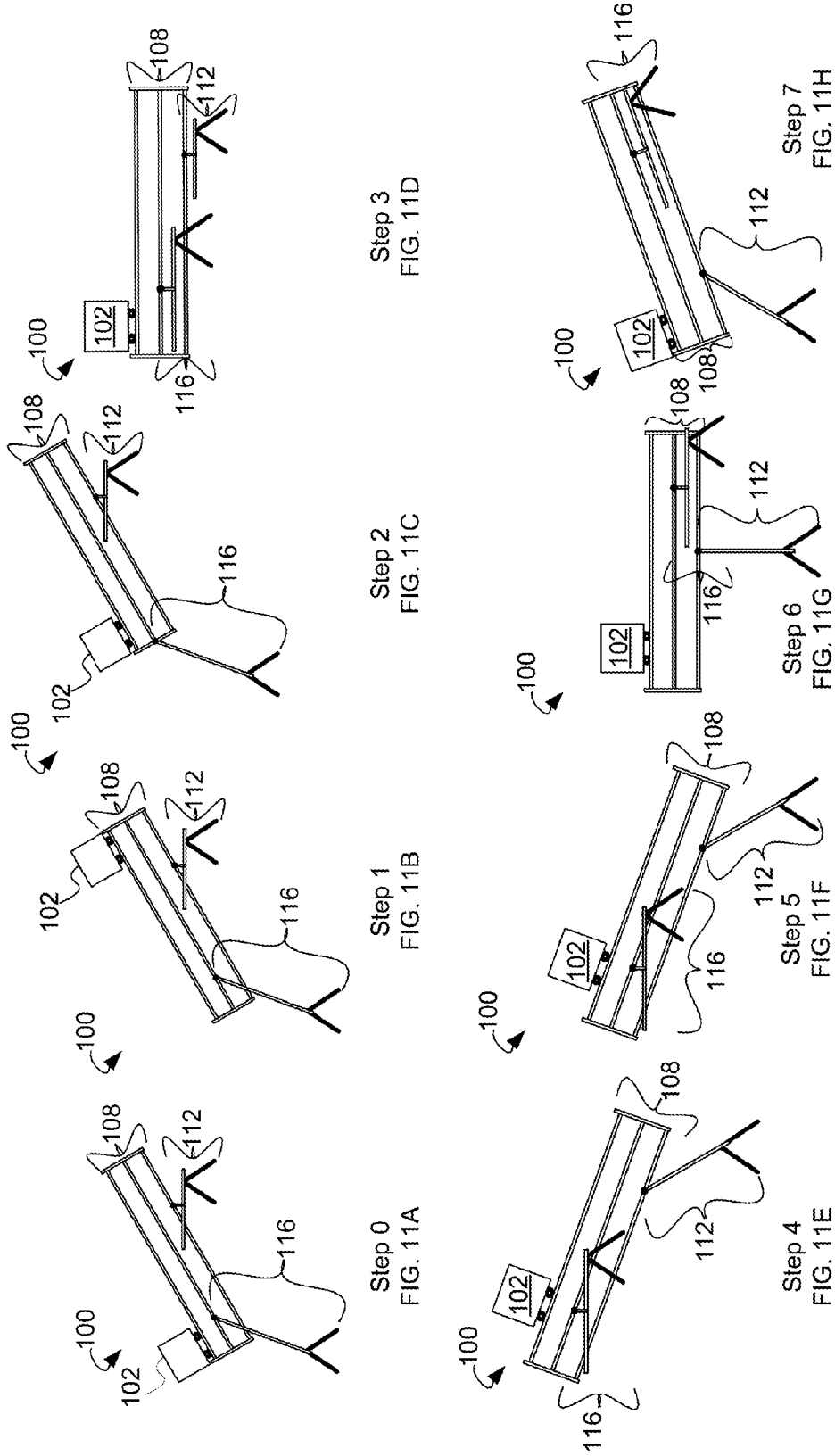
FIGS. 11A through 11H depict side views of a series of steps used in bounding, according to various embodiments of the invention.

FIGS. 9A through 9I depict a striding gait. The striding gait is already underway in FIG. 9A where the second leg assembly 116 is partly supporting the ambulatory vehicle 100 while braking of load 102 and beam assembly 108 also contributes to its support. The first leg assembly 112 is also moving forward. In FIG. 9B the load 102, the first leg assembly 112, and the beam assembly 108 continue to be shifted forward with respect to the travel surface by their remaining kinetic energy such that the first leg assembly 112 exchanges places with the second leg assembly 116, depicted in FIG. 9B. In FIG. 9C, the first leg assembly 112 extends and load 102 begins to accelerate.

FIG. 9D and FIG. 9E depict continuing acceleration of the load 102 forward. In FIG. 9F, braking of load 102 creates a force against beam assembly 108 in the forward direction, which creates enough lifting force on the back end of beam assembly 108 so second leg assembly 116 no longer supports the beam assembly 108 and can be retracted. The force exerted by load 102 from the continued braking is used in step 6, FIG. 9G, to move the beam assembly 108 and the second leg assembly 116 forward with respect to the first leg assembly 112. At the completion of the forward movement, the second leg assembly 116 has exchanged places with the first leg assembly 112, as shown in FIG. 9H. In the final step, FIG. 9I, the second leg assembly 116 extends to the travel surface and load 102 begins accelerating to prepare for the braking which begins as the cycle is repeated.

FIGS. 10A through 10H depict a second dynamic gait referred to herein as trotting, according to various embodiments of the invention. Trotting is similar to striding but includes decelerating load 102 downwards to force the second leg assembly 116 downwards to increase the traction of the second leg assembly 116.

Trotting comprises two phases. FIGS. 10A through 10F depict the first trotting phase and the second trotting phase is depicted in FIGS. 10G and 10H. The phases are nearly identical, except the positions of the first leg assembly 112 and the second leg assembly 116 steps are reversed during the second phase.

During step zero, shown at completion in FIG. 10A, the trotting gait is underway and the load 102 continues the deceleration of a preceding step by braking against the beam assembly 108, which in turn brakes against the supporting second leg assembly 116. The beam assembly 108 continues to rotate counter-clockwise around the horizontal axis of the gimbal mount of supporting second leg assembly 116 while advancing forward with respect to the second leg assembly 116. (Clockwise and counter-clockwise references herein are with respect to motion in the plane of the page.)

During step one, the load 102 is rearward of the second leg assembly 116 and continues the deceleration of step zero in a downward and forward path, and remains at the trailing end of beam assembly 108 at the completion of step one. The retracted first leg assembly 112 moves forward with the beam assembly 108 in the direction of travel.

During step two, the load 102 advances toward the forward end of the beam assembly 108 until a "tipping point" is reached such that the deceleration of the load 102 creates a clockwise moment and the front of the beam assembly 108 begins to tilt toward the travel surface. The first leg assembly 112 shifts to the forward end of the beam assembly 108 and extends toward the travel surface. Just before the first leg assembly 112 contacts the travel surface, the load 102 accelerates to create enough of a counter-clockwise moment so the force exerted by the contact is controlled.

During step three, the ambulatory vehicle 100 is supported by both leg assemblies and the load 102 accelerates forward along the beam assembly 108. During step four, the load 102 brakes to create a clock-wise moment around the feet of the first leg assembly 112, so that the ambulatory vehicle 100 is supported solely by the first leg assembly 112.

During steps 5 and 6, the second leg assembly 116 is retracted and the deceleration of the load 102 decreases to control the descent of the trailing end of the beam assembly 108 and counter-clockwise rotation of the beam assembly 108 around the horizontal axis of the gimbal mount of the first leg assembly 112 until the beam assembly 108 is at a prescribed declination below horizontal.

During step six, the beam assembly 108 and the load 102 continue decelerating and the beam assembly 108 continues rotating counter-clockwise around the horizontal axis of the gimbal mount of the first leg assembly 112 while advancing forward with respect to the first leg assembly 112. At completion, the front end of the beam assembly 108 has a slightly increased front elevation. The load 102, deposed rearward of the first leg assembly 112 throughout this step, continues decelerating in a downward and forward path until reaching the trailing end of the beam assembly 108. The retracted second leg assembly 116 moves forward until reaching the forward end of the beam assembly 108.

The first phase is complete and the second phase has begun as step seven is substantially identical to step one, except that the first leg assembly 112 and the second leg assembly 116 have exchanged places. The ambulatory vehicle 100 can continue dynamic locomotion using steps two through seven, except that the roles of the first leg assembly 112 and the second leg assembly 116 are reversed.

Throughout these phases of locomotion, the movements of auxiliary loads (not shown) may be coordinated with the movements of the other components of the ambulatory vehicle 100 so that the progress of the auxiliary loads during locomotion is smooth and continuous and the utilization of the kinetic energy of each auxiliary load is consistent with that of the other components.

Steering of the ambulatory vehicle 100 is performed when one leg assembly supports the ambulatory vehicle 100 and the beam assembly 108 rotates around the vertical axis of the gimbal mount of the supporting leg assembly. If necessary, the ambulatory vehicle 100 will appropriately tilt toward the inside of a turn, appropriately decreasing the length(s) of the inside leg(s), to handle centrifugal forces generated by the turning movement to maintain stability. Similarly, ascending and descending grades and steps are performed by further rotating the beam assembly 108 around the horizontal axis of the gimbal mount of the supporting leg assembly. Modifications apparent to one skilled in the art of the preceding steps to utilize the generated kinetic energy are required to steer the ambulatory vehicle 100 and navigate steps.

FIGS. 11A through 11H depict a bounding gait performed by the ambulatory vehicle 100, according to various embodiments of the invention. There are two phases to bounding vehicle locomotion. FIGS. 11A through 11G depict the steps in bounding phase 1. Only the first step of bounding phase 2 is shown, in FIG. 11H. The phases are nearly identical, except that the positions of the first leg assembly 112 and the second leg assembly 116 are reversed.

During step zero, the beam assembly 108 continues the deceleration of a preceding step while rotating counter-clockwise around the horizontal axis of the gimbal mount of the second leg assembly. The load 102, positioned to the rear of the first leg assembly 112 throughout this step, also continues the deceleration of the preceding step in a downward and forward path and reaches the rear end of the beam assembly 108. The legs of the second leg assembly 116 tilt forward at the top so the feet are nearly under the load 102. As in the preceding step, the retracted first leg assembly 112 is disposed at the forward end of the beam assembly 108. Step zero ends with the start of the acceleration of the load 102 forward and upward on the beam assembly 108, which forces the feet of the second leg assembly onto the terrain and increases their traction. The forward acceleration of the load 102 also exerts a counter-clockwise moment around the horizontal axis of the gimbal mount of the second leg assembly 116 which will somewhat increase the elevation of the beam assembly 108.

Step one is complete when the load 102 has achieved its maximum velocity along the beam assembly 108 and is nearing its forward end. The weight of the load will exert a clockwise moment around the horizontal axis of the gimbal mount of the second leg assembly 116, which will decrease the elevation of the beam assembly 108.

During step two, the second leg assembly 116 rapidly accelerates the ambulatory vehicle 100 upward and forward by acting on the beam assembly 108. Simultaneously, the load 102 utilizing kinetic energy generated in the preceding step, contributes by rapidly accelerating the ambulatory vehicle 100 upward and forward by acting on the beam assembly 108. The forward acceleration of the beam assembly 108 initially exerts a clockwise moment around the horizontal axis of the gimbal mount of the second leg assembly, which will decrease the elevation of the beam assembly 108. The weight of the load 102 will also exert a clockwise moment. These moments will partially reverse the counter-clockwise moment of step zero. As the second leg assembly 116 nears the rear end of the beam assembly 108, it decelerates and comes to rest at the end, as does the load 102 relative to the beam assembly 108. The feet of the second leg assembly 116 leave the terrain surface as the acceleration of the beam assembly 108 completes and the ambulatory vehicle 100 enters a trajectory.

During step three, the second leg assembly 116 retracts and the ambulatory vehicle 100 reaches the apogee of its trajectory.

During step four, the ambulatory vehicle 100 descends towards the end of its trajectory and the first leg assembly 112 extends and tilts forward at the bottom in preparation for landing.

During step five, the first leg assembly 112 contacts the travel surface and begins decelerating the beam assembly 108 by braking on the beam assembly 108. The load 102 begins decelerating by braking on the beam assembly 108.

During step six, the load 102 continues to decelerate while the beam assembly 108 and the retracted second leg assembly 116 accelerate forward, both creating a net clockwise moment around the feet of the first leg assembly 112, whose legs rotate clockwise to a vertical position. The ambulatory vehicle 100 is now supported solely by the first leg assembly 112, without being tilted backwards by the weight of the load 102.

During step seven, the beam assembly 108 continues the deceleration of the preceding step by rotating counter-clockwise around the horizontal axis of the gimbal mount of the first leg assembly 112. The load 102, to the rear of the first leg assembly 112, also continues the deceleration of the preceding step in a downward and forward path until it reaches the rear end of the beam assembly 108. The legs of the first leg assembly 112 tilt forward so the feet are nearly under the load 102. As in the preceding step, the retracted second leg assembly 116 is at the forward end of the beam assembly 108. Step seven ends with the start of the acceleration of the load 102 forward and upward on the beam assembly 108, which forces the feet of the second leg assembly 116 onto the terrain and increases their traction.

At this point, the first phase has been completed and the second phase has started, since the completed step seven is the same as step zero, except that the first leg assembly 112 and the second leg assembly 116 are interchanged. The ambulatory vehicle 100 can continue dynamic locomotion with steps depicted in the first phase, except that the first leg assembly 112 and the second leg assembly 116 are interchanged.

Throughout all phases of locomotion, the movements of auxiliary loads (not shown) may be coordinated with the movements of the other components of the ambulatory vehicle 100 so that the progress of the auxiliary loads during locomotion is smooth and continuous and the utilization of the kinetic energy of each auxiliary load is consistent with that of the other components.

Steering is performed upon takeoff and/or landing when one leg assembly supports the ambulatory vehicle 100 and the beam assembly 108 rotates around the vertical axis of the gimbal mount of the supporting leg assembly. If necessary, the ambulatory vehicle 100 will appropriately tilt toward the inside of a turn to handle centrifugal forces generated by the turning movement to maintain stability. Similarly, ascending and descending grades and steps are performed by further rotating the beam assembly 108 around the horizontal axis of the gimbal mount of the supporting leg assembly. Modifications apparent to one skilled in the art of the preceding steps to utilize the generated kinetic energy are required to steer the ambulatory vehicle 100 and navigate steps.

Figure 12A:
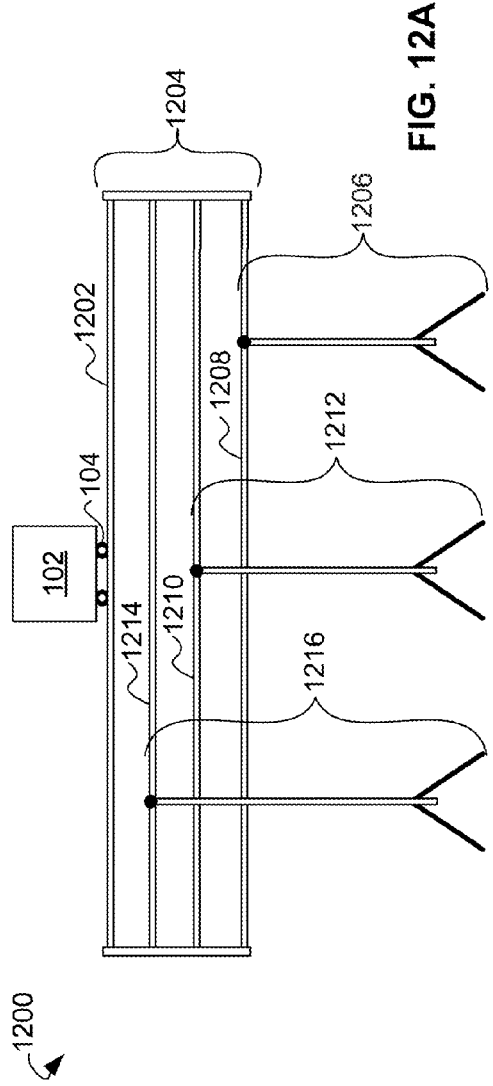
FIGS. 12A through 12B depict side views of various embodiments of three-legged vehicles, according to various embodiments of the invention.
Figure 12B:
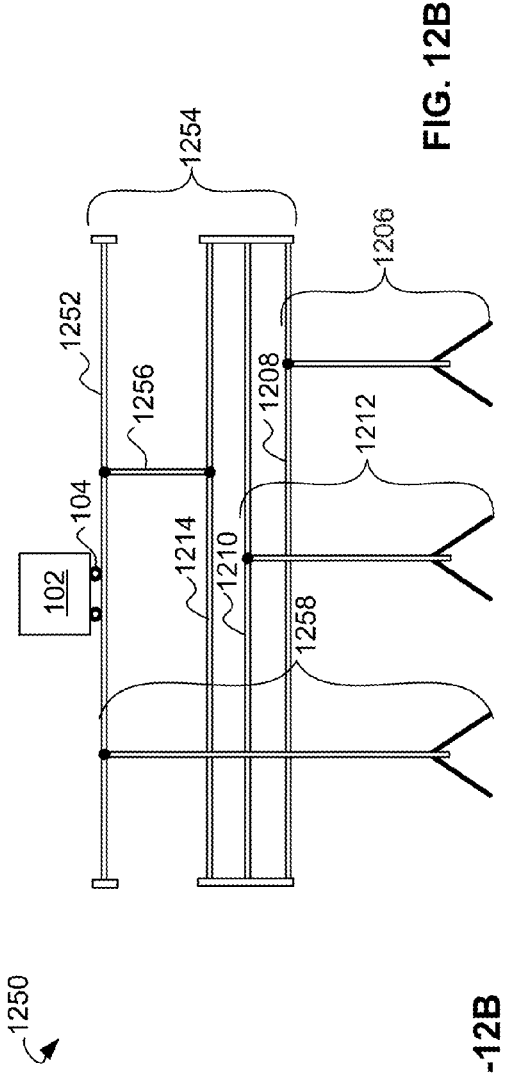

FIGS. 12A and 12B depict various embodiments of pass through ambulatory vehicles 1200 and 1250, respectively, comprising three leg assemblies that are able to exchange places with one another. A third leg assembly may be desirable in embodiments requiring extra stability or an ability to carry heavier loads. In these embodiments, the center of gravity of the vehicle is optionally supported by at least two leg assemblies. The leg assemblies are substantially similar to the first leg assembly 112 and the second leg assembly 116 depicted in FIGS. 2A and 2B. An ambulatory vehicle 1250 comprises an additional support configured to support a load. The ambulatory vehicle 1200 and the ambulatory vehicle 1250 may alternatively comprise leg assemblies that pass around or over rather than pass through each other while exchanging ends along the length of the beam assembly.

FIG. 12A depicts ambulatory vehicle 1200 having a movable center of gravity and comprising a load 102 disposed on rollers 104, the rollers 104 configured to shift along a fourth track 1202 extending a length of a beam assembly 1204. A first leg assembly 1206, a second leg assembly 1212, and a third leg assembly 1216 are substantially similar to each other. For the most part, the descriptions of the first leg assembly 1206 elsewhere herein apply to the second leg assembly 1212 and the third leg assembly 1216.

The first leg assembly 1206 is configured to rise above a travel surface and shift along a first track 1208 of the beam assembly 1204 to exchange places with one or both other leg assemblies. The first leg assembly 1206 may be able to independently support the ambulatory vehicle 1250. Alternatively, the first leg assembly 1206 is configured to support the ambulatory vehicle 1200 together with another leg assembly (i.e., the second leg assembly 1212 or the third leg assembly 1216).

The lower traverse of each leg assembly is configured to allow the other leg assemblies to exchange places along the length on the beam assembly 1204 along their respective tracks. For example, the second leg assembly 1212, configured to shift along the second track 1210, has a wider lower traverse than the first leg assembly 1206, enabling the first leg assembly 1206 to pass through the second leg assembly 1212. Likewise, the third leg assembly 1216, configured to shift along a third track 1214, has the widest lower traverse of the three leg assemblies. Thus, both the first leg assembly 1206 and the second leg assembly 1212 are able to pass through the third leg assembly 1216.

FIG. 12B depicts an ambulatory vehicle 1250 comprising a first leg assembly 1206, a second leg assembly 1212, a third leg assembly 1258 and a support 1256 for the load 102. The load 102 is configured to shift on the rollers 104 along the length of a fourth track 1252 of a beam assembly 1254, to maintain the position of the center of gravity of the ambulatory vehicle 1250. The fourth track 1252 and the load 102 are further supported by support 1256. The support 1256 is configured to shift along the length of the beam assembly between the third track 1214 and the fourth track 1252. The support 1256 may be coupled to the fourth track 1252 using a gimbal joint. The support 1256 may additionally exchange places with the leg assemblies along the length of the beam assembly during locomotion.

The third leg assembly 1258 is configured to shift along the fourth track 1252 of the beam assembly 1254 rather than the third track 1214 as discussed in previous embodiments. The first leg assembly 1206 of the ambulatory vehicle 1250 is substantially similar to first leg assembly 1206 of the ambulatory vehicle 1200 and shifts along the first track 1208 of the beam assembly 1254. The second leg assembly 1212 is substantially similar to the second leg assembly 1212 of the ambulatory vehicle 1200 and shifts along the second track 1210 of the beam assembly 1254. As discussed herein, the leg assemblies are configured to exchange places along the length of beam assembly 1254 during locomotion.

Turning movements performed by the ambulatory vehicle 1200 during continuously stable locomotion may be accomplished by initially shifting the vehicle components such that the center of gravity of the vehicle is supported by one leg assembly. The remaining vehicle components may be allowed to rise from the surface. Other movements of vehicle components may be accomplished in a similar manner to the corresponding movements of the ambulatory vehicle 100.

Turning movements by the ambulatory vehicle 1250 during continuously stable locomotion may be accomplished by initially supporting the center of gravity of the vehicle using leg assemblies 1206 and 1212. The leg assembly 1258 may be allowed to rise from the surface to clear the third track 1214. The fourth track 1252 and the third leg assembly 1258 may extend through the gimbal joint of the support 1256. The Load 102 may be shifted along the fourth track 1252 so that the fourth track 1252, the third leg assembly 1258, and the load 102 may be balanced about the gimbal joint of the support 1256. The support 1256 may be shifted along the third track 1214 so the vehicle center of gravity remains between the first leg assembly 1206 and the second leg assembly 1212. The fourth track 1252 may be rotated about the gimbal joint of support 1256 until it achieves a new heading and elevation. The third leg assembly 1258 may be lowered to the travel surface.

The vehicle components may then be shifted along the four tracks. The leg assembly farthest from the third leg assembly 1258 (e.g., the leg assembly 1206) may be lifted from the travel surface. In some embodiments, the leg assembly 1206 may be bearing a reduced amount of weight or no weight as it is lifted from the travel surface. A portion of the beam assembly 1254 including the first three tracks may be rotated about the gimbal mounts of supporting leg assembly (e.g., leg assembly 1212) and the gimbal mount of support 1256. Such rotation allows the rotated portion of the beam assembly 1254 to project through the legs of the leg assembly 1258 in a forward direction. Concurrently, the currently the non-supporting leg assembly 1206 may be shifted along its track until it is beyond the support leg assembly 1212. Also concurrently, other vehicle components may be shifted such that the vehicle center of gravity remains between the supporting two leg assemblies. The non-supporting leg assembly 1206 may be lower to the travel surface. The turning movement of ambulatory vehicle 1250 is thereby completed.

FIGS. 13A through 13I depict a side view of a series of steps used by the ambulatory vehicle 1200 during walking locomotion where the direction of travel is to the right of the page. These steps may also be performed by the ambulatory vehicle 1250. Like the walking locomotion depicted in FIGS. 4A through 4L and FIGS. 5A through 5L, the ambulatory vehicle remains statically stable throughout each step of the locomotion.

Figures 13A, 13B, 13C, 13D, 13E, 13F, 13G, 13H, 13I:
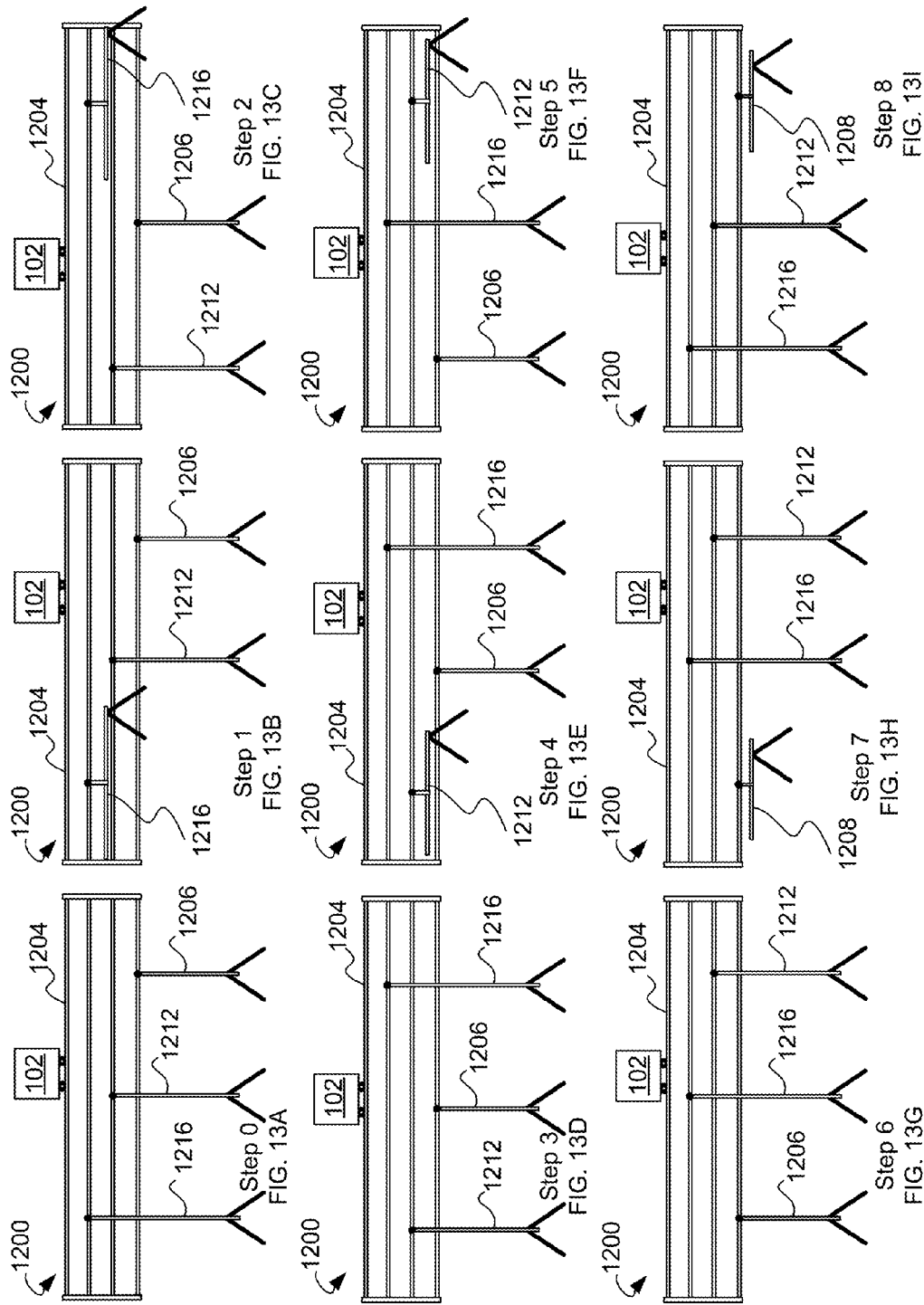
FIGS. 13A through 13I depict side views of a series of steps used by a three legged vehicle in walking locomotion, according to various embodiments of the invention.

FIG. 13A depicts a starting position, step zero, in which the load is supported by the first leg assembly 1206, the second leg assembly 1212, and the third leg assembly 1216, from left to right. In step one, depicted in FIG. 13B, the load 102 is shifted as needed between the first leg assembly 1206 and the second leg assembly 1212 to allow the third leg assembly 1216 to retract from the travel surface. FIG. 13C depicts step two in which the beam assembly 1204 and the third leg assembly 1216 have shifted in the direction of travel while the load 102 has shifted to maintain a center of gravity over the first leg assembly 1206 and the second leg assembly 1212. The third leg assembly 1216 has exchanged places with both the first leg assembly 1206 and the second leg assembly 1212 by moving from the rearward position in FIG. 13A to the forward position depicted in FIG. 13D.

FIG. 13D depicts step three of the walking locomotion where the load 102 may be supported by the first leg assembly 1206, the second leg assembly 1212, and/or the third leg assembly 1216. In step four, depicted in FIG. 13E, the load 102 has shifted into position between the first leg assembly 1206 and the third leg assembly 1216 along the length of the beam assembly 1254. The second leg assembly 1212, in the rearward position, rises above the travel surface to shift forward with the beam assembly 1204. As depicted in FIG. 13F, the second leg assembly 1212 exchanges places along the length of the beam assembly 1204 with the first leg assembly 1206 and the third leg assembly 1216.

In step 6, depicted in FIG. 13G, the load is again supported by the first leg assembly 1206, the second leg assembly 1212, and/or the third leg assembly 1216. In step seven, depicted in FIG. 13H, the load 102 shifts along the length of the beam assembly 1204 such that the first leg assembly 1206 in the rearward position is allowed to rise above the travel surface. In step 8, depicted in FIG. 13I, the first leg assembly 1206 and the beam assembly 1204 have shifted in the direction of travel such that the first leg assembly 1206 is in the forward position along the length of the beam assembly 1204. Thus, throughout the walking locomotion, each leg assembly has exchanged places with the other two leg assemblies along the length of the beam assembly 1204.

Figure 14:
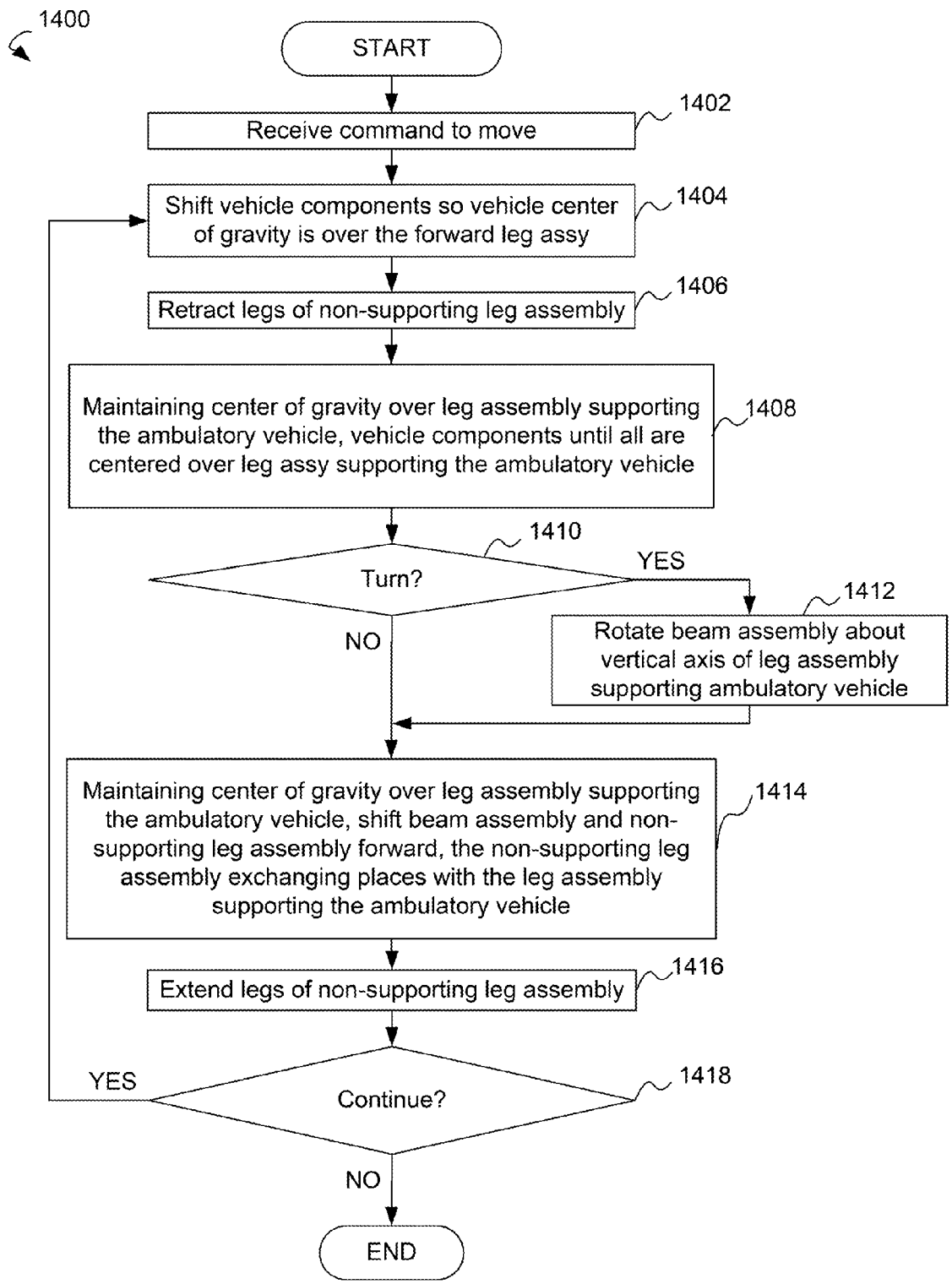
FIG. 14 is a flowchart depicting a method of walking, according to various embodiments of the invention.

FIG. 14 depicts a flowchart depicting a method of walking 1400. The method may be performed in various embodiments by the pass through ambulatory vehicle 100, the pass over ambulatory vehicle 300, the three-legged ambulatory vehicle 1200, or a three-legged ambulatory vehicle with a support such as the ambulatory vehicle 1250. For simplicity, the method 1400 is described as being performed by the ambulatory vehicle 100.

In a step 1402, the ambulatory vehicle 100 receives a command to move. The command may be received from a remote location over a communication network or via a short range signal from, for example, a remote control. Alternatively, the ambulatory vehicle 100 may comprise a computing device capable to generating commands according to environmental data received from one or more sensors installed on the ambulatory vehicle 100. In response to the command, the ambulatory vehicle 100 will commence locomotion.

In a step 1404, the ambulatory vehicle 100 shifts the load 102 into position such that the center of gravity is over a forward leg assembly supporting the ambulatory vehicle 100. This leg assembly may be the first leg assembly 112 or the second leg assembly 116. The load 102 is shifted such that the center of gravity of the ambulatory vehicle 100 is solely supported by this leg assembly. Depending on the weight and position of the beam assembly 108 and the non-supporting leg assembly, the position of the load 102 may not be directly over the leg assembly supporting the ambulatory vehicle 100.

In some embodiments, the load 102 may comprise a first load and a second load. These embodiments may further comprise an additional track similar to the third track 106 on which the second load may shift. The second load may shift independently of, or relative to, the first load to maintain a center of gravity over the leg assembly supporting the ambulatory vehicle 100. For example, the second load may be configured to transport passengers while the first load may include freight and/or onboard controls. In this instance, the second load may be configured to shift only slightly to maintain the comfort of the passengers while the first load shifts more dramatically to compensate for the second load while maintaining the center of gravity over the leg assembly supporting the ambulatory vehicle 100. Similarly, some embodiments may comprise further additional tracks, which upon each a load may shift.

In a step 1406, the legs 222 or 210 of the non-supporting leg assembly retract. The legs 222 or 210 can retract because the load 102 is supported solely by the other leg assembly. To retract, the legs 222 or 210 may telescope, rotate, and/or rise vertically from the travel surface.

In steps 1408 through 1416, the load 102 shifts as necessary to maintain the center of gravity of the ambulatory vehicle 100 over the leg assembly supporting the ambulatory vehicle 100 until the vehicle components are centered over the leg assembly supporting the ambulatory vehicle 100. In step 1408, which is optional, the beam assembly 108 and the moving leg assembly are substantially centered over the leg assembly supporting the ambulatory vehicle 100. At this point during the gait the ambulatory vehicle 100 may change or maintain its direction of travel. If a turn is required, in a step 1410, the beam assembly 108 will rotate the beam assembly 108 about the vertical axis of the leg assembly supporting the ambulatory vehicle 100 as needed in step 1412. Whether or not a turn is executed, in step 1414, the beam assembly 108 and the other leg assembly continue to shift in the direction of travel, the other leg assembly typically exchanging ends with the leg assembly supporting the ambulatory vehicle 100.

In a step 1416, the ambulatory vehicle 100 extends the legs 222 or 210 of the non-supporting leg assembly to the travel surface. The alternative legs 222 or 210 of the non-supporting leg assembly may telescope, rotate, and/or lower vertically, etc. to the travel surface. While the legs 222 or 210 of the non-supporting leg assembly returns to having contact with the travel surface, the legs 222 or 210 of the non-supporting leg assembly may not extend completely depending on various characteristics of the travel surface.

In step 1418, the ambulatory vehicle 100 may receive a command YES, to continue turning or NO, to end the turn. If the received command is YES, then the method 1400 returns to step 1406. If the command is NO, the ambulatory vehicle 100 exits the method 1400.

At any step, the ambulatory vehicle may be stopped. Also at any step, the ambulatory vehicle, if not already supported by only one leg assembly, may go to directly to step 1404 and change the direction of travel when it reaches step 1410.

Figure 15:
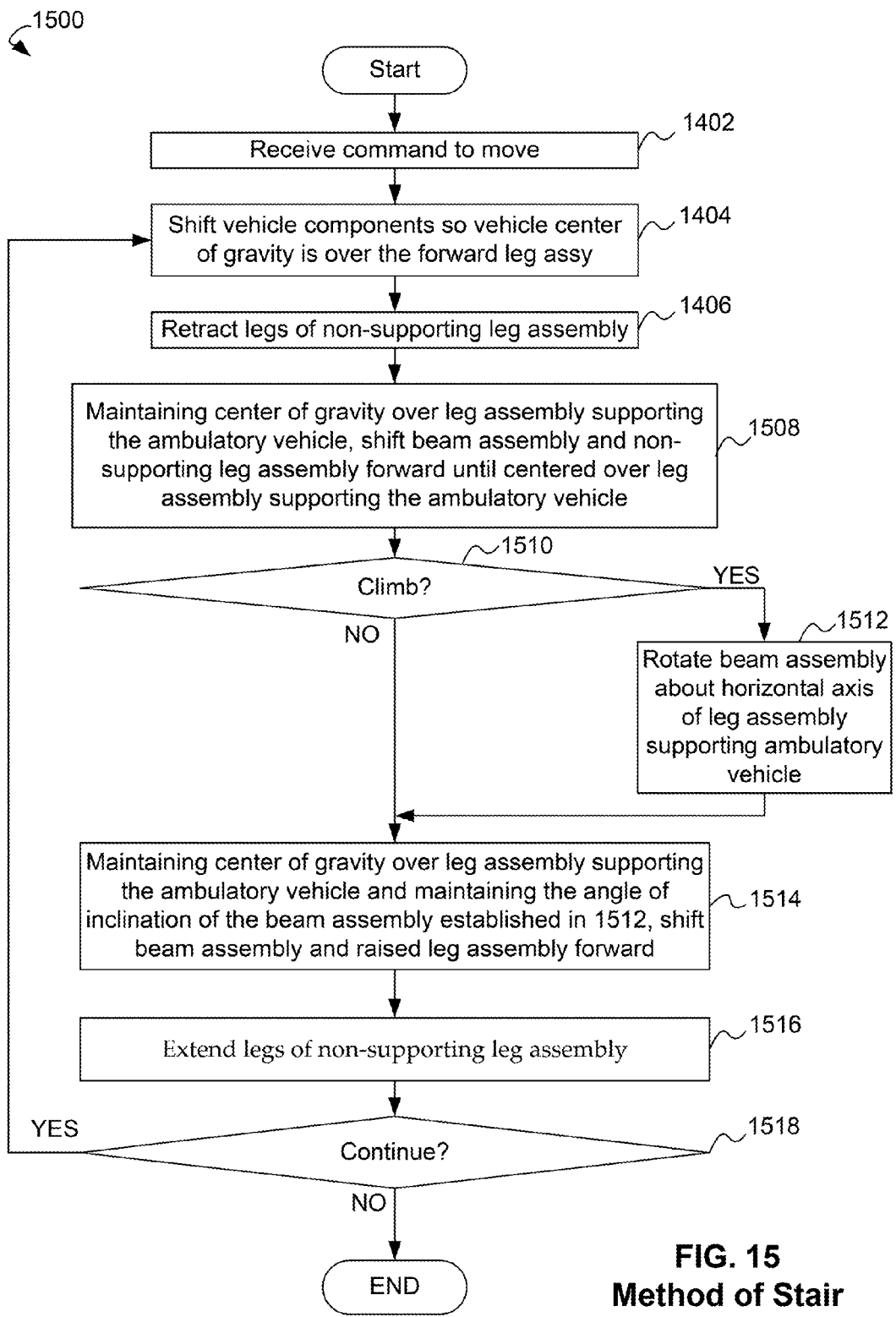
FIG. 15 is a flowchart depicting a method of stair-climbing, according to various embodiments of the invention.

FIG. 15 depicts a flowchart illustrating a method of stair-climbing 1500. The stair-climbing method may be used on terrain other than stairs such as terraces or mild to steep grades, or terrain that is uneven. The method may be performed by various embodiments including the pass through ambulatory vehicle 100, the pass over ambulatory vehicle 300, the three-legged ambulatory vehicle 1200, or a three-legged ambulatory vehicle with a support such as the ambulatory vehicle 1250. For simplicity, the method 1500 is described as being performed by the ambulatory vehicle 100.

In some embodiments, the legs require only enough power to passively change their length and/or retract and extend. In typical embodiments, the legs do not need to move or change length while supporting the vehicle. The power required at the supporting gimbal mount to tilt and/or rotate the beam assembly is minimized by requiring the center of gravity to be over the supporting mount.

Referring to FIG. 15, steps 1402 through 1406 are performed as described in reference to FIG. 14. In a step 1508, the beam assembly 108 and the moving leg assembly are substantially centered over the leg assembly supporting the ambulatory vehicle 100. In step 1510, during the gait the ambulatory vehicle 100 may change or maintain its direction of travel. If a climb is required, in a step 1512, the beam assembly 108 will rotate on the leg assembly about horizontal axis of leg assembly supporting the ambulatory vehicle 100 as needed. During step 1512, the load 102 may be shifted to maintain the center of gravity of the ambulatory vehicle 100 over the leg assembly supporting the ambulatory vehicle 100. After completion of step 1512, the ambulatory vehicle 100 will continue to step 1514. In step 1510, if a climb is not required, the ambulatory vehicle 100 will continue to step 1514. In step 1514, the load 102 continues to shift to maintain the center of gravity over the leg assembly supporting the ambulatory vehicle 100 while maintaining the angle of inclination of the beam assembly established in 1512 or 1508, shift beam assembly and leg assembly forward and the retracted leg assembly exchanges places with the leg assembly supporting the ambulatory vehicle 100.

In step 1516, like step 1502, the legs 222 or 210 of a non-supporting leg assembly extend to the travel surface. In step 1518, the ambulatory vehicle 100 may stop or continue movement. If movement is continued, then the method returns to step 1404 where the load 102 is again shifted.

At any step, the ambulatory vehicle may be stopped. Also at any step, the ambulatory vehicle, if not already supported by only one leg assembly, may go to directly to step 1404 and change the direction of travel when it reaches step 1410.

Figure 16:
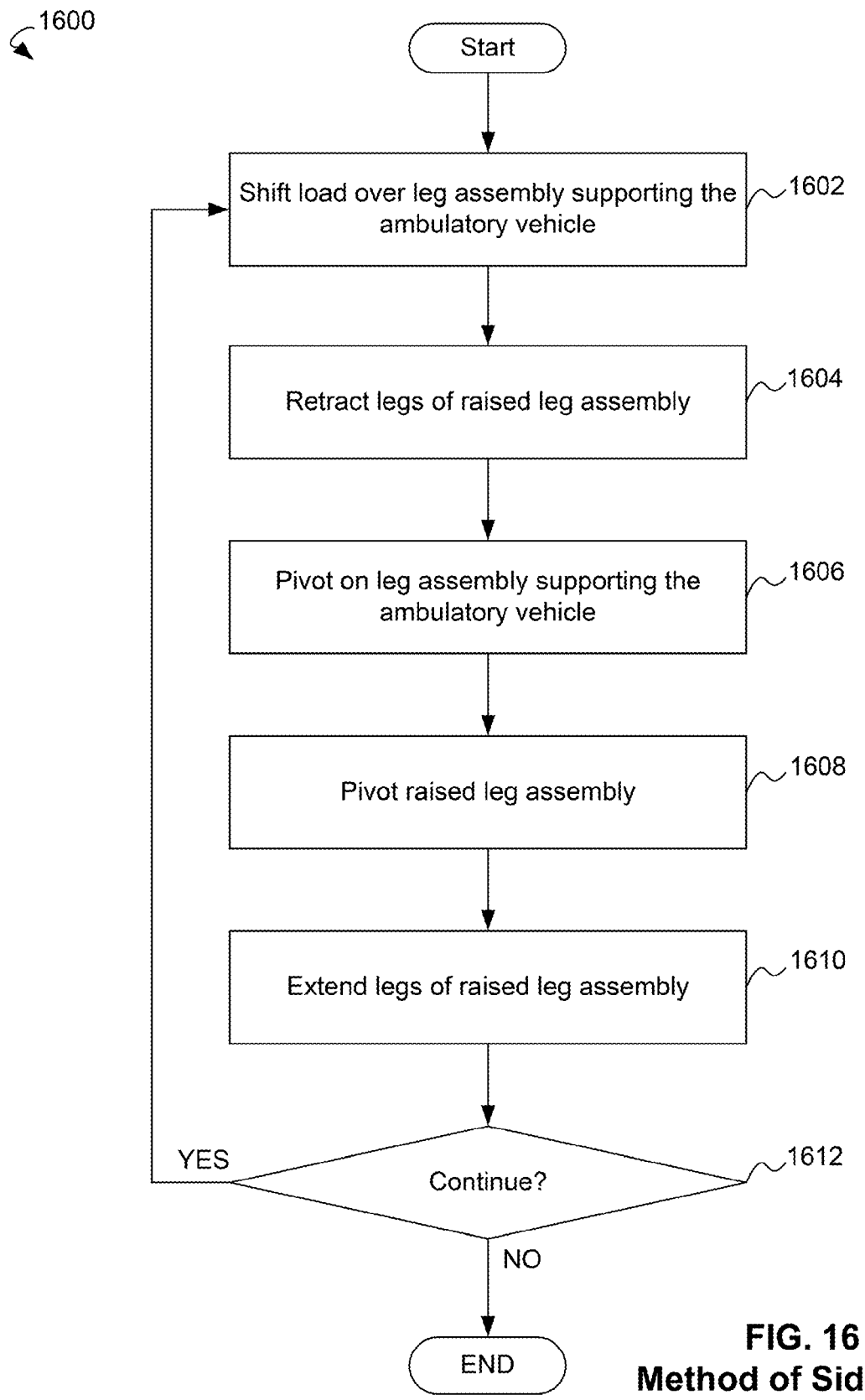
FIG. 16 is a flowchart depicting a method of navigating sideways, according to various embodiments of the invention.

FIG. 16 is a flowchart depicting a method 1600 for moving sideways, for example, up or down a slope. The method 1600 may be used when the travel surface is very steep or when other methods may not be possible due to obstacles. The method 1600 is different from the other methods discussed herein because the leg assemblies do not exchange places along the length of the beam assembly. The method 1600 may be performed by various embodiments including the pass through ambulatory vehicle 100, the pass over ambulatory vehicle 300, the three-legged ambulatory vehicle 1200, or a three-legged ambulatory vehicle with a support such as the ambulatory vehicle 1250. For simplicity, the method 1600 is described as being performed by the ambulatory vehicle 100. The starting position is assumed to be with the load 102 between the leg assemblies with each leg assembly near an opposite end. The direction of travel is assumed to be not far from perpendicular to the long axis of the ambulatory vehicle 100.

In step 1602, the load 102 shifts over a leg assembly supporting the ambulatory vehicle 100 such that the center of gravity is over the leg assembly which therefore solely supports the ambulatory vehicle 100. In step 1604, the legs 222 or 210 of the non-supporting leg assembly retract such that they are no longer in contact with the travel surface.

In step 1606, the beam assembly 108 pivots around the vertical axis of the gimbal mount which is part of the supporting leg assembly such that unsupported end swings approximately in the direction of travel. In some embodiments, the retracted leg assembly shifts towards the leg assembly supporting the ambulatory vehicle 100 prior to pivoting. In some embodiments, the gimbal joint may rotate up to 180 degrees clockwise or counter-clockwise with respect to the direction of travel.

In optional step 1608, the retracted leg assembly pivots into a position that is substantially parallel to the first leg assembly. The retracted leg assembly pivots using the gimbal joint coupling it to the beam assembly 108. By pivoting back, the gimbal joint in the retracted leg assembly will be able to pivot at a greater angle during a next step. The retracted leg assembly pivots in the reverse direction of step 1606. In some embodiments, the retracted leg assembly may pivot a larger or smaller angle than the angle in step 1606. After pivoting back, the leg of the retracted leg assembly extends to the travel surface in step 1610. In step 1612, the load 102 shifts to be over the retracted leg assembly such that the recently retracted leg assembly becomes the leg assembly supporting the ambulatory vehicle 100. In some embodiments, ambulatory vehicle 100 may include more than four tracks. In various embodiments, the lengths of legs are configured to change lengths.

In some embodiments, a beam assembly includes two or more tracks disposed at substantially the same height from a level ground surface. The two or more tracks at about the same height can be side by side or otherwise disposed within the beam assembly. A beam assembly with tracks at substantially the same height from a level ground surface is discussed below with respect to FIGS. 17-26.

Figure 17:
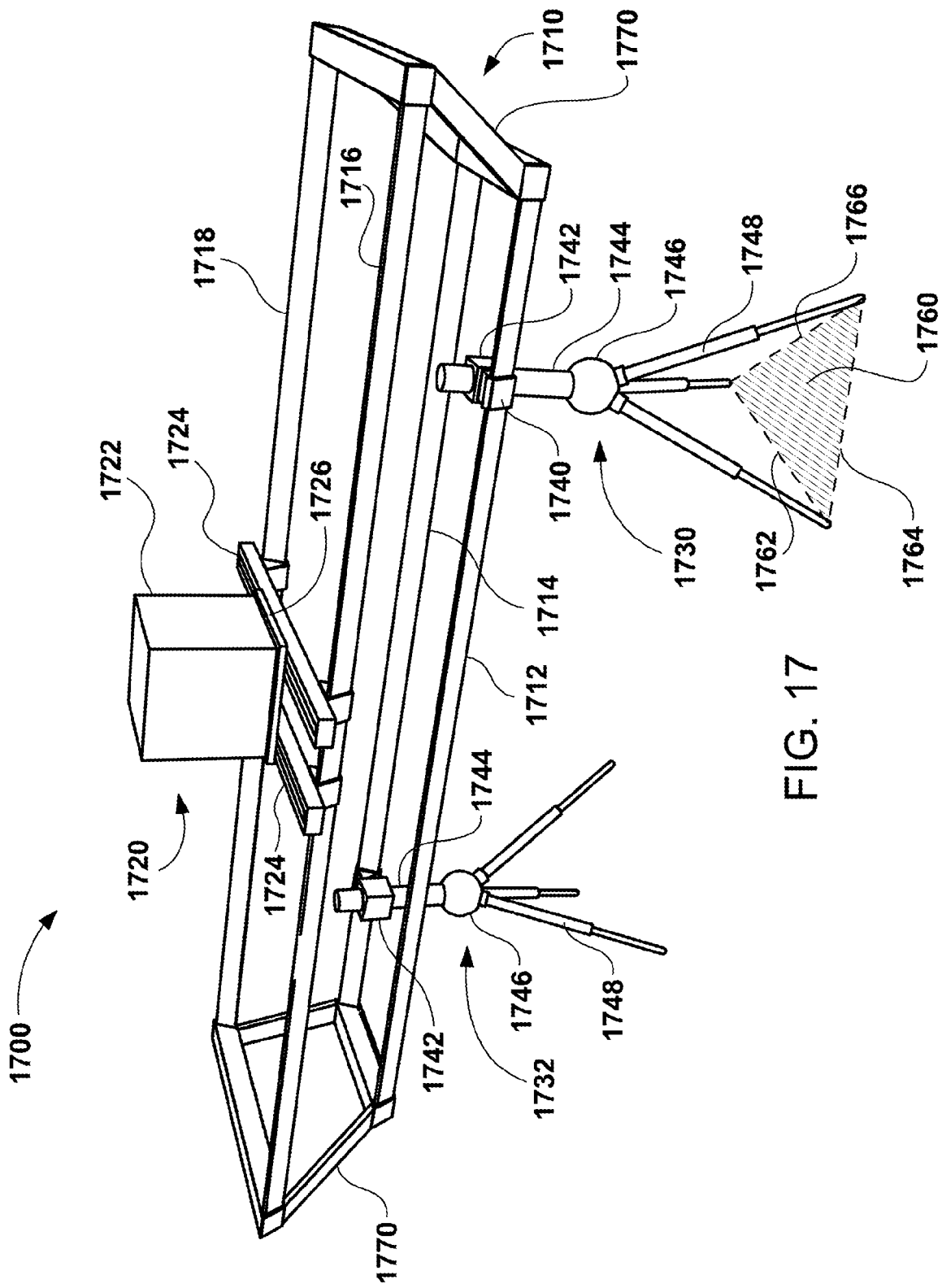
FIG. 17 is a top perspective view of an alternative embodiment of an ambulatory vehicle configured to transport a load from a first location to a second location along a travel surface in accordance with aspects of the technology.

FIG. 17 depicts a top perspective block diagram of an embodiment of an ambulatory vehicle 1700 configured to transport a load 1722 from a first location to a second location along a surface. The ambulatory vehicle 1700 comprises a beam assembly 1710, a load assembly 1720, a first leg assembly 1730, and a second leg assembly 1732.

The beam assembly 1710 includes a first load track 1716, a second load track 1718, a first leg track 1712, a second leg track 1714 and trusses 1770. The leg tracks 1712 and 1714 are disposed along a longitudinal axis of the beam assembly 1710. The load assembly 1720 may be disposed on the first load track 1716 and the second load track 1718. FIG. 17 illustrates a truss 1770 disposed at both ends of the beam assembly 1710. However, one or more trusses 1770 may be disposed at intermediate positions between the ends of the beam assembly 1710 instead of or in addition to the trusses 1770 disposed at the ends. The trusses 1770 are configured to support the load tracks and leg tracks. The trusses 1770 may maintain the load tracks in a position to allow load assembly 1720 to travel along the load tracks. The trusses 1770 illustrated in FIGS. 17-20 include vertical members and horizontal members. However, a diagonal member (not illustrated) may be included in the truss 1770 to provide shear support.

In some embodiments, the load assembly 1720 is disposed in a fixed position along the longitudinal axis of the beam assembly. In FIG. 17, the load assembly is illustrated as being disposed in the center of the beam assembly 1710. However, the load assembly may be disposed at alternative positions along the beam assembly 1710. In some embodiments, two or more load assemblies 1720 are disposed at two or more positions along the beam assembly. For example two load assemblies 1720 may be disposed, one at each end of the beam assembly 1710 (not illustrated). In some embodiments, the beam assembly is configured to telescope.

The load assembly 1720 includes two transverse tracks 1724 (though load assembly 1720 may include a different number of tracks). Transverse tracks 1724 are configured for allowing movement of a carriage 1726 in the transverse axis. For example, the carriage 1726 can be shifted over transverse tracks 1724 by a control system (not illustrated in FIG. 17). In some embodiments, the transverse axis is normal to the longitudinal axis and/or the vertical axis. The carriage 1726 is configured to support the load 1722. In various embodiments, the load 1722 includes energy storage, computer equipment, data storage, and control mechanisms for the vehicle, as well as sensors, freight, passengers, weapons, ordinance, and/or the like. While two transverse tracks 1724 are depicted in FIG. 17, fewer or more transverse tracks 1724 may be employed.

In some embodiments, the first and second load tracks 1716 and 1718 allow the load assembly 1720 to travel along a length of the beam assembly 1710. By traveling along the tracks 1716 and 1718, the load assembly 1720 can maintain the center of gravity of the ambulatory vehicle 1700 along the longitudinal axis of the beam assembly.

Figure 19:
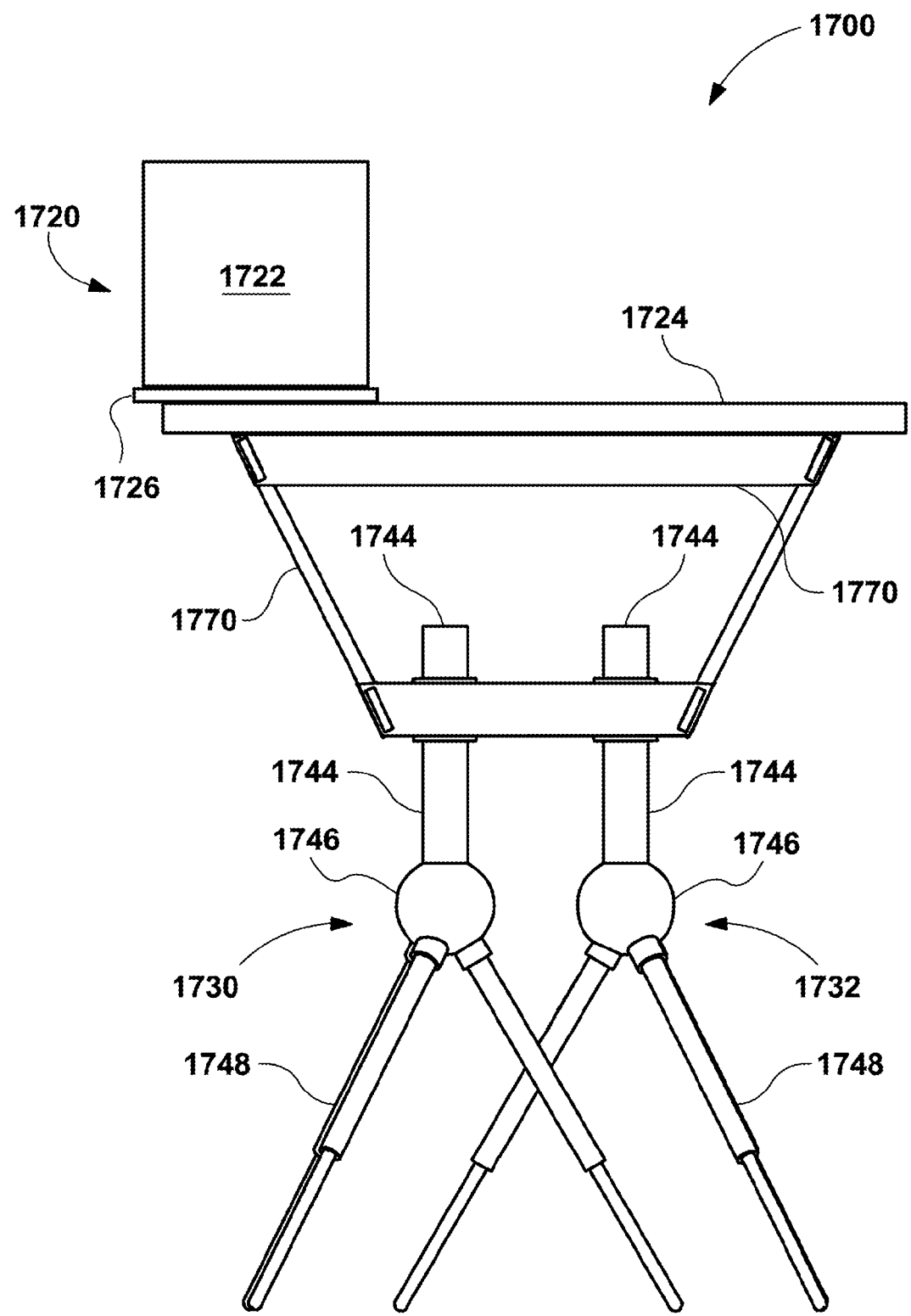
FIG. 19 is a front elevation of the ambulatory vehicle of FIG. 17.
Figure 20:
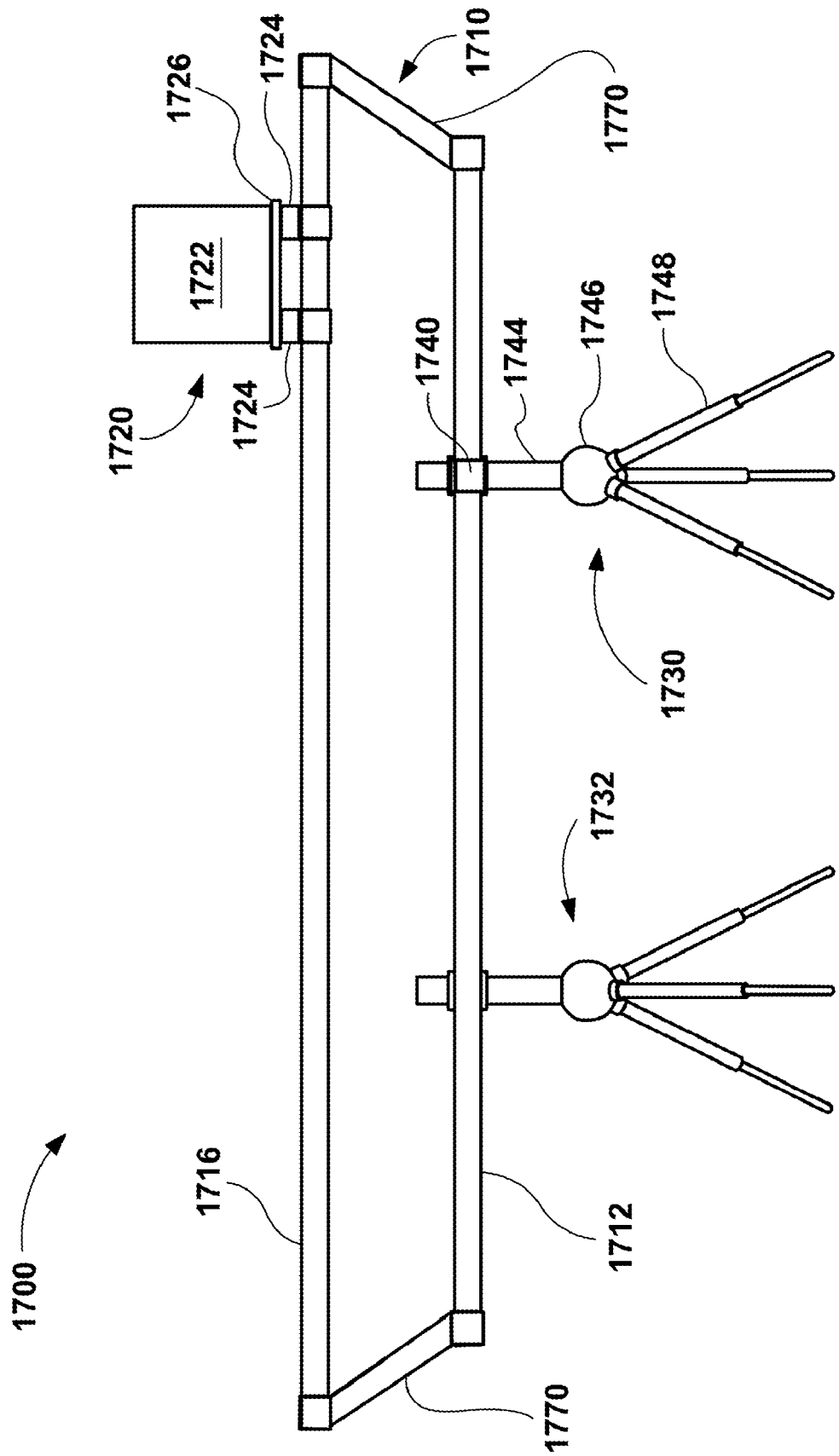
FIG. 20 is a side elevation of the ambulatory vehicle of FIG. 17.

FIGS. 19-20 illustrate a load assembly 1720 that has been shifted to an alternative position along the longitudinal axis. While two load tracks 1716 and 1718 are illustrated in FIG. 17, a person having ordinary skill in the art will appreciate that one load track or more than two load tracks may be used to allow the load assembly 1720 to travel along the longitudinal axis of the ambulatory vehicle 1700.

The first leg assembly 1730 and the second leg assembly 1732 function in similar manners during locomotion and may have nearly identical stances. Both leg assemblies are configured to independently support the ambulatory vehicle 1700, either statically or dynamically and retract or extend various components of the assemblies during locomotion. In the depicted embodiment, the first leg track 1712 is in approximately the same horizontal plane as the second leg track 1714 when the ambulatory vehicle 1700 is on a generally flat surface. In alternative embodiments, the first leg track 1712 and the second leg track 1714 may be vertically offset to decrease the overall width of the ambulatory vehicle 1700. The following description applies equally to the first leg assembly 1730 and the second leg assembly 1732.

The first leg assembly 1730 includes a traveler 1740, a first joint 1742, a shaft 1744, a second joint 1746, and one or more legs 1748. The traveler 1740 is configured to couple the first leg assembly 1730 to the first leg track 1712. A traveler 1740 may likewise couple the second leg assembly 1732 to the second leg track 1714. In various embodiments, the traveler 1740 may include one or more of bearings, slide rails, air bearings, needle bearings, magnetic bearings, gears, chains, roller bearings, linear bearings, linear motors, and/or the like. The traveler may be under control of a control system such as that described below with respect to FIG. 21. The control system can include sensors to provide position, velocity, and/or acceleration of the traveler 1740 relative the beam assembly 1710.

The first joint 1742 is coupled to the traveler 1740 and configured to rotate around a vertical and/or horizontal axis. For example, the beam assembly 1710 may tilt in the vertical axis on the first joint 1742. The first joint 1742 can include any of a gimbal joint, a ball and socket joint, a hinge, journal, flexible material, pivot, and/or the like. The shaft 1744 couples the second joint 1746 to the first joint 1742. The shaft 1744 may be used to adjust a position of the second joint 1746 vertically relative the first joint 1742 along the shaft. The second joint 1746 rotates around a vertical and/or horizontal axis. The second joint 1746 can include any of a gimbal joint, a ball and socket joint, a hinge, journal, flexible material, pivot, and/or the like. In some embodiments, the shaft 1744 is configured to allow the rotation of the first joint 1742 and/or the second joint 1746 around a vertical axis of the shaft 1744 to permit 360 degrees of rotation of the beam assembly 1710 around the first leg assembly 1730. The beam assembly 1710 may also tilt on the second joint 1746.

One or more legs 1748 are coupled to the second joint 1746. The second joint 1746 is configured to permit the legs 1748 to rotate vertically and/or horizontally around the shaft 1744. While three legs 1748 are depicted in FIG. 17, more or fewer legs 1748 may be coupled to the second joint 1746. In some embodiments, the legs 1748 are coupled directly to the second joint 1746. The legs 1748 may articulate or otherwise move independently about the second joint 1746. As in the "pass over," "pass through" and "pass around" embodiments discussed elsewhere herein, the legs in the "pass by" version illustrated in FIG. 17 may retract, for example by telescoping. In various embodiments, the legs 1748 are configured to retract, telescope, fold, rotate, slide, pivot, and/or the like. The legs 1748 may include feet (not illustrated) configured to contact the travel surface and provide stability using friction, suction, or some other means of traction with the surface.

The center of support provided by the first leg assembly 1730 and/or the second leg assembly 1732 can be offset from a center of mass of the beam assembly 1710 along the transverse axis. The center of support provided by the first leg assembly 1730 and/or the second leg assembly 1732 may also be offset from a center of mass of the beam assembly 1710 along the longitudinal axis. However, a position for the load 1722 may be selected in the transverse and/or longitudinal axis to place a center of mass of the load assembly 1720 plus the beam assembly 1710 over the center of support of the first leg assembly 1730, over center of support of the second leg assembly 1732, between center of support of the first leg assembly 1730 and the second leg assembly 1732, or beyond the center of support of the first leg assembly 1730 and the second leg assembly 1732.

A footprint of a leg assembly, e.g., the first leg assembly 1730, may be defined as an area inside of a set of lines between points where each adjacent leg 1748 rests on the travel surface. For example, the endpoints of the three legs of the first leg assembly 1730 form three dashed lines 1762, 1764, and 1766 on a travel surface. An area bounded by lines 1762, 1764, and 1766 is a footprint 1760 of the first leg assembly 1730. When a static or dynamic center of mass of the ambulatory vehicle 1700 is above the footprint 1760, the ambulatory vehicle 1700 will be in balanced over the first leg assembly 1730. Similarly a footprint may be constructed for the second leg assembly 1732. A position for the load 1722 may be selected along the transverse and/or longitudinal axis to place the center of mass of the ambulatory vehicle 1700 over the footprint 1760. Similarly, a position for the load 1722 may be selected in the transverse and/or longitudinal axis to place a center of mass of the ambulatory vehicle 1700 over a footprint of the second leg assembly 1732.

In some embodiments, a third track (not illustrated) is disposed along the first axis of the beam assembly. A third leg assembly (not illustrated) may be coupled to the third track and configured to support the beam assembly. The third leg assembly may move along a length of the third track from a first end of the beam assembly to an opposite end of the beam assembly. A first leg assembly may move from the second to the first end while the third leg is moving. Eventually, the third leg and first leg may exchange which ends of the beam assembly at which they are positioned.

Figure 18:
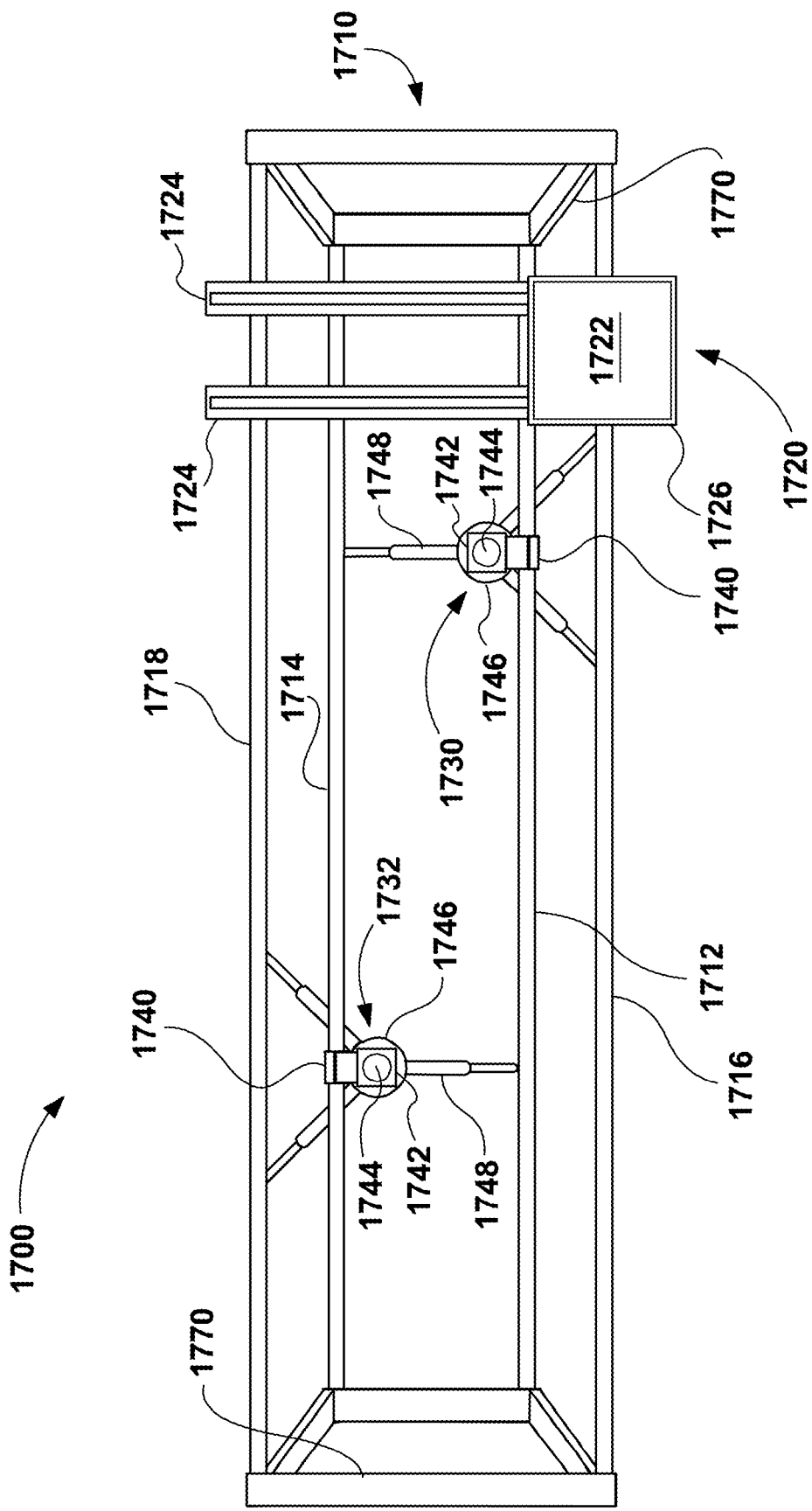
FIG. 18 is a top plan view of the ambulatory vehicle of FIG. 17.

FIG. 18 is a top plan view of the ambulatory vehicle of FIG. 17. FIG. 19 is a front elevation of the ambulatory vehicle of FIG. 17. FIG. 20 is a side elevation of the ambulatory vehicle of FIG. 17.

For clarity and simplicity, power sources and linkages are not included in the illustrations. However, a person having ordinary skill in the art will appreciate that power to drive components of the ambulatory vehicle 100, 300, 1200, 1250, 1700, 2400, 2500, and/or 2700 may be provided by motors and/or engines, including gasoline engines, diesel engines, gas engines, electrical motors, relays, solenoids, linear motors, piezo devices, pneumatic motors, hydraulic motors, and thermal actuators, in various combinations. Similarly, a person having ordinary skill in the art will appreciate that linkages for transmitting drive and control to components of the ambulatory vehicle 100, 300, 1200, 1250, 1700, 2400, 2500, and/or 2700 may include components such as mechanical, rack and pinion, gears, reel and cable, hydraulic, pneumatic, magnetic, electrostatic, electrical wires, radiation, and/or the like. Braking may include regenerative braking, friction braking and/or the like. Likewise, energy may be stored in the form of various combinations of electrical, chemical, mechanical and potential.

For example, linear motors (not illustrated) may be used for driving and/or braking the first leg assembly 1730 and the second leg assembly 1732 along the first leg track 1712 and the second leg track 1714, respectively. Electrical motors (not illustrated) may be used for driving and/or braking the load assembly 1720 along the first load track 1716 and the second load track 1718 and for driving the carriage 1726 along the transverse tracks 1724. In some embodiments, pneumatic motors, hoses, and actuators (not illustrated) may be used for extending and retracting the legs 1748. The shaft 1744 may be raised and lowered using a hydraulic motor (not illustrated). Solenoids (not illustrated) may be used for articulating the first joint 1742 and/or the second joint 1746.

Figure 21:
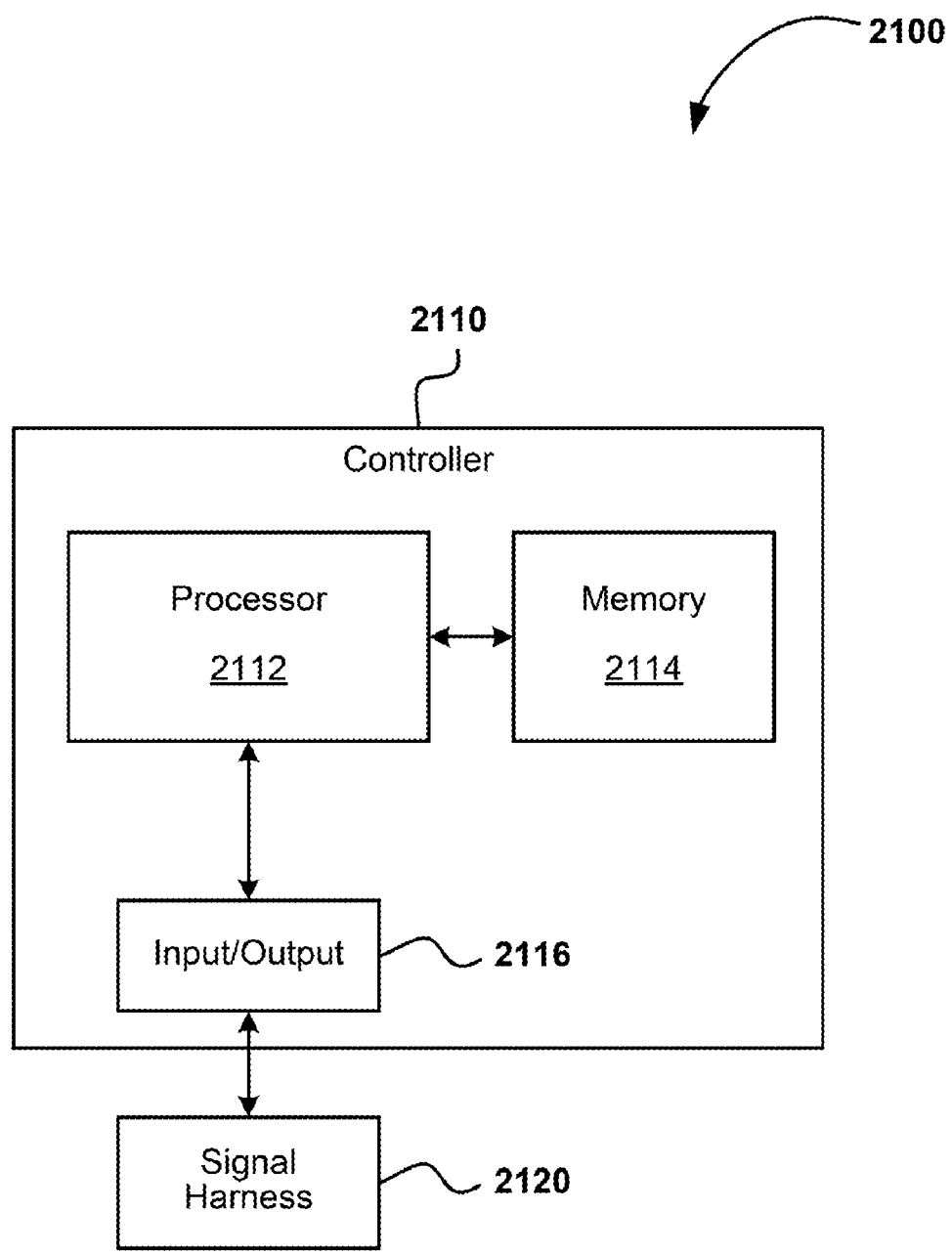
FIG. 21 illustrates a control system for the ambulatory vehicle.

FIG. 21 illustrates a control system 2100 for the ambulatory vehicle 100, 300, 1200, 1250, 1700, 2400, 2500, and/or 2700. The control system 2100 includes at least a controller 2110 and a signal harness 2120. The controller 2110 includes a processor 2112, a memory 2114, and input/output module 2116, all in communication via one or more communication buses. The input/output module is configured to provide an interface for signals between the processor 2112 and the signal harness 2120. The signal harness 2120 includes components that are configured to transmit signals between controller 2110, sensors (not illustrated) positioned throughout the beam assembly, leg assemblies and other portions of ambulatory vehicle 100, 300, 1200, 1250, 1700, 2400, 2500, and/or 2700, one or more power sources disposed on the various components of the ambulatory vehicle 100, 300, 1200, 1250, 1700, 2400, 2500, and/or 2700, including the beam assembly 1710, the load assembly 1720, and the leg assemblies 1730 and 1732, and other components used to shift, move or otherwise displace leg assemblies, legs, loads, carriages, and other components capable of movement or having a different geographical or logical state (i.e., on, off, in transit, and so forth). In various embodiments, the signal harness 2120 includes wires, optical signal transmission components, wireless signal transmission components, and/or other components for transmitting a signal.

In various embodiments, the memory 2114 can store parameter values input; sensor data, constructed maps and simulations, instructions and/or code. The instructions and/or code may be executed by the processor 2112 to generate control signals for moving the carriage 1726 along the transverse axis, moving the load assembly 1720 along the load tracks 1716 and 1718, moving the first leg assembly 1730 along the first leg track 1712, moving the second leg assembly 1732 along the second leg track 1714, extending and/or retracting the legs 1748, and shifting or otherwise moving other components of the ambulatory vehicle 1700. The code may be executed by a processor to allow the processor to generate signals for the herein described movements in one or more sequences which enables the ambulatory vehicle 100, 300, 1200, 1250, 1700, 2400, 2500, and 2700 to traverse a surface. A person having ordinary skill in the art will appreciate various techniques for using the control system 2100 for controlling servo systems, sensing component position, sensing environmental parameters, using feedback loops, and for applying signals to control drive from power sources to the leg assemblies 1730 and 1732, the carriage 1726, the transverse tracks 1724, and the load tracks 1716 and 1718. In some embodiments, the code is used for translation of operator input to vehicle actions, gaits, reconnaissance routines, sensor data, controlling non-ambulatory functions, communications, self-righting procedures, damage control, and/or the like.

In some embodiments, control system 2100 can be incorporated within load 1722. However, a person having ordinary skill in the art will appreciate that the control system 2100 may be disposed on the beam assembly 1710 or other components of the ambulatory vehicle 1700. In some embodiments, multiple control systems 2100 may be distributed among processors disposed on various components of the ambulatory vehicle 1700 for providing local process control. For example, a control system 2100 may be disposed on the first leg assembly 1730 for controlling movement of the first leg assembly 1730 and translation of the first leg assembly 1730 along the first leg track 1712. Similarly, another control system 2100 may be disposed on the second leg assembly 1732 for controlling movement of the second leg assembly 1732 and translation of the second leg assembly 1732 along the second leg track 1714. Likewise, another control system may be disposed in the load 1722 and used for controlling a position of the carriage 1726 along the transverse tracks 1724. A control system 2100 may be used for controlling other control systems 2100.

In various embodiments, control system 2100 may receive values, ranges for operation and parameters including target speeds and efficiency for locomotion, a maximum speed of the ambulatory vehicle 100, 300, 1200, 1250, 1700, 2400, 2500, and/or 2700, a maximum and minimum linear acceleration/deceleration, a maximum and minimum angular acceleration/deceleration of various components, a maximum deviation of the beam assembly 1710 from horizontal, a maximum risk of loss of footing, a maximum deviation from a course, a destination, or a heading, and/or the like. Warning limits for operator assisted control may also be received.

FIGS. 22A-22I depict in block form a top plan view of the ambulatory vehicle of FIG. 17 in different phases of a stepping operation. The stepping operation includes two steps. The first step is illustrated in FIGS. 22A-22E and involves moving the second leg assembly 1732 past the first leg assembly 1730 and moving the load 1722 to maintain balance of the ambulatory vehicle 1700.

Figure 22A:
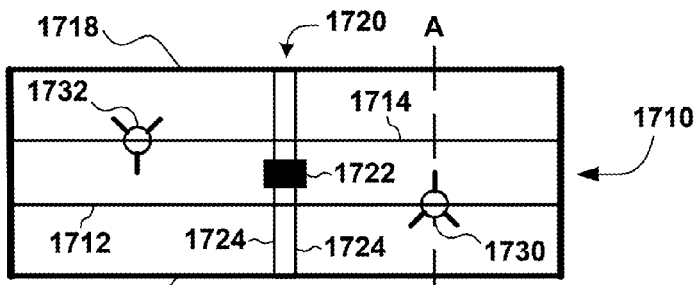
FIGS. 22A-22I depict in block form a top plan view of the ambulatory vehicle of FIG. 17 stepping.

A position for the load 1722 in the longitudinal and transverse axis may be selected for dynamic and/or static balance. In FIG. 22A, the load 1722 is positioned between the first leg assembly 1730 and the second leg assembly 1732 in the longitudinal and transverse axis. Both the legs 1748 of both the first leg assembly 1730 and the second leg assembly 1732 can be in contact with the travel surface and support the beam assembly 1710. A dashed line A-A throughout FIGS. 22A-22E represents a fixed position on the travel surface.

Figure 22B:
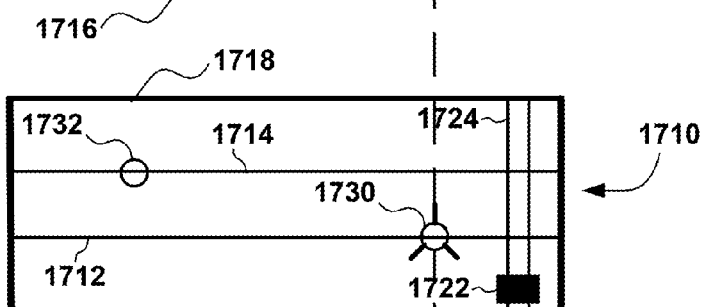

In FIG. 22B, the control system illustrated in FIG. 21 may retract the legs 1748 of the second leg assembly 1732 from the travel surface. The first leg assembly 1730 may support the beam assembly 1710 while the second leg assembly 1732 is retracted from the travel surface. The control system illustrated in FIG. 21 may move the carriage (similar to the carriage 1726, not illustrated in FIGS. 22A-22E) supporting the load in the direction of a transverse axis along transverse tracks 1724. The transverse tracks may move in the direction of the longitudinal axis along the first load track 1716 and the second load track 1718. As a result, the load may effectively be moved throughout a two dimensional space along the two sets of tracks. By moving the carriage in one direction and the transverse tracks in another direction, the load 1722 and corresponding center of mass can be placed to balance the ambulatory vehicle 1700 at different positions, such as over the first leg assembly 1730.

Figure 22C:
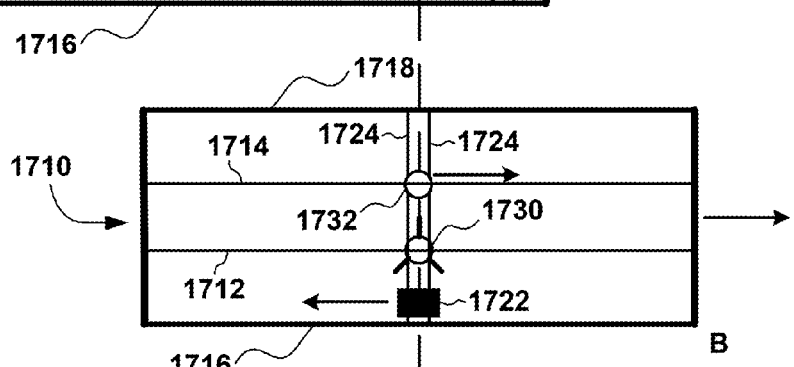

In FIG. 22C, the retracted second leg assembly 1732 moves along the second leg track 1714 and passes by the first leg assembly 1730. The second leg assembly 1732 and first leg assembly 1730 move across their respective tracks along the longitudinal axis to opposite ends along the beam assembly, such that they "exchange ends" along the beam assembly. As the second leg assembly 1732 moves, the control system of FIG. 21 shifts a load 1722 within the carriage 1726 along the longitudinal and/or transverse axis to maintain dynamic and/or static balance. The control system 2100 may also shift the beam assembly 1710 on the first leg assembly 1730. This can be accomplished by moving the first leg assembly 1730 along the first leg track 1712. Since the first leg assembly 1730 is in contact with the travel surface, the first leg assembly 1730 remains stationary with respect the travel surface effectively shifting the beam assembly 1710 from left to right in FIG. 22C.

Figure 22D:
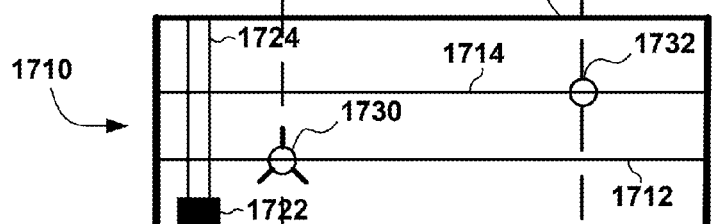

In FIG. 22D, the second leg assembly 1732 continues to move past the first leg assembly 1730 to a new support position. As illustrated, first and second leg assemblies have moved such that they are now positioned on opposite ends of beam assembly 1710 as compared to their respective original positions illustrated in FIG. 22A. In particular, the second leg assembly 1732 has moved to the opposite end of the second leg track 1714 and the first leg assembly 1730 has moved to the opposite end of the first leg track 1712. The carriage 1726 continues to move the load 1722 to maintain static and/or dynamic balance over the first leg assembly 1730. Upon exchanging ends along the longitudinal axis with the first leg assembly 1730, the second leg assembly 1732 may extend to support the beam assembly 1710.

Figure 22E:
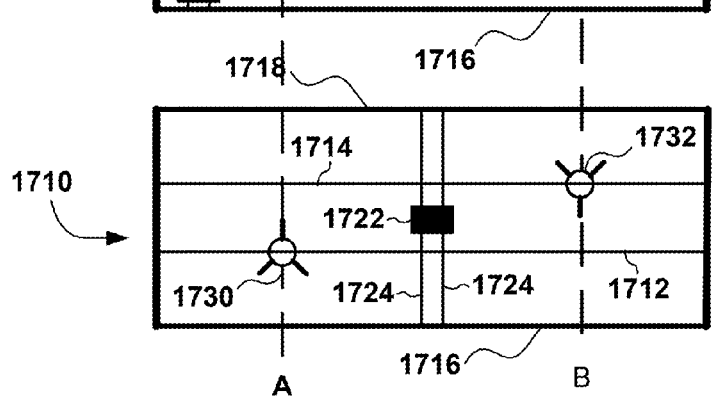

In FIG. 22E the legs 1748 of the second leg assembly 1732 are extended to contact the travel surface and the second leg assembly supports the beam assembly 1710. The load 1722 is in a position between the first leg assembly 1730 and the second leg assembly 1732. The first leg assembly 1730 has remained in the same position as represented by the dashed line A-A throughout the first step as illustrated by FIGS. 22A-22E.

In a similar manner, a second step may be accomplished while moving the first leg assembly 1730 past the second leg assembly 1732 and moving the load 1722 to maintain balance of the ambulatory vehicle 1700. The second step is illustrated in FIGS. 22F-22I. A dashed line B-B represents another fixed position on the travel surface.

Figure 22F:
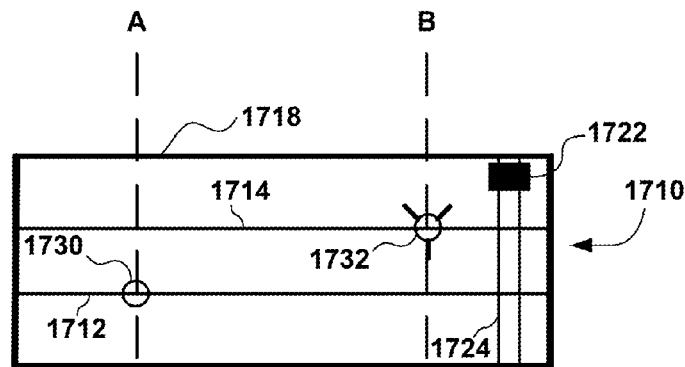

The load 1722 may be moved to another selected position and the first leg assembly 1730 may be retracted and moved along the longitudinal axis to exchange places with the second leg assembly 1732. FIG. 22F illustrates the legs 1748 of the first leg assembly 1730 retracted from the travel surface. The second leg assembly 1732 supports the beam assembly 1710 and the load 1722 is positioned to balance the ambulatory vehicle 1700 over the second leg assembly 1732.

Figure 22G:
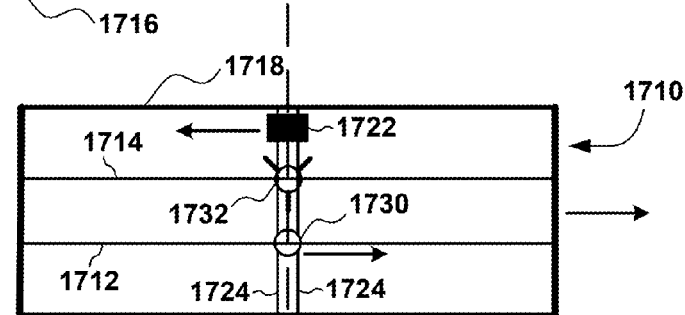

FIG. 22G illustrates the first leg assembly 1730 passing by the second leg assembly 1732. The load 1722 moves to maintain balance of the ambulatory vehicle 1700. The second leg assembly 1732 moves along the second leg track 1714. The beam assembly 1710 may also shift on the second leg assembly 1732 which can be accomplished by moving the second leg assembly 1732 along the second leg track 1714.

Figure 22H:
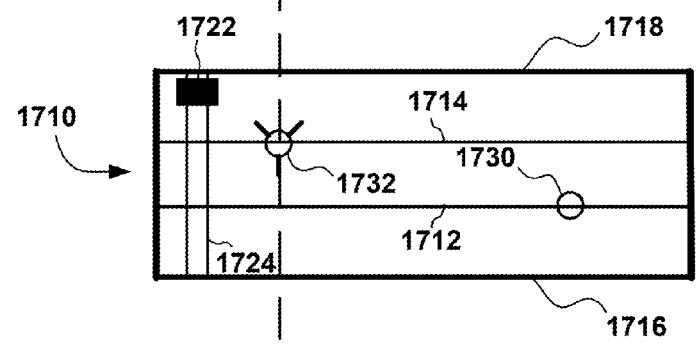

FIG. 22H illustrates the first leg assembly 1730 as it arrives at a new support position on the beam assembly 1710. The load 1722 balances the ambulatory vehicle.

Figure 22I:
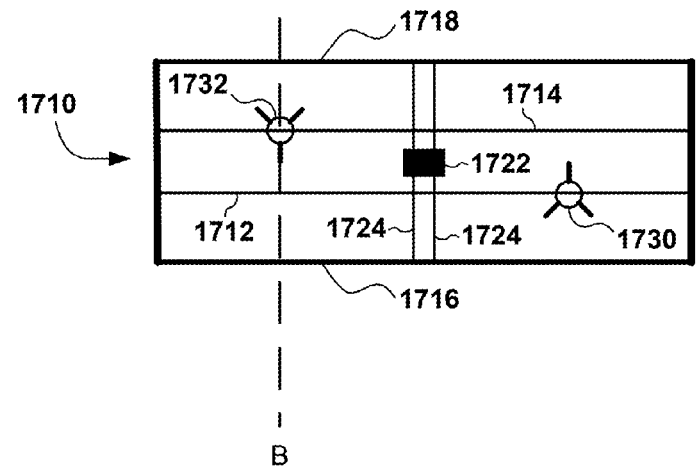

FIG. 22I illustrates the legs of the first leg assembly 1730 extended to contact the travel surface. Both the first leg assembly 1730 and the second leg assembly 1732 support the beam assembly 1710. The load 1722 is positioned between the first leg assembly 1730 and the second leg assembly 1732.

In some embodiments, the load assembly 1720 is fixed in the longitudinal axis and configured for shifting the load in the transverse axis of the ambulatory vehicle 1700. The beam assembly 1710 may be shifted on the first leg assembly 1730 and/or second leg assembly 1732 to position the load 1722 in the longitudinal axis.

Figure 23A:
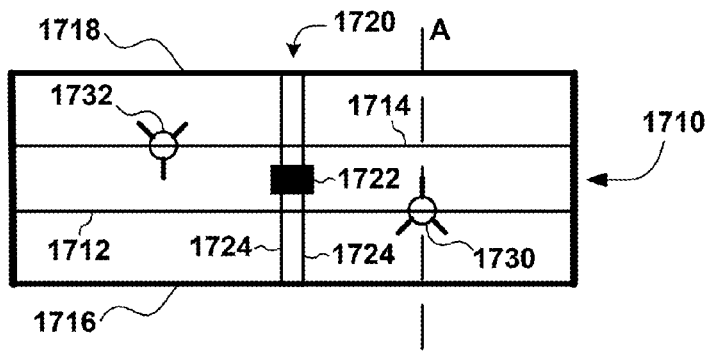
FIGS. 23A-23G depict in block form a top plan view of an alternative embodiment of the ambulatory vehicle of FIG. 17 stepping.

FIGS. 23A-23G depict in block form a top plan view of an alternative embodiment of the ambulatory vehicle of FIG. 17 stepping. The load assembly 1720 is in a fixed positioned along the longitudinal axis of the beam assembly 1710. In FIG. 23A, both the first leg assembly 1730 and the second leg assembly 1732 support the ambulatory vehicle 1700. The load assembly 1720 is positioned about the center of the beam assembly 1710.

Figure 23B:
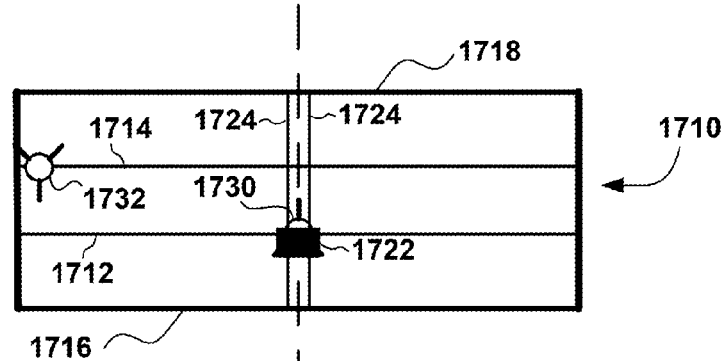

In FIG. 23B, the load 1722 is positioned over the first leg assembly 1730. Both the first and second leg assemblies 1730 and 1732, respectively, are in contact with the travel surface. The control system 2100 may effectively shift the beam assembly 1710 on the leg assemblies 1730 and 1732 to position the load assembly 1720 over the first leg assembly 1730. The load 1722 is shifted in the transverse axis using the transverse tracks 1724. For simplicity, the center of mass of the ambulatory vehicle 1700 is illustrated as being about the center of the load 1722. The load 1722 may shift on the transverse tracks 1724 at the same time, before, or after the beam assembly 1710 shifts on the leg assemblies 1730 and 1732.

Figure 23C:
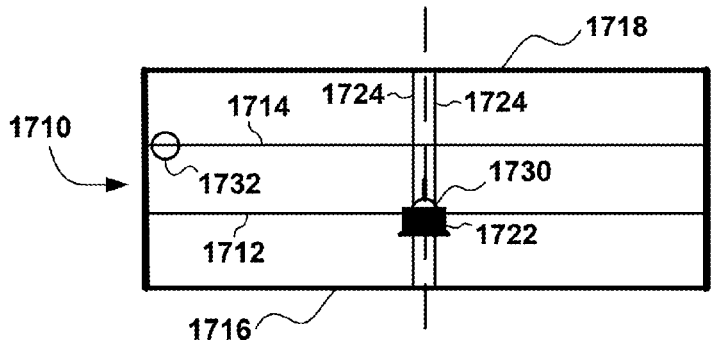

In FIG. 23C, the control system 2100 retracts the legs of the second leg assembly 1732. The first leg assembly 1730 supports the ambulatory vehicle 1700.

Figure 23D:
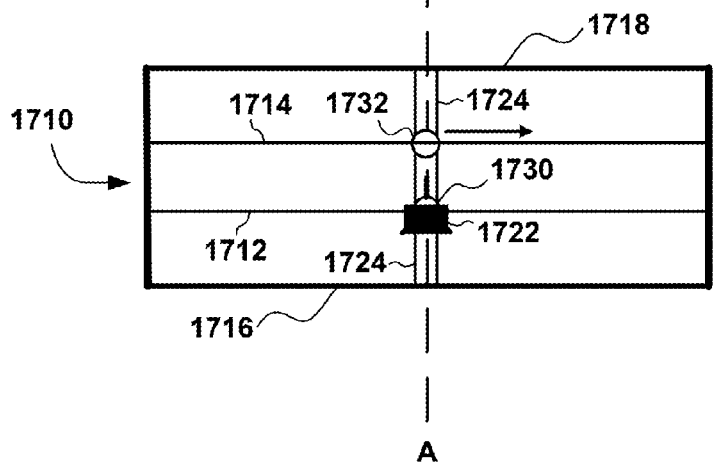

In FIG. 23D, the control system 2100 if FIG. 21 moves the second leg assembly 1732 (as indicated by an arrow associated with second leg assembly 1732) along the second leg track 1714 past the first leg assembly 1730. The control system 2100 may adjust the transverse position of the load 1722 during movement by the second leg assembly 1732 to maintain the center of mass of the ambulatory vehicle 1700 over the first leg assembly 1730. The control system 2100 may also adjust the position of the beam assembly 1710 on the first leg assembly 1730 to maintain the longitudinal center of mass over the first leg assembly 1730. However, since the center of mass is for the ambulatory vehicle 1700 is about the center of the load 1722 such adjustments may be minor.

Figures 23E, 23F, 23G:
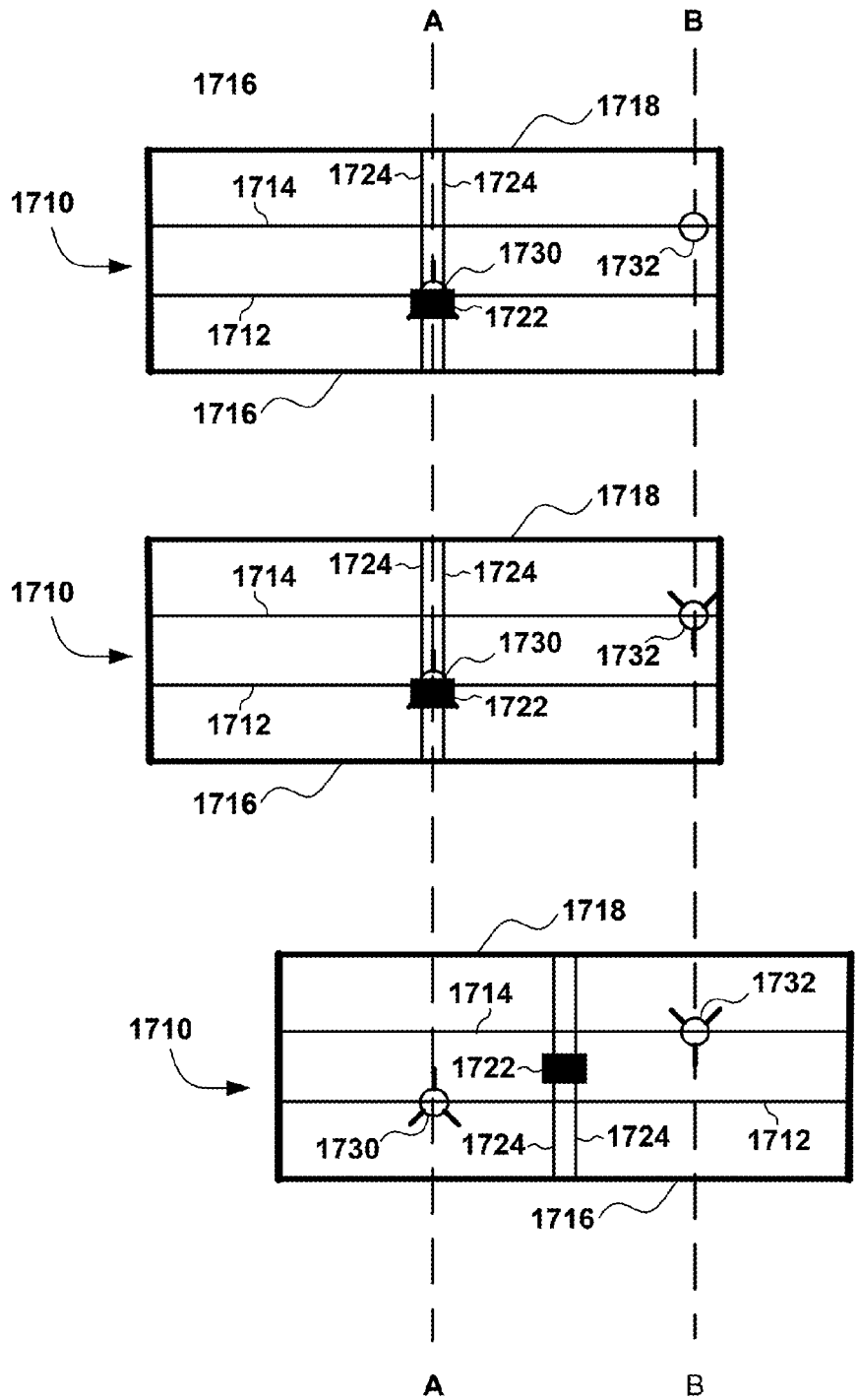

In FIG. 23E, the second leg assembly 1732 is at a new position along the second leg track 1714.

In FIG. 23F, the control system 2100 extends the legs of the second leg assembly 1732 and the ambulatory vehicle 1700 is supported on both leg assemblies 1730 and 1732.

In FIG. 23G, the control system 2100 may shift the beam assembly on the first leg assembly 1730 and the second leg assembly 1732 to position the load assembly between the two leg assemblies.

FIG. 24 is a top perspective view of an alternative embodiment of an ambulatory vehicle 2400. FIG. 24 differs from FIG. 17 in that the ambulatory vehicle 2400 includes an arm assembly 2410. The arm assembly 2410 includes a lower bearing 2412, a shaft 2414, an upper bearing 2416, an arm 2418, and a load 2422. In some embodiments, the arm assembly is supported on an optional track 2402 that is configured for shifting the arm assembly 2410 in the longitudinal and/or transverse axis. Alternatively, the arm assembly 2410 is disposed in a fixed position on the beam assembly 1710. The lower bearing 2412 is configured to provide for rotation of the shaft 2414. In some embodiments, the lower bearing 2412 includes a gimbal configured for providing articulation of the arm with respect to the beam assembly 1710. The shaft 2414 may be configured to extend in the vertical axis. The upper bearing 2416 is configured to provide for rotation of the arm 2418 about the shaft 2414. The arm 2418 may extend and retract for positioning the load 2422 relative the beam assembly 1710. The lower bearing 2412 and/or the upper bearing 2416 may rotate through 360 degrees or more. Alternatively, the lower bearing 2412 and/or the upper bearing 2416 may rotate through less than 360 degrees. In some embodiments, the lower bearing 2412 and/or the upper bearing 2416 is a gimbal joint configured to rotate in two axis. In some embodiments, the lower bearing 2412 or the upper bearing 2416 may be omitted. While a single track 2402 is illustrated in FIG. 24, multiple tracks 2402 may be used.

In some embodiments, the arm assembly 2410 is operated using the control system 2100. In operation, the arm 2418 may be rotated about the shaft 2414. The arm 2418 may also be extended or retracted radially. Thus, the arm assembly 2410 may position the load 2422 for static and/or dynamic balancing of the ambulatory vehicle 2400. The special positioning can be measured in polar coordinates where the shaft 2414 forms the polar axis and the arm 2418 provides a radius axis. For example, an angle of the arm 2418 with respect to the beam assembly 1710 may be a polar angle. A distance of the load 2422 from the shaft may be a radius vector. A gimbal joint disposed in the upper bearing 2416 and/or lower bearing 2412 may provide for an altitude angle above or below a plane of the beam assembly 1710 or an azimuth angle parallel to the plane of the beam assembly 1710.

Additional degrees of freedom may be provided for positioning the load 2422 using the track 2402 to position the arm assembly 2410 in the longitudinal and/or transverse axis. For example, the track 2402 may provide coarse and/or slow positioning of the load 2422 and the arm assembly 2410 may provide fine and/or rapid positioning of the load. The arm assembly 2410, may also be used for providing rotational inertia and/or rotational acceleration to the ambulatory vehicle 2400, e.g., for dynamic balance.

Figure 25:
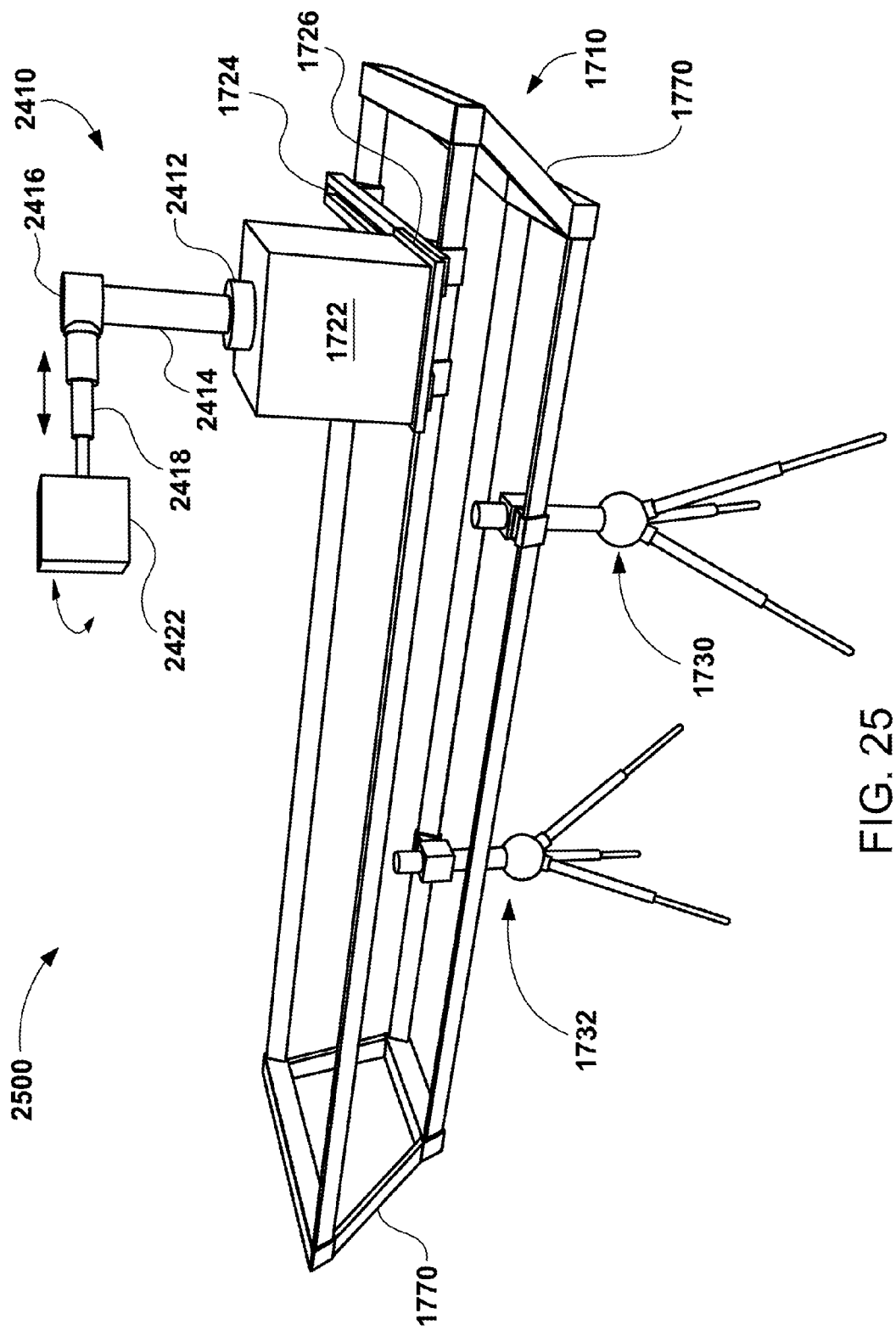
FIG. 25 is a top perspective view of an alternative embodiment of an ambulatory vehicle.

FIG. 25 is a top perspective view of an alternative embodiment of an ambulatory vehicle 2500. The system illustrated in FIG. 25 includes an arm assembly 2410 disposed on a load assembly 1720 which includes a load 1722. The load assembly may be configured to position the load 1722 in the longitudinal and/or transverse axis, as discussed with respect to FIG. 17. Re-positioning the load assembly results in re-positioning the arm assembly 2410 attached to the load assembly. The arm assembly 2410 may be configured to position the load 2422 as discussed with respect to FIG. 24 independently of the load assembly 1720. In some embodiments, the load assembly 1720 may provide for coarse and/or slow balancing of the ambulatory vehicle 2500 and the arm assembly 2410 may provide for fine and/or fast balancing of the ambulatory vehicle 2500.

In example embodiments of operating the ambulatory vehicle 100, 300, 1200, 1250, 1700, 2400, 2500, and/or 2700, the control system 2100 may receive data from sensors for various components of the ambulatory vehicle 100, 300, 1200, 1250, 1700, 2400, 2500, and/or 2700 as well as the surrounding environment. Execution of a program stored on memory 2114 and executed by the processor 2112 may result in creating a spatial and dynamic model of the ambulatory vehicle 100, 300, 1200, 1250, 1700, 2400, 2500, and 2700 within the environment. The model may be continually updated and stored at time intervals. A guidance program executed by the processor 2112 may receive data appropriate for performing tasks to be performed by the ambulatory vehicle. In various embodiments, the tasks include terrain measurements and image collection, environmental measurements and image collection, military reconnaissance, weapons operation, freight loading and unloading, and/or environmental treatments such as painting, or cleaning, or spraying.

In some embodiments, a guidance program executed by the processor 2112 may receive data associated with a terrain map and data associated with a local destination within the terrain map. The guidance program may determine compass-elevation heading data based on the terrain map data and the local destination data. The guidance program may create successive trial simulations of the ambulatory vehicle 100, 300, 1200, 1250, 1700, 2400, 2500, and/or 2700, starting with a current position and traveling along headings varying within a tolerance. The guidance program may generate trial simulations until a simulation model indicates that the vehicle may travel to the local destination, while remaining within various operating parameter tolerances. In some embodiments, a program may be executed by the processor 2112 to perform component motions which accomplish recovery from the vehicle capsizing or otherwise losing stability. A program may be executed which accomplishes damage control.

The ambulatory vehicle 1700 may perform a step as illustrated in FIGS. 22A-22I and/or FIGS. 23A-23G based on the simulation model. Feedback from sensors both within and outside of ambulatory vehicle 100, 300, 1200, 1250, 1700, 2400, 2500, and/or 2700 may be used to update the environmental model. A new series of simulations may be generated based on the updated environmental model. The process may be repeated until the ambulatory vehicle 100, 300, 1200, 1250, 1700, 2400, 2500, and/or 2700 reaches the local destination. In some cases, e.g., an approach to a crest of a hill, the ambulatory vehicle 100, 300, 1200, 1250, 1700, 2400, 2500, and/or 2700 may perform a number of steps from one successful simulation, because the model of the environment has not changed during those steps. A record of models, including simulations, may be stored by the controller, for example in memory 2114 or other computer readable media. In some embodiments, the stored simulations and/or models may be used by the ambulatory vehicle 100, 300, 1200, 1250, 1700, 2400, 2500, and/or 2700 for retracing its steps upon confronting an impasse.

Figure 26:
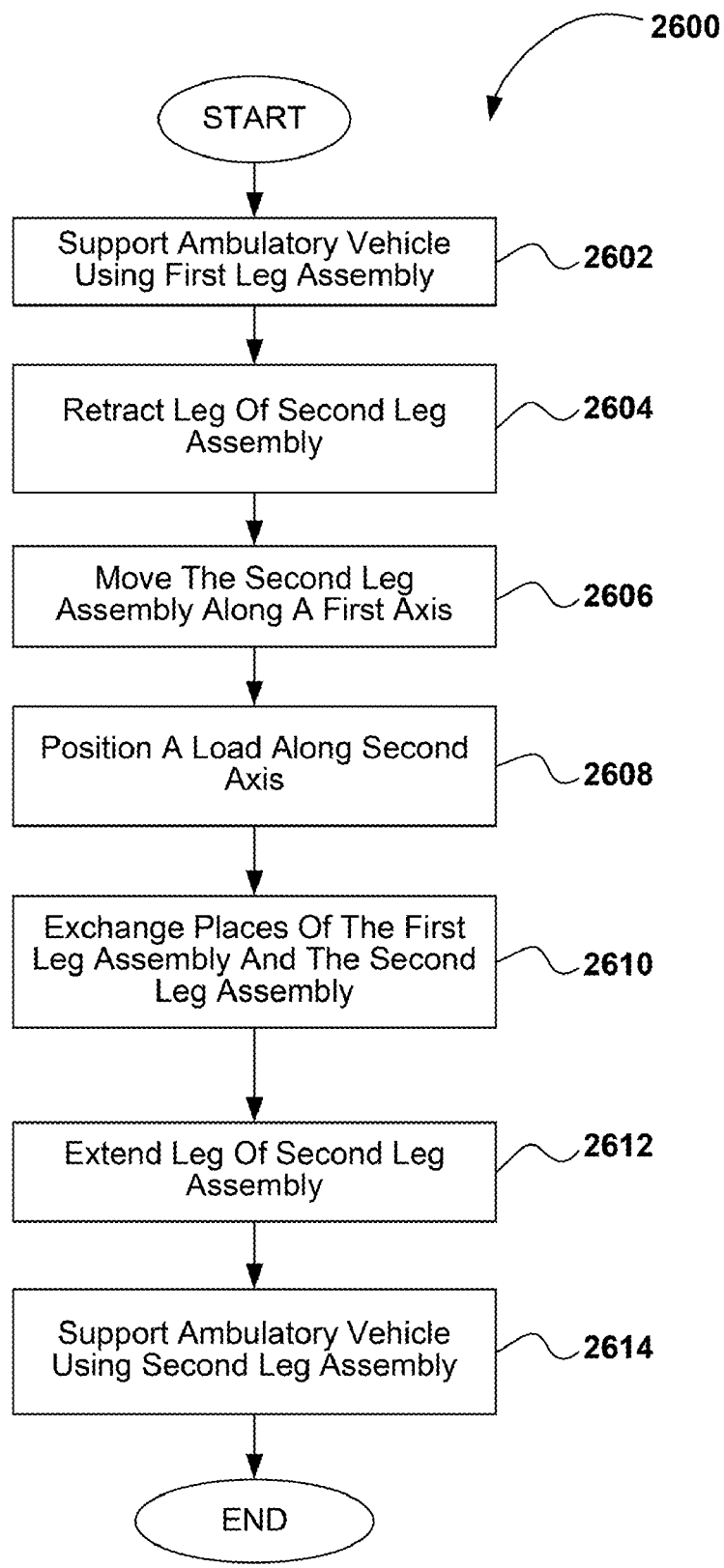
FIG. 26 is a flowchart depicting a method of walking, according to various embodiments of the technology.

FIG. 26 is a flowchart depicting a method 2600 of walking, according to various embodiments of the technology. In step 2602, an ambulatory vehicle, e.g., ambulatory vehicle 1700 is supported using a first leg assembly. In step 2604, a second leg assembly is retracted from the travel surface. In step 2606, the second leg assembly is moved along a first axis, e.g., the longitudinal axis, of the ambulatory vehicle 1700. In step 2608, a load is positioned along a second axis, e.g., the transverse axis, of the ambulatory vehicle 1700 to place a center of gravity of the ambulatory vehicle over a footprint of the first leg assembly. In step 2610, the first leg assembly and the second leg assembly exchange places along the first axis. In step 2612, the second leg assembly extends to the travel surface. In step 2614, the second leg assembly supports the ambulatory vehicle 1700. In some embodiments, the load is positioned in the first axis to place the center of gravity of the ambulatory vehicle over a footprint of the first leg assembly. In some embodiments, the load is supported using an arm assembly, e.g., the arm assembly 2410.

Figure 27:
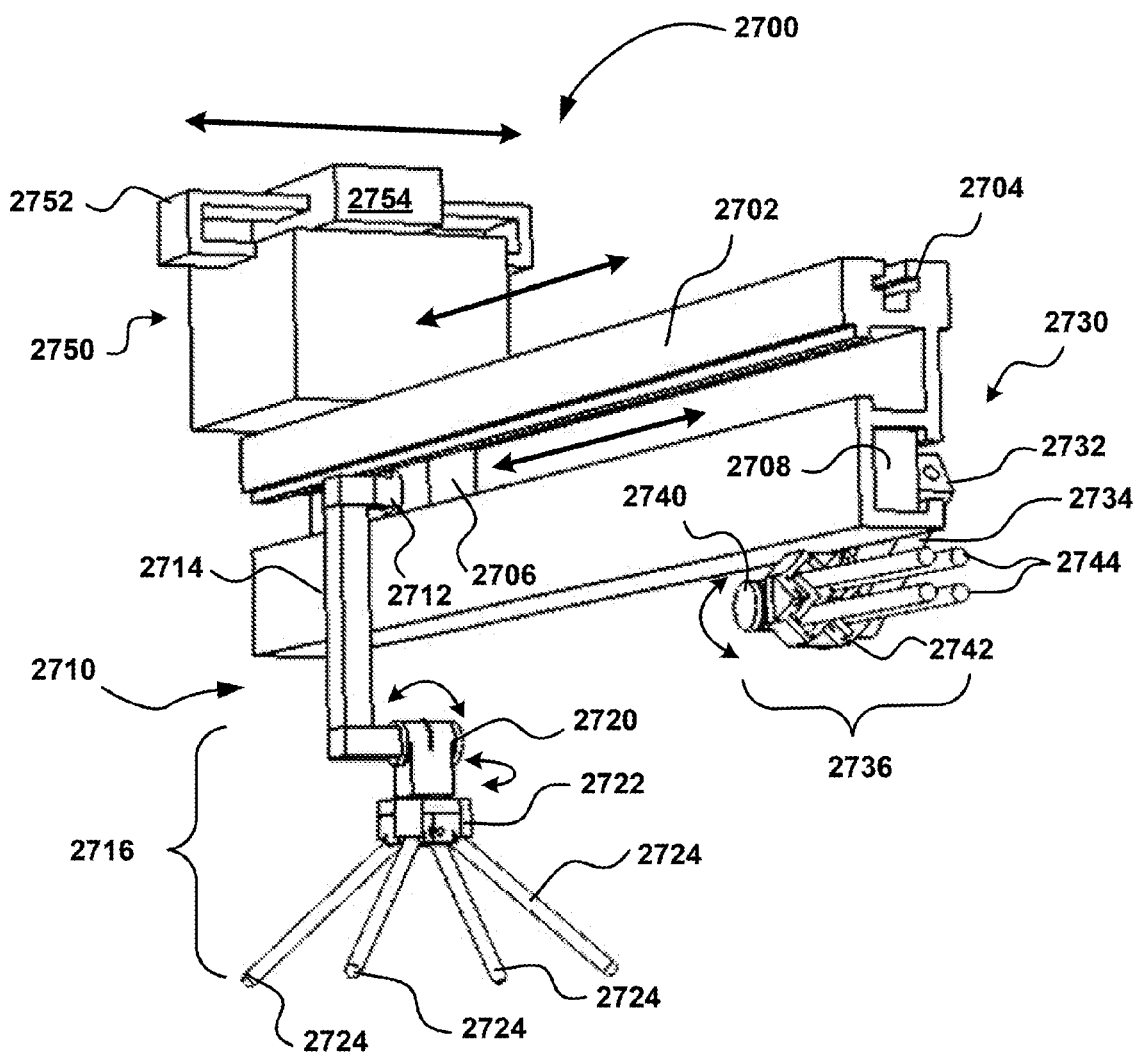
FIGS. 27-29 depict various views of an embodiment of an ambulatory vehicle configured to transport a load from a first location to a second location along a travel surface.
Figure 28:
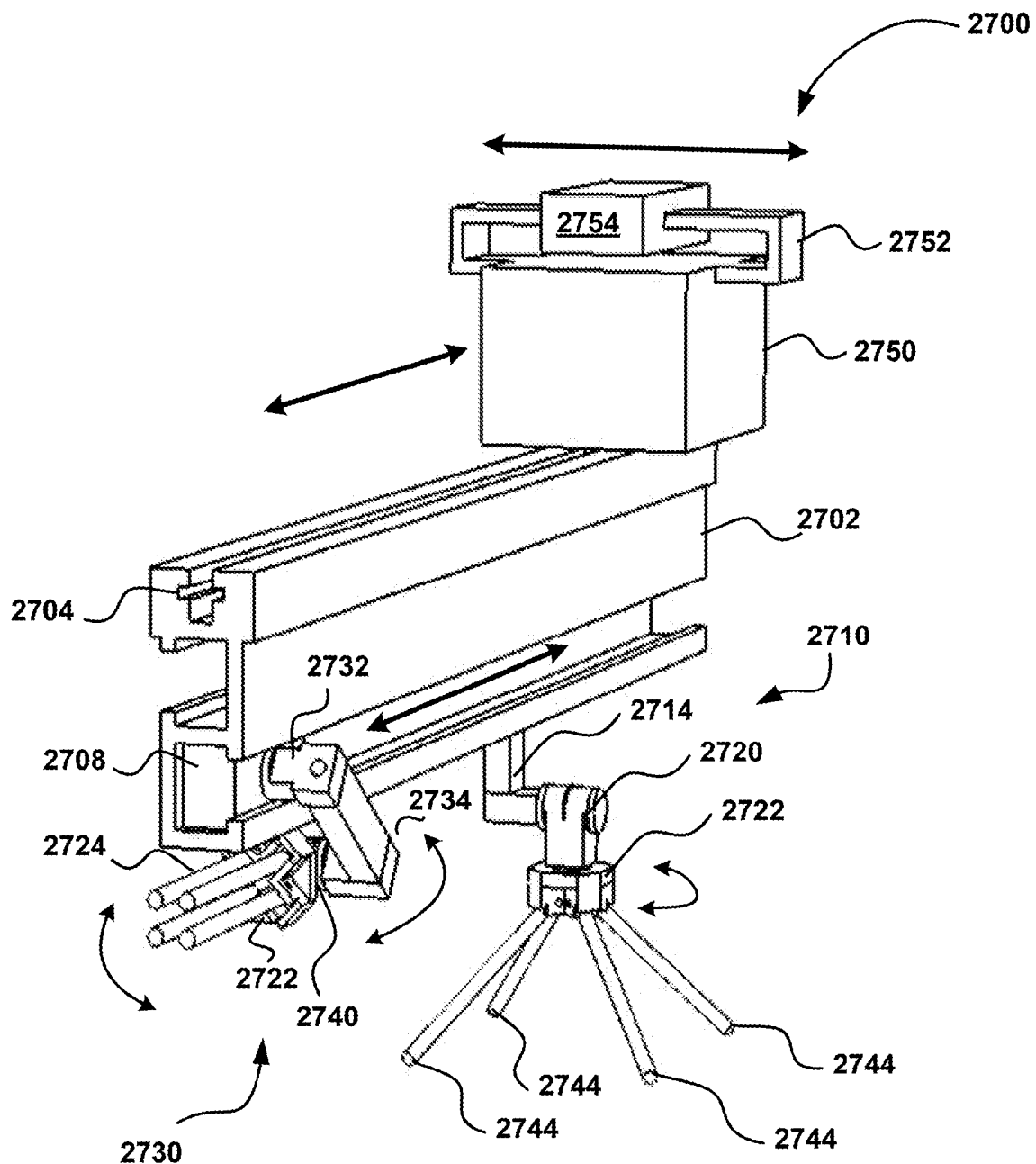
Figure 29:
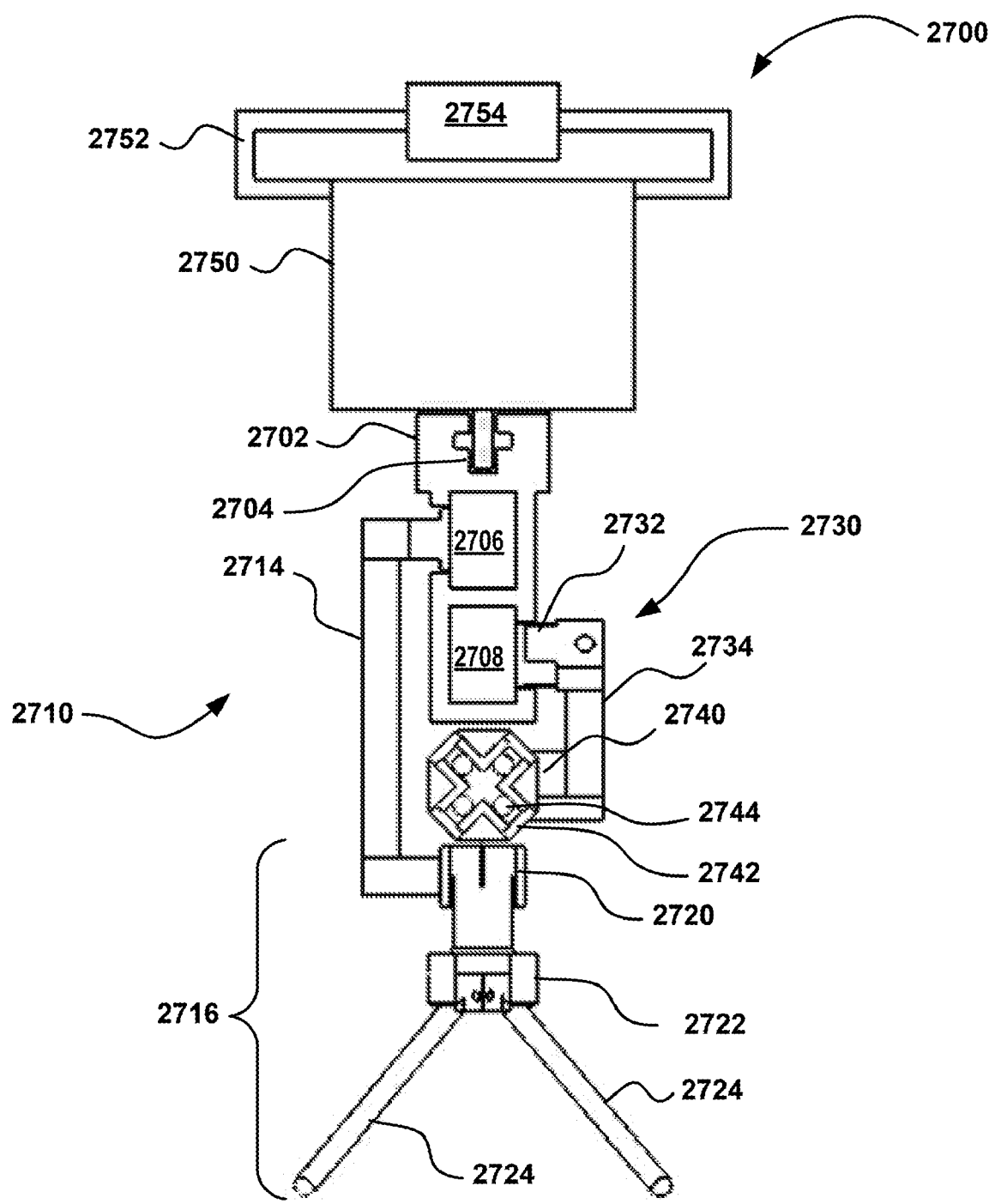

FIGS. 27-29 depict various views of an embodiment of an ambulatory vehicle 2700 configured to transport a load from a first location to a second location along a travel surface. FIG. 27 is a lower perspective view of the ambulatory vehicle 2700. FIG. 28 is an upper perspective view of the ambulatory vehicle 2700. FIG. 29 is a front elevation view of ambulatory vehicle 2700. The ambulatory vehicle 2700 comprises a beam assembly 2702, a first leg assembly 2710 and a second leg assembly 2730. The beam assembly 2702 comprises a load rail 2704, a first leg rail 2706, a second leg rail 2708 and a load assembly 2750. In some embodiments, the first leg rail 2706 is about parallel to the second leg rail 2708. The load rail 2704 may be about parallel to the first leg rail 2706 and/or the second leg rail 2708.

In various embodiments, the load rail 2704 may be an assembly that includes one or more of bearings, slide rails, tracks, air bearings, needle bearings, magnetic bearings, gears, chains, roller bearings, linear bearings, linear motors, and/or the like. Such assemblies are described in more detail elsewhere herein. The load rail 2704 is configured to allow the load assembly 2750 to shift along a length of the beam assembly 2702. By moving the load assembly 2750 along the load rail 2704, the center of gravity can be moved along the beam assembly 2702 based on a position of the load assembly 2750. Optionally, the load assembly 2750 includes a transverse rail 2752 configured to allow a load 2754 to shift along a transverse axis.

In various embodiments, the first leg rail 2706 and the second leg rail 2708 may be assemblies that include one or more of bearings, slide rails, tracks, air bearings, needle bearings, magnetic bearings, gears, chains, roller bearings, linear bearings, linear motors, and/or the like. Such assemblies are described in more detail elsewhere herein. The first leg rail 2706 and the second leg rail 2708 may be under control of a control system such as that described below with respect to FIG. 21. The control system can include sensors to provide position, velocity, and/or acceleration of the first leg rail 2706 and the second leg rail 2708 relative the beam assembly 2702.

The first leg assembly 2710 and the second leg assembly 2730 function in similar manners during locomotion and may have nearly identical stances, though not necessarily at the same time. Both the first leg assembly 2710 and the second leg assembly 2730 are configured to independently support the ambulatory vehicle 2700, either statically or dynamically, and may retract or extend during locomotion. The first leg rail 2706 is coupled to a first leg assembly 2710 that includes a first arm 2714 and a first foot assembly 2716. The second leg rail 2708 is coupled to a second leg assembly 2730 that includes a second arm 2734 and a second foot assembly 2736. The first foot assembly 2716 is configured to pass over or under the second foot assembly 2736. Similarly, the second foot assembly 2736 is configured to pass over or under the first foot assembly 2716.

In the illustrated embodiment, the first leg rail 2706 and the second leg rail 2708 are incorporated within the beam assembly 2702 such that the first leg rail 2706 is disposed in the same vertical plane as the second leg rail 2708. The first foot assembly 2716 and the second foot assembly 2736 can also be implemented in about the same vertical plane, which may be the same plane or a different plane than that associated with the first leg rail 2706 and the second leg rail 2708. For example, the first leg rail 2706, the second leg rail 2708, the first foot assembly 2716 and the second foot assembly 2736 may be disposed along a central vertical axis or plane of the ambulatory vehicle 2700. In some embodiments, the central vertical axis includes a vertical center of mass of the ambulatory vehicle 2700. In the following description, the first leg assembly 2710 and the second leg assembly 2730 are interchangeable in function and operation. The first arm 2714 may differ from the second arm 2734 in length when the first leg rail 2706 is at a different height than the second leg rail 2708. For example, when the first leg rail 2706 is above the second leg rail 2708 the first arm 2714 may be longer than the second arm 2734 such that the first arm 2714 and the second arm 2734 may extend to reach the same surface.

The first arm assembly 2710 includes an arm joint 2712 configured to couple the first arm 2714 to the first leg rail 2706. The first foot assembly 2716 includes a foot joint 2720, a pivot body 2722, and four legs 2724, though more or fewer legs can be used. The foot joint 2720 may couple the first foot assembly 2716 to the first arm 2714. The legs 2724 may be configured to support the ambulatory vehicle while they are in contact with the travel surface. The pivot body 2722 may spread the legs 2724 apart for stability while they are in contact with the travel surface. The pivot body 2722 may also rotate the legs 2724 into a parallel orientation for shifting of the first leg assembly 2710 along the first leg rail 2706. In some embodiments, the pivot body 2722 may extend and retract the legs 2724, for example, by telescoping.

The first leg assembly 2710 is configured for moving along a length of the first leg rail 2706. The arm joint 2712 and the foot joint 2720 may each rotate about a respective horizontal axis. The pivot body 2722 may rotate around a vertical axis. Alternatively, the arm joint 2712, the foot joint 2720, and/or the pivot body 2722 include gimbals. While four legs 2724 are illustrated in FIGS. 27-29, a person having ordinary skill in the art will appreciate that the first foot assembly 2716 may include more than four legs 2724 or less than four legs 2724.

The second leg assembly 2730 includes an arm joint 2732 configured to couple the second arm 2734 to the second leg rail 2708. The second foot assembly 2736 includes a foot joint 2740, a pivot body 2742, and four legs 2744. In some embodiments, the pivot body 2742 may extend and retract the legs 2744, for example, by telescoping. A foot joint 2740 may couple the second foot assembly 2736 to the second arm 2734. The legs 2744 are configured to support the ambulatory vehicle while they are in contact with the travel surface. The pivot body 2742 may rotate the legs 2744 into a parallel orientation for shifting of the second leg assembly 2730 along the second leg rail 2708. The pivot body 2742 may spread the legs 2744 apart for stability while they are in contact with the travel surface.

The second leg assembly 2730 is configured for moving along a length of the second leg rail 2708. The arm joint 2732 and the foot joint 2740 may each rotate about a respective horizontal axis. The pivot body 2742 may rotate around a vertical axis. Alternatively, the arm joint 2732, the foot joint 2740, and/or the pivot body 2742 include gimbals. While four legs 2744 are illustrated in FIGS. 27-29, a person having ordinary skill in the art will appreciate that the second foot assembly 2736 may include more than four legs 2744 or less than four legs 2744. The first leg assembly 2710 and the second leg assembly 2730 may be extended to the travel surface so that one or both leg assemblies support the ambulatory vehicle 2700 while the beam assembly 2702 and/or the load assembly 2750 travel with respect to the leg assemblies.

The ambulatory vehicle 2700 can be supported during locomotion by the first leg assembly 2710. The beam assembly 2702 may be rotated about a horizontal axis of foot joint 2720 and/or the arm joint 2712. The foot joint 2720, and/or the arm joint 2712 may include gimbals configured for performing such rotation. The beam assembly 2702 may also be pivoted about a vertical axis of pivot body 2722. The pivot body 2722 may include a gimbal configured for performing such rotation. Various combinations of rotations and pivots may be used independently or in combination to extend the second leg assembly 2730 from a retracted position to contact the travel surface, for example, when the travel surface is uneven.

Similarly, the ambulatory vehicle 2700 can be supported during locomotion by the second leg assembly 2730 and rotated about a horizontal axis of foot joint 2740 and/or the arm joint 2712. The foot joint 2740, and/or the arm joint 2732 may include gimbals configured for performing such rotation. The beam assembly 2702 may similarly be pivoted about a vertical axis of pivot body 2742 which may include a gimbal.

Ambulatory vehicle control mechanisms may raise the second foot assembly 2736 to manipulate the second foot assembly 2736, and pass it over the first foot assembly 2716. For example, the arm joint 2732 may rotate the second arm 2734 to raise the second foot assembly 2736. The pivot body 2742 may rotate the legs 2744 of the second foot assembly 2736 into a parallel orientation or other position suitable to allow the assembly to be moved along a corresponding rail without affecting portions of the first leg assembly 2710 or other portions of the ambulatory vehicle 2700. The foot joint 2740 may rotate the second foot assembly 2736 to orient the legs 2744 to be parallel, or some other orientation with respect to the beam assembly 2702. In some embodiments, the pivot body 2742 may retract the legs 2744. The second foot assembly 2736 may pass over the first foot assembly 2716 while the second leg assembly 2730 shifts along the second leg rail

2708. Likewise, the first leg assembly 2710 may shift along the first leg rail 2706 and pass under the second foot assembly 2736.

The ambulatory vehicle 2700 includes a control mechanism having components for controlling movement of the leg assemblies 2710 and/or 2730, the arms 2714 and/or 2734, foot assemblies 2716 and/or 2736, the load assembly 2750, and/or other movable parts of the ambulatory vehicle 2700. The components may include motors, linkages, drive shafts, cables, wiring, busses, solenoids, actuators, pneumatics, and other hardware for moving parts of the ambulatory vehicle 2700. The components may further include computing devices, sensors, transmitters, receivers, fiber optics, and other circuitry for controlling the hardware. The computing devices and circuitry may include one or more comptrollers or processors which execute software stored on a memory storage unit, for example, as described elsewhere herein. When executed, the software may program the processor to perform a method for controlling the moving parts of the ambulatory vehicle 2700, for example to achieve locomotion of the ambulatory vehicle 2700.

A person having ordinary skill in the art will appreciate that the first leg assembly 2710 may raise and configure the first foot assembly 2716 in a similar manner for passing over the second foot assembly 2736. Similarly, the second leg assembly 2730 may support the ambulatory vehicle 2700 during a shift along the second leg rail 2708 and pass under the first foot assembly 2716

In some embodiments, the second arm 2734 may retract to raise the second foot assembly 2736. The foot joint 2740 may rotate to raise the second foot assembly 2736 above the first foot assembly 2716. Likewise, the first leg assembly 2710 may retract the first arm 2714 to raise the first foot assembly 2716 in a similar manner for passing over the second foot assembly 2736.

Several embodiments are specifically illustrated and/or described herein. However, it will be appreciated that modifications and variations are covered by the above teachings and within the scope of the appended claims without departing from the spirit and intended scope thereof. For example, the load 102 may be distributed among more than one load module and/or track, other gaits may be implemented using similar movements, or the ambulatory vehicle may be able to flip over. The rail on which the load 102 rides (e.g., the third track 106) may optionally extend beyond the rails to which the leg assemblies are attached (e.g., the first track 110 and the second track 114). The systems described herein may include a housing, e.g., flexible boot, configured for the ambulatory vehicle to operate in harsh environments, or submerged in a liquid. The systems described herein may be controlled by a computing device and sensors (not shown), and/or by a human operator. In some embodiments, components are configured to recover braking energy. In some embodiments, the first leg assembly is configured such that the beam assembly can rotate 360 degrees around the first leg assembly. Similarly, the second leg assembly may be configured such that the beam assembly can rotate 360 degrees around the second leg assembly. The load may be suspended beneath the beam assembly. The ambulatory vehicle may be configured as an ambulatory crane that can be repositioned using the leg assemblies. The ambulatory crane may be configured for suspending from the beam assembly. The ambulatory crane may be further configured for picking up the load.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. An ambulatory system comprising:
   a beam assembly;
   a first leg assembly coupled to the beam assembly, the first leg assembly configured to support the beam assembly and to move in a first direction while coupled to the beam assembly;
   a second leg assembly coupled to the beam assembly, the second leg assembly configured to move in a second direction while coupled to the beam assembly;
   a carriage configured to support a load and coupled to the beam assembly, the carriage further configured to move the load in a third direction, the third direction not parallel to first direction or the second direction; and
   a control mechanism for displacing the carriage, first leg assembly and second leg assembly along the beam assembly, the control mechanism configured to move the first leg assembly, the second leg assembly, and the carriage based on a position of the first leg assembly or the second leg assembly.

2. The ambulatory system of claim 1, wherein the carriage is further configured to position a load along the first direction based on the position of the first leg assembly and the second leg assembly.

3. The ambulatory system of claim 1, wherein the carriage is further configured to position a load along the third direction to maintain a center of gravity of the ambulatory system over the first leg assembly while the second leg assembly exchanges places with the first leg assembly.

4. The ambulatory system of claim 1, wherein the first leg assembly is further configured to move along the first direction while supporting the beam assembly.

5. The ambulatory system of claim 1, wherein the second leg assembly is further configured to move along the second direction while not supporting the beam assembly.

6. The ambulatory system of claim 1, wherein the first leg assembly is further configured to exchange places with the second leg assembly along the first direction while supporting the beam assembly.

7. The ambulatory system of claim 1, wherein the control mechanism includes a processor configured to control movement of the first leg assembly along the first direction, movement of the second leg assembly along the second direction, and a position of the carriage along the third direction.

8. A method for moving a beam assembly, comprising:
   supporting a beam assembly using a first leg assembly and a second leg assembly, the first leg assembly including a first leg in contact with a surface, the second leg assembly including a second leg in contact with the surface;
   retracting the second leg such that the second leg is not in contact with the surface;
   moving the second leg assembly from a first position to a second position along a first axis of the beam assembly;
   displacing a load from a first position to a second position along a second axis of a beam assembly to maintain a center of gravity of the ambulatory vehicle over the first leg assembly; and extending the leg of the second leg assembly to contact the surface.

9. The method of claim 8, further comprising displacing the load along the second axis of the beam assembly while moving the second leg assembly to maintain a center of gravity of the ambulatory vehicle over the footprint of the first leg assembly.

10. The method of claim 8, further comprising displacing the load along the first axis of the beam assembly to maintain the center of gravity over the footprint of the first leg assembly while moving the second leg assembly.

11. The method of claim 8, further comprising displacing the load to position the center of gravity of the ambulatory vehicle over the first leg assembly or between the first leg assembly and the second leg assembly.

12. The method of claim 11, wherein displacing the load comprises displacing the load along the second axis.

13. The method of claim 8, further comprising rotating the beam assembly around an axis intersecting the first leg assembly.

14. The method of claim 8, further comprising suspending the load from a carriage.

15. An ambulatory system, comprising:
a beam assembly;
a carriage configured for bearing and shifting a load relative the beam assembly to change a center of gravity of the ambulatory system;
a first leg assembly configured for supporting the beam assembly over a travel surface and for retracting a first leg coupled to the first leg assembly from the travel surface;
a first track configured for shifting the first leg assembly along a first length of the beam assembly;
a first joint for coupling the first leg assembly to the first track and articulating the first leg assembly on the first track;
a second leg assembly configured for supporting the beam assembly over the travel surface and for retracting a second leg coupled to the second leg assembly from the travel surface;
a second track configured for shifting the second leg assembly along a second length of the beam assembly;
a second joint configured for coupling the second leg assembly to the second track and articulating the second leg on the second track;
a control mechanism configured for exchanging positions of the first leg assembly and the second leg assembly relative to each other along a length of the beam assembly.

16. The ambulatory system of claim 15, wherein the carriage assembly comprises:
an arm configured to extend and retract a load in a radial axis;
a bearing configured for rotating the arm about a rotational axis.

17. The ambulatory system of claim 15, wherein the first joint is further configured for rotating the beam assembly horizontally about a vertical axis including the first leg assembly.

18. The ambulatory system of claim 15, wherein the carriage is configured to provide a dynamic center of gravity through shifting of a load.

19. The ambulatory system of claim 15, further comprising a processor configured for controlling:
a position of the carriage,
shifting of the first leg assembly,
articulation of the first leg assembly,
shifting of the second leg assembly, and
articulation of the second leg assembly.

20. A method for moving a beam assembly, comprising:
supporting a beam assembly using a first leg assembly and a second leg assembly, the first leg assembly including a first foot assembly in contact with a surface, the second leg assembly including a second foot assembly in contact with the surface;
changing a position of the second leg such that the second foot assembly is above the first foot assembly and in about the same vertical plane as the first foot assembly;
moving the second foot assembly from a first position, over the first foot assembly, and to a second position along a first axis of the beam assembly; and
extending the leg of the second leg assembly to place the second foot assembly in contact the surface.

21. The method of claim 20, further comprising displacing a load along a second axis of the beam assembly while moving the second foot assembly to maintain a center of gravity of the ambulatory vehicle over the first foot assembly.

22. The method of claim 20, further comprising rotating the beam assembly around the first foot assembly.

23. An ambulatory system comprising:
a first leg rail incorporated in a beam assembly of the ambulatory system and coupled to a first leg assembly, the first leg assembly including a first foot assembly, the first leg assembly configured to support the beam assembly while moving along the first leg rail;
a second leg rail incorporated into the beam assembly and positioned along a vertical plane that intersects the first leg rail, the second leg rail coupled to a second leg assembly, the second leg assembly including a second foot assembly and configured to move along the second leg rail; and
a control mechanism configured to raise the second foot assembly and move the second leg assembly along the second rail of the beam assembly while the second foot assembly passes over the first foot assembly.

24. The ambulatory system of claim 23, further comprising a carriage configured to support a load and coupled to the beam assembly, the carriage further configured to move the load in a direction not parallel to first leg rail or the second leg rail.

25. The ambulatory system of claim 23, wherein the first leg assembly comprises a joint configured for rotating the beam assembly about a vertical axis including the first foot assembly.

* * * * *